United States Patent
Lehrer et al.

(10) Patent No.: US 10,628,715 B2
(45) Date of Patent: *Apr. 21, 2020

(54) SYSTEM FOR AUTOMATED DECORATION

(71) Applicant: R. B. III Associates, Inc., Carlsbad, CA (US)

(72) Inventors: Matthew Nathan Lehrer, Carlsbad, CA (US); David James Seeton, Cardiff, CA (US)

(73) Assignee: R. B. III ASSOCIATES, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,124

(22) Filed: Nov. 5, 2018

(65) Prior Publication Data

US 2019/0138861 A1 May 9, 2019

Related U.S. Application Data

(63) Continuation of application No. 14/280,621, filed on May 18, 2014, now Pat. No. 10,127,480, which is a
(Continued)

(51) Int. Cl.
| | |
|---|---|
| *G06K 15/02* | (2006.01) |
| *G06T 17/00* | (2006.01) |
| *G06F 3/12* | (2006.01) |
| *G06Q 30/06* | (2012.01) |
| *G06Q 10/10* | (2012.01) |

(52) U.S. Cl.
CPC ......... *G06K 15/021* (2013.01); *G06F 3/1204* (2013.01); *G06F 3/1257* (2013.01); *G06F 3/1287* (2013.01); *G06Q 10/10* (2013.01); *G06Q 30/0621* (2013.01); *G06Q 30/0643* (2013.01); *G06T 17/00* (2013.01); *G06F 3/1256* (2013.01)

(58) Field of Classification Search
None
See application file for complete search history.

(56) References Cited

U.S. PATENT DOCUMENTS

| | | |
|---|---|---|
| 4,926,344 A | 5/1990 | Collins et al. |
| 5,517,404 A | 5/1996 | Biber et al. |
| (Continued) | | |

OTHER PUBLICATIONS

Khosrowpour, Mehdi, "Application Program Interface (API)" in the Dictionary of Information Science and Technology, IGI Global, Hershey, PA, 2007. ebook Collection (EBSCOhost), web Feb. 22, 2016, 1 page.

(Continued)

*Primary Examiner* — Charles E Anya
(74) *Attorney, Agent, or Firm* — Carr & Ferrell LLP

(57) ABSTRACT

A system for automated decoration of an item comprising the steps of: installing print generating software on a computer with a memory (e.g. a server); linking an input system (e.g. a web site) to the computer; allowing a customer to select an item (customer selection), preferably a fabric item, via the input system; allowing the customer to specify a decoration (customer specification) for the item via the input system; generating a print image for the item from the customer selection and specification with the print generating software; and sending the print image from the computer to a printer, which is preferably a dye sublimation printer.

15 Claims, 61 Drawing Sheets

Related U.S. Application Data continuation-in-part of application No. 11/684,116, filed on Mar. 9, 2007, now Pat. No. 8,731,703.

(56) References Cited

U.S. PATENT DOCUMENTS

| | | |
|---|---|---|
| 5,943,972 A | 8/1999 | Hirata |
| 5,991,528 A | 11/1999 | Taylor et al. |
| 6,117,061 A | 9/2000 | Popat et al. |
| 6,123,040 A | 9/2000 | Hayakawa et al. |
| 6,144,890 A | 11/2000 | Rothkop |
| 6,167,383 A | 12/2000 | Henson |
| 6,219,586 B1 | 4/2001 | Sakai |
| 6,246,993 B1 | 6/2001 | Dreyer et al. |
| 6,292,827 B1 | 9/2001 | Raz |
| 6,301,518 B1 | 10/2001 | Kawaguchi |
| 6,344,853 B1 | 2/2002 | Knight |
| 6,414,693 B1 | 7/2002 | Berger |
| 6,546,309 B1 | 4/2003 | Gazzuolo |
| 6,594,642 B1 | 7/2003 | Lemchen |
| 6,748,290 B2 | 6/2004 | Somaia |
| 6,757,710 B2 | 6/2004 | Reed |
| 6,771,384 B1 | 8/2004 | Laverty et al. |
| 6,907,310 B2 | 6/2005 | Gardner et al. |
| 6,922,815 B2 | 7/2005 | Rosen |
| 6,925,350 B2 | 8/2005 | Watanabe |
| 6,957,125 B1 | 10/2005 | Rifkin |
| 7,016,865 B1 | 3/2006 | Weber et al. |
| 7,016,869 B1 | 3/2006 | Haeberli |
| 7,058,471 B2 | 6/2006 | Watanabe |
| 7,083,278 B2 | 8/2006 | Broderick et al. |
| 7,165,041 B1 | 1/2007 | Guheen |
| 7,191,145 B1 | 3/2007 | Lunetta |
| 7,216,092 B1 | 5/2007 | Weber et al. |
| 7,657,340 B2 | 2/2010 | Lind |
| 7,680,694 B2 | 3/2010 | Glazer |
| 7,737,993 B2 | 6/2010 | Kaasila |
| 7,847,990 B2 | 12/2010 | Kawai |
| 7,992,774 B2 | 8/2011 | Lynch |
| 8,069,096 B1 | 11/2011 | Ballaro |
| 8,108,267 B2 | 1/2012 | Varon |
| 8,348,371 B2 | 1/2013 | McDowell et al. |
| 8,502,834 B2 | 8/2013 | Hanechak et al. |
| 8,667,404 B2 | 3/2014 | Maillot |
| 8,731,703 B1 | 5/2014 | Lehrer et al. |
| 8,868,227 B2 | 10/2014 | Lehrer |
| 9,100,668 B2 | 8/2015 | Lehrer |
| 9,117,215 B2 | 8/2015 | Lehrer |
| 10,042,831 B2 | 8/2018 | Lehrer |
| 10,127,480 B1 | 11/2018 | Lehrer et al. |
| 2001/0025687 A1 | 10/2001 | Cross |
| 2001/0026272 A1 | 10/2001 | Feld |
| 2001/0031102 A1 | 10/2001 | Lunetta |
| 2002/0062264 A1 | 5/2002 | Knight |
| 2002/0147664 A1 | 10/2002 | Kronenberger |
| 2003/0139840 A1 | 7/2003 | Magee |
| 2004/0172325 A1 | 9/2004 | Blanco |
| 2004/0227752 A1 | 11/2004 | McCartha et al. |
| 2005/0104897 A1 | 5/2005 | Walker et al. |
| 2005/0131571 A1 | 6/2005 | Costin |
| 2005/0177453 A1 | 8/2005 | Anton |
| 2005/0238251 A1 | 10/2005 | Lunetta |
| 2005/0240416 A1 | 10/2005 | Schindler et al. |
| 2005/0259883 A1 | 11/2005 | Lunetta |
| 2005/0273470 A1 | 12/2005 | Heigold |
| 2005/0281535 A1 | 12/2005 | Fu et al. |
| 2005/0289018 A1 | 12/2005 | Sullivan |
| 2006/0015208 A1 | 1/2006 | Reyes Moreno |
| 2006/0031392 A1 | 2/2006 | Lunetta |
| 2006/0168561 A1 | 7/2006 | Wood |
| 2006/0197963 A1 | 9/2006 | Royal |
| 2006/0206512 A1 | 9/2006 | Hanrahan |
| 2007/0061224 A1 | 3/2007 | Hofmann et al. |
| 2007/0192203 A1 | 8/2007 | Di Stefano |
| 2007/0283175 A1 | 12/2007 | Marinkovic |
| 2008/0163069 A1 | 7/2008 | Eilers |
| 2008/0190339 A1 | 8/2008 | Hayakawa et al. |
| 2008/0222560 A1* | 9/2008 | Harrison ............ G06F 3/04847 715/800 |
| 2008/0252651 A1 | 10/2008 | Mills |
| 2008/0288889 A1 | 11/2008 | Hunt |
| 2009/0064009 A1 | 3/2009 | Krantz |
| 2009/0083653 A1 | 3/2009 | Makoff |
| 2009/0138817 A1 | 5/2009 | Oron |
| 2009/0180153 A1 | 7/2009 | Noonan |
| 2009/0207458 A1 | 8/2009 | Doggett, III |
| 2009/0222127 A1 | 9/2009 | Lind |
| 2010/0179888 A1 | 7/2010 | Warren |
| 2010/0315417 A1 | 12/2010 | Cho |
| 2010/0318442 A1 | 12/2010 | Paul |
| 2011/0025714 A1 | 2/2011 | Ptucha et al. |
| 2011/0060437 A1 | 3/2011 | Durham |
| 2011/0099093 A1 | 4/2011 | Mills |
| 2011/0181637 A1 | 7/2011 | Doggett, III |
| 2011/0270947 A1 | 11/2011 | Cok |
| 2012/0044154 A1 | 2/2012 | Black |
| 2012/0054622 A1 | 3/2012 | Nankani |
| 2012/0086783 A1 | 4/2012 | Sareen |
| 2012/0221433 A1 | 8/2012 | Plattsmier |
| 2012/0249552 A1 | 10/2012 | Harvill |
| 2013/0018498 A1 | 1/2013 | Jones |
| 2013/0135196 A1 | 5/2013 | Park |
| 2013/0159866 A1 | 6/2013 | Dirsa |
| 2013/0322776 A1 | 12/2013 | Lehrer |
| 2013/0326003 A1 | 12/2013 | Lehrer |
| 2014/0058885 A1 | 2/2014 | Lehrer |
| 2014/0192043 A1 | 7/2014 | Lehrer |
| 2014/0195203 A1 | 7/2014 | Lehrer |
| 2014/0215682 A1 | 8/2014 | Northup et al. |
| 2015/0331843 A1 | 11/2015 | Lehrer |
| 2015/0356655 A1 | 12/2015 | Lehrer |

OTHER PUBLICATIONS

Elordi, U. et al., "Draft: Virtual Reality Interfaces Applied to Web-Based 3D E-Commerce," Proceedings of ASME 2012 11th Biennial Conference on Engineering Systems Design and Analysis & Computers and Information in Engineering Conference, Jul. 2-4, 2011, 11 pages.

* cited by examiner

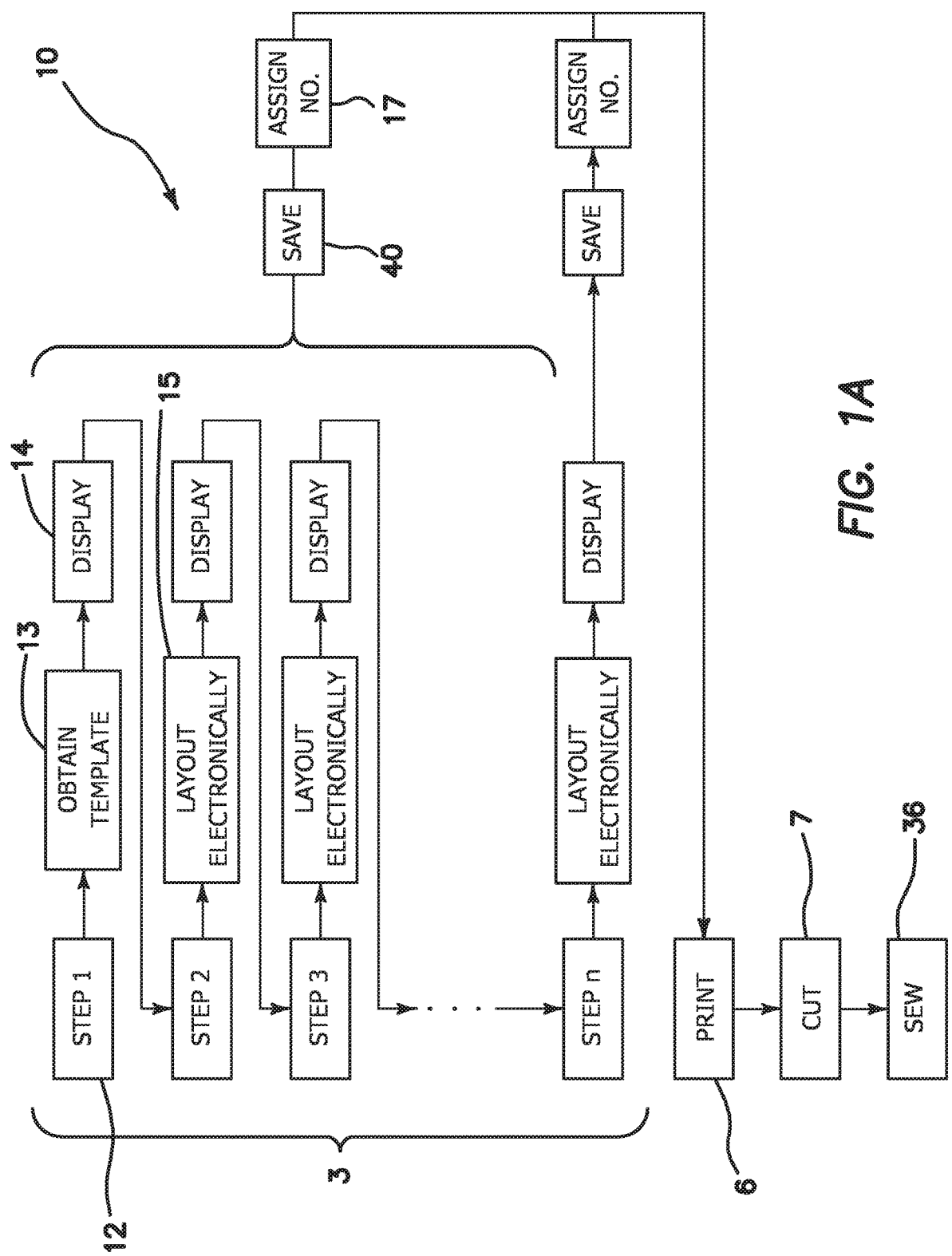

```
Style 00007 - M (38-40)
Side Stars
                        anchor points
tag [edit]
                properties
                contents: Sublimated Tag
                  parent: none
                position: 4.02,23.091
                    size: 5.35x0.5
                   angle: 270deg        allowable entities
                  UI pos: 64,15               test: None
                                          graphics: None
                                            emblem: None
                                       player name: None
                                     player number: None Top Front [edit]
                properties
                contents: none
                  parent: none
                position: 20.292,11.946
                    size: 13x4
                   angle: 270deg        allowable entities
                  UI pos: 64,42               test: max
                                                    length:10
                                                    Small
                                          graphics: None
                                            emblem: Small
                                       player name: None
                                            player None
                                            number:

Bottom Front [edit]
                properties
                contents: none
                  parent: none
                position: 27.304,11.946
                    size: 13x4
                   angle: 270deg        allowable entities
                  UI pos: 64,67               test: max
                                                    length:10
                                                    Small
                                          graphics: Small
                                            emblem: None
                                       player name: None
                                            player Medium
                                            number:

Center Front [edit]
                properties
                contents: none
                  parent: none
                position: 23.785,11.946
                    size: 12x12
                   angle: 270deg        allowable entities
                  UI pos: 64,54               test: None
                                          graphics: Small,Medium,Large
                                            emblem: Large
                                            player None
                                            name:
                                            player Medium
                                            number:
```

FIG. 29A

Top Front Left [edit]

properties
contents: none
parent: none
position: 18.292,7.919
size: 4x4
angle: 270deg
UI pos: 77,42 allowable entities
test: None
graphics: Small
emblem: Small
player name: None
player number: Small

Bottom Front Left [edit]

properties
contents: none
parent: none
position: 27.304,7.919
size: 4x4
angle: 270deg
UI pos: 77,67 allowable entities
test: None
graphics: None
emblem: None
player name: None
player number: Small

UPPER BACK [edit]

properties
contents: none
parent: none
position: 14.639,35.084
size: 13x4
angle: 270deg
UI pos: 159,29 allowable entities
test: None
graphics: Small
emblem: None
player name: Large
player number: None

CENTER BACK [edit]

properties
contents: none
parent: none
position: 22.132,35.084
size: 13x10
angle: 270deg
UI pos: 159,50 allowable entities
test: None
graphics: Small
emblem: None
player name: None
player number: Large add anchor point

*FIG. 29B*

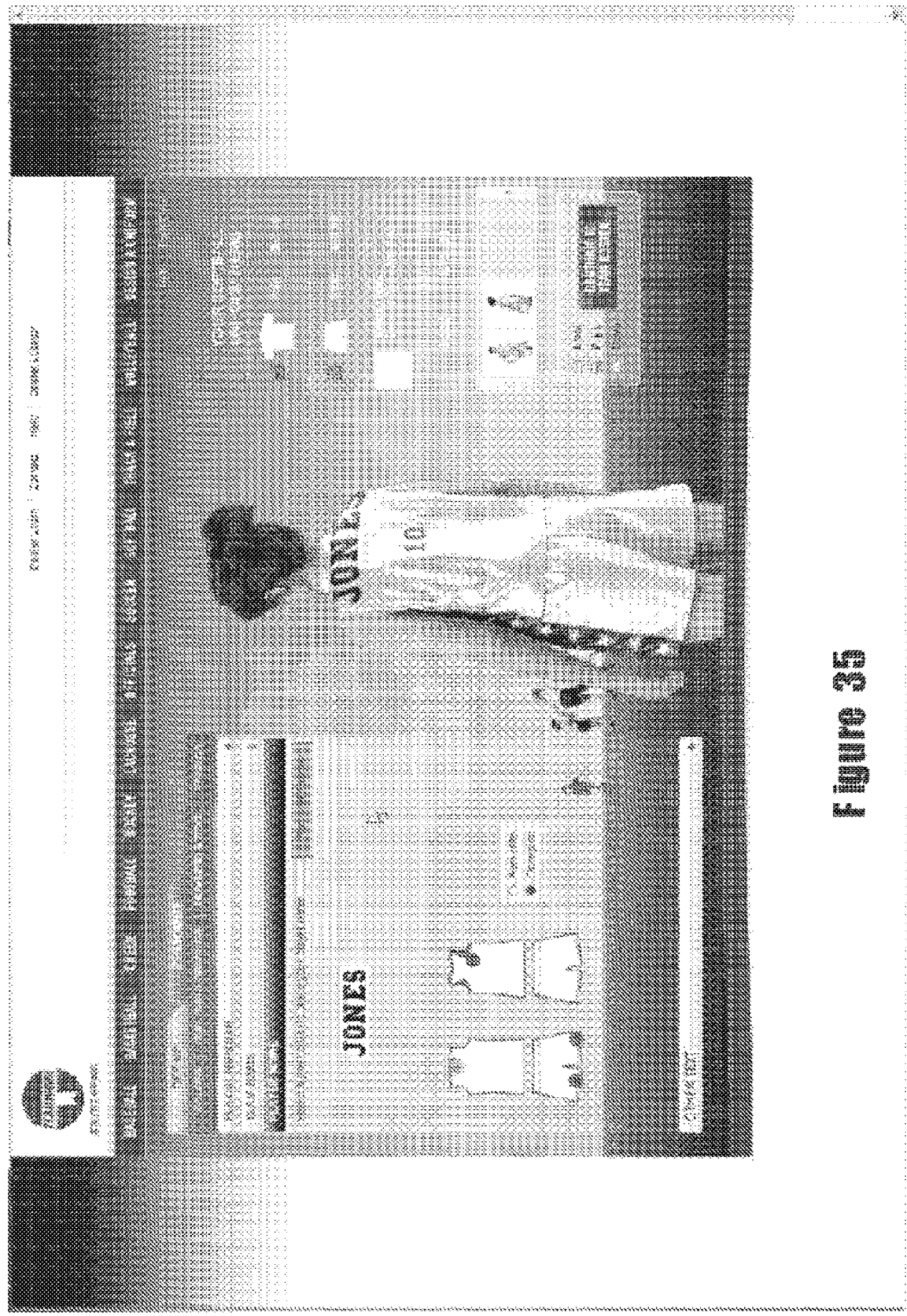

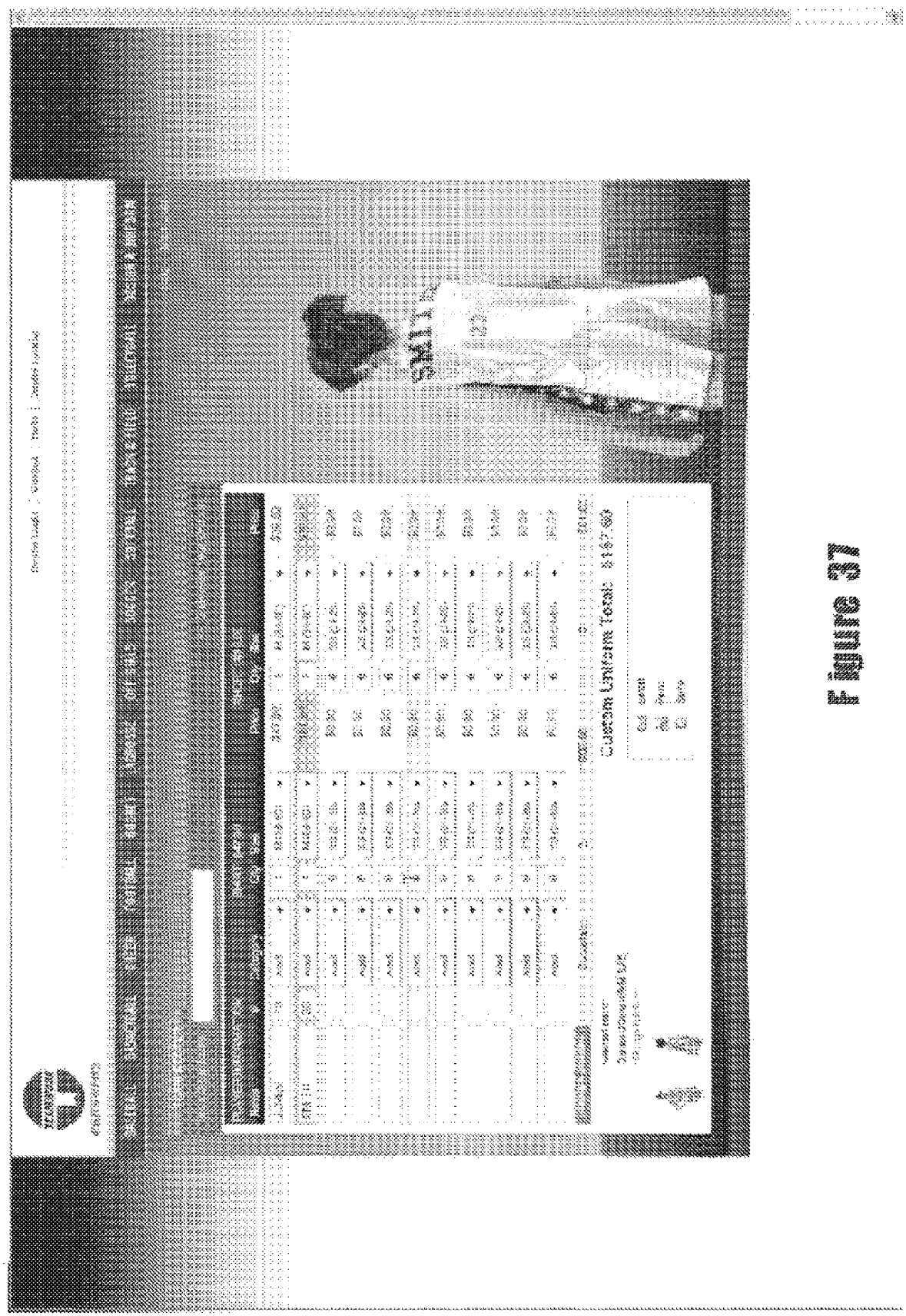

FIG. 41

Name [Left Bottom Front] [Edit] [Custom]

*Properties*

| | |
|---|---|
| Hidden | ☐ |
| Contents | User Defined ▼ |
| Parent Anchor | N/A ▼ |
| Preview Image | front ▼ |
| Position | 2470 x 990 |
| Size | 750 x 750 |
| Rotation | 270 degrees |
| Anchor Orgin | North-Center ▼ |
| Mask | |
| Relative Anchor | Top Front ▼ |
| Relationship | Below ▼ |
| Relation Space | 300 |
| Mirror Capacity | |
| Disable Scoring | ☐ |
| Anchor Diagram Postion | 105 x 76 |
| Zoom Anchor Diagram | Top Front ▼ |
| Zoom Anchor Diagram Position | 196 x 124 |

*Preview*

Display Order 12

Allowable Entities

| | Text | Graphics | Uploaded Graphics | Emblems | Player Names | Player Numbers |
|---|---|---|---|---|---|---|
| | None | 3" | 3" | None | None | 3"x3" |
| | | 4" | 4" | | | 4"x4" |
| | | 6" | 6" | | | 6"x6" |

FRONT   BACK

FIG. 42

SYSTEM FOR AUTOMATED DECORATION

CROSS REFERENCE TO RELATED APPLICATIONS

This application is a continuation of and claims the benefit and priority of U.S. patent application Ser. No. 14/280,621, titled "System for Automated Decoration" filed on May 18, 2014, now U.S. Pat. No. 10,127,480, issued on Nov. 13, 2018, which is a continuation in part of U.S. patent application Ser. No. 11/684,116, titled "System for Automated Decoration," filed Mar. 9, 2007, now U.S. Pat. No. 8,731, 703, issued on May 20, 2014. Each of these applications is hereby incorporated by reference herein in their entireties including all references and appendices cited therein, for all purposes.

BACKGROUND OF THE INVENTION

(1) Field of the Invention

The present invention relates to the field of automated decoration and more particularly to an automated system for converting customer specified decoration from a web page, for example, to instructions for application of the decoration to an item with a printing machine and even more particularly to such a system for the application of decoration to garments with a sublimation-ink printing machine.

(2) Description of the Related Art

U.S. Pat. No. 5,517,404 discloses a spinning mill with a master process control computer for at least one group of machines, whereby each machine of the group is provided with its own machine control unit which controls the actuators of the machine (including any auxiliary aggregates allocated to the machine). At least one network is provided for bidirectional communication between the computer and each machine of the group. During the operation of the plant, master control instructions from the process control computer are supplied via the network to the machine control units. Each machine control unit forwards the control instructions to the actuators controlled by the machine control unit, whereby the control instructions, if required, are converted by the machine control unit into control signals which are suitable for the actuators. This patent concerns controlling the operation of a textile processing mill.

U.S. Pat. No. 5,991,528 discloses an expert manufacturing system that generates a manufacturing plan for producing a part in an automated manufacturing system. The expert manufacturing system generates a multipurpose manufacturing geometry definitions file. The expert manufacturing system includes a rule-based expert system which uses the manufacturing geometry definitions file to generate the manufacturing plan in the form of a neutral source code file. The neutral source code is converted to machine-specific program code directly executable by a device controller, such as a logic controller or motion controller. The expert manufacturing system also includes a parametric drawing generation program for generating a drawing of the part, and a computer simulation program for simulating the manufacturing plan for producing the part. This patent concerns automatically producing a manufacturing plan and producing a desired part with a variety of machine tools.

U.S. Pat. No. 6,167,383 discloses a web-based online store including a configurator, a cart, a checkout, and a database, in which a user interface of the online store enables a custom configuration of a computer system according to an identification of a user belonging to a prescribed customer set. The configurator is provided for configuring a computer system with options selected according to a prescribed user input, the options and a respective pricing for each option being presented on a configurator web page in accordance with the identification of the user belonging to a prescribed customer set. The cart is provided for temporarily storing the customer configured computer system, the cart including a cart web page. The checkout is provided for presenting payment options and for obtaining payment and delivery information, the checkout including a checkout web page. Lastly, the database is provided for dynamically supplying configuration options to the configurator in accordance with the identification of the user belonging to the prescribed customer set. An online store method and user interface are also disclosed. This patent concerns automatically creating the specification for a computer system that a purchaser desires. It illustrates that web based specification and ordering systems are well-known.

U.S. Pat. No. 6,219,586 discloses an apparatus and method for managing and distributing design and manufacturing information throughout a factory in order to facilitate the production of components, such as bent sheet metal components. In accordance with an aspect of the present invention, the management and distribution of critical design and manufacturing information is achieved by storing and distributing the design and manufacturing information associated with each job. By replacing the traditional paper job set-up or work sheet with, for example, an electronically stored job sheet that can be accessed instantaneously from any location in the factory, the present invention improves the overall efficiency of the factory. In addition, through the various aspects and features of the invention, the organization and accessibility of part information and stored expert knowledge is improved. This patent concerns replacement of a paper based engineering drawing and manufacturing data system with a system of computer based storage and distribution of engineering drawings and manufacturing data.

U.S. Pat. No. 6,246,993 discloses a method of, and system for, selectively reordering the reprinting of books on one or more electronic presses. In one embodiment, sensors and a processor are utilized to reorder books fouled by an auxiliary device. In another embodiment, a sensor, and a global processor in communication with first and second local processors respectively associated with first and second printing presses are utilized to reorder books on one of the first and second printing presses selected to minimize processing time and/or to maximize postal rate discounts. In another embodiment, a sensor and a press processor are utilized to reorder errored books by inserting a book back into a stream of books being printed if re-printing the book with the stream entitles the errored book to a predefined postal discount. This invention recognizes when a book containing an error has been produced by the printing press and orders the printing press to reprint a book to make up for the error.

U.S. Pat. No. 6,594,642 discloses an automated process and system for ordering and manufacturing personalized products over the Internet. This process may apply to a limitless variety of products which are desirable to personalize. A robotic manufacturing machine offers options on multiples physical features of a product. These options are presented to consumers via the Internet. A consumer selects the options using a computer. The selected options are received by a web server and converted to machine instructions. The machine instructions are transmitted to the robotic machine which produces a product according to the instructions received. The end result is a personalized product manufactured specifically to the consumer's selections as a result of a completely automated process. This patent covers ordering and automatic or semi-automatic production of any personalized product that can be produced by any robotic machine.

U.S. Pat. No. 6,748,290 discloses a method of producing a textile product, including the steps of: receiving order information from a customer over a network, the order information including an image to be reproduced on the textile product; processing the order information to create an order record readable by an automated weaving machine; and causing the weaving machine to weave the textile product according to the order record so as to have a representation of the image on a face of the textile product. This patent concerns fabrication of textiles rather than clothing where the pattern is produced by weaving instead of printing.

U.S. Pat. No. 6,757,710 discloses an automated communications system which operates to transfer data, metadata and methods from a provider computer to a consumer computer through a communications network. The transferred information controls the communications relationship, including responses by the consumer computer, updating of information, and processes for future communications. Information which changes in the provider computer is automatically updated in the consumer computer through the communications system in order to maintain continuity of the relationship. Transfer of metadata and methods permits intelligent processing of information by the consumer computer and combined control by the provider and consumer of the types and content of information subsequently transferred. Object oriented processing is used for storage and transfer of information. The use of metadata and methods further allows for automating many of the actions underlying the communications, including communication acknowledgments and archiving of information. Service Objects and partner servers provide specialized data, metadata, and methods to providers and consumers to automate many common communications services and transactions useful to both providers and consumers. A combination of the provider and consumer programs and databases allows for additional functionality, including coordination of multiple users for a single database.

U.S. Pat. No. 6,771,384 discloses an on-line automated printing system that quickly produces consistent printed materials. The system includes front-end customer setup and product setup modules available on a web server. A Print Ready File is produced embodying the product to be printed. The Print Ready File is compiled and all operations on the file can be completed via reference to the information contained therein. A state flag is associated with each element of the file, the flag having states such as preview, print, both, or none. The file is stored on an asset management file server. The file (unchanged) may be previewed or printed using internal flags and logic built-in to the PostScript language. A batcher service batches print jobs. A plater service accepts the Print Ready Files and outputs a plate file to a print vendor's ordering system. Over the Internet the plate file is sent to a vendor computer. The plate file is sent to a raster image processor (RIP) which outputs a bitmap to be printed. Included within the system is an imposition subsystem. A client application requests imposition of a file and pulls imposition parameters from an image logic information database. The client sends the parameters along with input and output files to a gateway service. The gateway service places the job in a queue which is monitored by a processor service. The processor service hands the job off to a hierarchy of processing services. An imposition module (with hard coded parameters) executes the software application PRFs to perform imposition of the file and outputs the result. This patent concerns printing on paper and requires sending the print file to an outside vendor over the internet for printing.

U.S. Pat. No. 6,957,125 discloses an interactive vending machine which enables a consumer to view customized products before they are purchased and thereafter enables the consumer to purchase the customized products. The machine also keeps track of inventory so that if a particular item or accessory is out of stock, it will not be displayed on the screen for purchase. This patent is a system for allowing automatic purchasing an available product with user selected available options.

U.S. Pat. No. 7,083,278 discloses a method of configuring and ordering a customized contact lens fir a user. The method includes the steps of displaying a template eye image to assist the user in visualizing selected options for a customized contact lens, and displaying a plurality of contact lens selection options to the user. The information includes a plurality of selectable lens colors and lens design patterns. The method also includes the steps of sending an ordering request to order a contact lens incorporating lens colors and lens design patterns selected by the user, receiving the ordering request, and manufacturing a contact lens incorporating the lens colors and lens design patterns selected by the user. This patent concerns ordering contact lenses so it incorporates a step of obtaining a prescription. Also, it is not clear that the lenses are automatically manufactured.

A number of companies offer web design and ordering of custom clothing. Dynamic Team Sports of Downington, Pa. and Neuedge Sports of Sinking Spring, Pa. use sublimation transfer printing. DesignAshirt of Tempe, Ariz. and Customink of McLean, Va. use screen printing. CafePress of Foster City, Calif. use different methods of printing depending on the products ordered. However, each of these companies' systems needs a human to translate what is entered in the computer into a form that can be used in actual production to print the decoration on the garment. It is easy to introduce human errors at this step.

Development of a system which can automatically translate customer input into instructions that can be transmitted directly to the printer without human intervention represents a great improvement in the field of garment decoration and satisfies a long felt need of companies that provide custom clothing.

SUMMARY OF THE INVENTION

The present invention is a system for automated decoration of an item comprising the steps of:
providing an input system (such as a web site);
providing print generating software;
providing a computer with a memory (a server);
providing a fabric printer;
installing the print generating software on the computer;
installing an electronic library of templates on the computer; each of the templates being a pattern for a garment item and having locations specified for application of decorations;
linking the input system to the computer;

allowing a customer to select one or more items (customer selection) via the input system;
selecting the appropriate templates for said items;
allowing the customer to specify decorations (customer specification) for the item via the input system;
electronically laying out said decoration on said template with said print generating software;
generating a print image for the item from the customer selection and specification with the print generating software; and
sending the print image from the computer to the printer.

The item may be an item of clothing such as pants, shorts, a shirts or a jacket.

Customer specification includes: colors, color placement, graphics, graphic placement, text, text style, text placement, player name, name placement, player number, number placement, size and quantity.

The decorations are placed on the template at predefined anchor points. There are two kinds of anchor points: fixed and relative. The positions of fixed anchor points are invariable while the positions of relative anchor points will vary in relation to a nearby fixed anchor point. The distance of the relative anchor point to its related fixed anchor point is the sum of the predefined distance plus the height of the decoration placed at the fixed anchor point. The direction of movement is also predefined and can be above, below, left, right, above right, above left, below left, below right, etc.

Generating the print image comprises the steps of:
coloring the template according to the customer specification; and
placing the graphic, the text, the name and the number on the template according to the customer specification.

The template is also displayed as a completed garment in the input system. The input system allows viewing of the completed garment from several different angles.

Single piece printing comprises the steps of:
cutting the pieces from the fabric;
loading the pieces into the printer;
printing the print image onto the pieces; and
sewing the pieces together to form the item.
Roll printing comprises the steps of:
creating a print marker for the pattern;
creating a cutting marker for the pattern;
loading the fabric into the printer;
printing the print image onto the fabric;
cutting the pieces; and
sewing the pieces together to form the item.
Preferably printing done by the dye-sublimation printing process.

The system may also include the steps of:
saving the print image in the memory;
assigning a retrieval code to the print image; and
allowing the customer to perform customer selection and specification again by inputting the retrieval code to the input system.

The system may include provisions for printing the retrieval code on the garment.

The system may also include provisions to allow the customer to modify the decoration specification after the retrieval code has been entered.

An appreciation of the other aims and objectives of the present invention and an understanding of it may be achieved by referring to the accompanying drawings and description of a preferred embodiment.

BRIEF DESCRIPTION OF THE DRAWINGS

FIG. 1A is a detailed flowchart of the first aspect of system of this invention.

FIG. 2 is a screen-shot of the Home Screen for the system, where customers are able to log in.

FIGS. 29A and 29B graphically illustrate the definition of anchor points for all the text and graphics that can be applied to a garment.

FIG. 33 is a screen shot of team name placement.

FIG. 35 is a screen shot of player name and number placement from the rear.

FIG. 36 is a screen shot of the roster page with the rear of the first player shown.

FIG. 37 is a screen shot of the roster page with the rear of the second player shown.

FIG. 41 is an example of a definition for a fixed anchor point for a template.

FIG. 42A demonstrates the parameters for moving a relative anchor point when an element is placed in a fixed anchor point above it.

FIG. 42B demonstrates the parameters for placing a relative anchor point when no element is in the fixed anchor point above it.

DETAILED DESCRIPTION OF THE PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

This invention will be described in relation to a system for ordering custom sports uniforms. Those familiar with the art to which this invention pertains will recognize that this invention can be used with any item that can be decorated including flags, banners, pennants, and purses, and clothing of all types including athletic uniforms, t-shirts, jackets, boxer shorts, ties, handkerchiefs, scrubs, bandannas and aprons.

Figure 1:
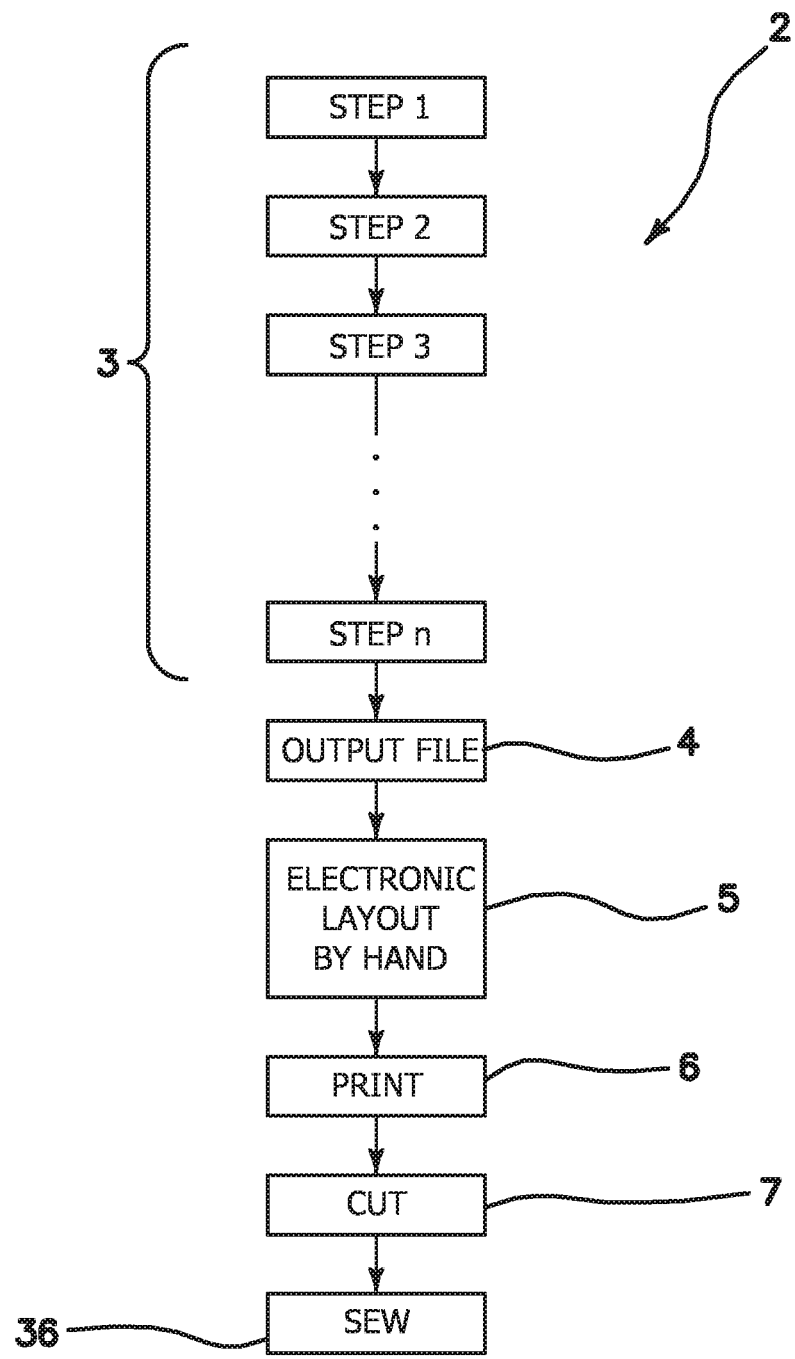
FIG. 1 is a flowchart of the prior system.

FIG. 1 is a flowchart of prior art systems 2 (referenced as system 2 or systems 2). In such systems 2 the user makes input process 3 to the system 2. There are typically several steps to the input process 3 (referenced as process 3). Then an output file is generated 4. The output file may be electronic but typically is printed. The output file contains information about the garment the user wants and all the options that the user has specified about its size, coloring and decoration. This information is passed along to a graphic artist who lays out 5 the coloring and decoration on a pattern for the selected garment in the selected size. The layout process may be accomplished electronically. A print file is generated from which the garment is printed 6 on the desired fabric with a fabric printing machine. Finally, the cloth is cut 7 along the outline of the pattern and the pattern pieces are sewn 36 together to form the finished garment.

As can be appreciated, this is a time consuming and complex process. Also, because the user has no clear picture of the result, the finished garment may not meet expectations. Further, because a human being has to translate user specifications into graphics files the process is prone to error.

Figure 29C:
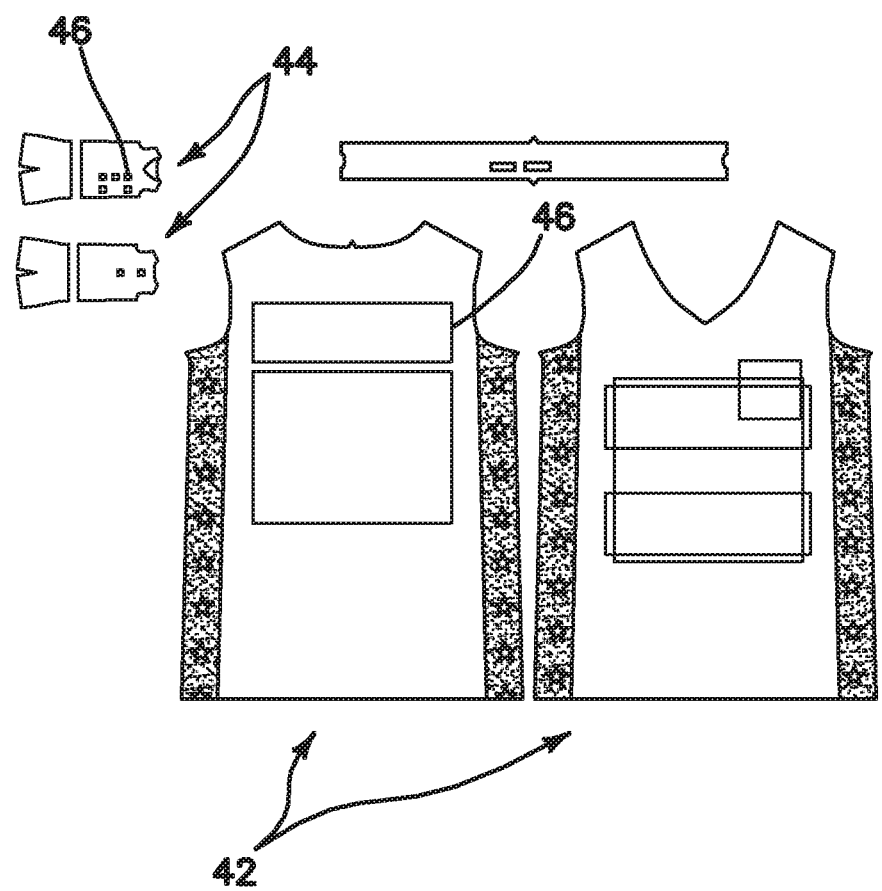
FIG. 29C illustrates the garment plate and the garment thumbnail showing all available anchor points.

FIG. 1A is a detailed flowchart of a first aspect this invention 10. In this invention at the first step, the user selects a desired garment style and design 12. When this selection is made, the system obtains a pattern template 13 from a library of pattern templates stored in the computer memory. The template is the outline for all the pattern pieces necessary to make the desired garment in the desired size. Laid out on this template are all the areas to which various colors may be applied to the garment and locations or anchor points for the decorative elements that may be applied. While the template is typically in electronic form, a graphic representation of it is shown in FIGS. 29A-29C.

Next proprietary software assembles the pattern pieces electronically and places the garment on a model displayed on the web site so that the garment drapes completely naturally. The first display 14 is devoid of coloring and decoration. See FIG. 8. But as each step of the process 3 is completed the desired colors and decorative elements are laid out 15 on the template and the garment on the model changes to reflect the latest choice of the user. This can be seen on FIGS. 9-25 and 28.

At any step of the process 3, the user has the option to save 40 the design and have a retrieval code assigned 17. At any step of the process 3, the user has the option to send the currently defined design for printing 6, cutting and sewing 36. At the final step n of the process 3, the design is saved 40 and a retrieval code is assigned 17 before the design is sent for printing 6, cutting 7 and sewing.

Figure 1B:
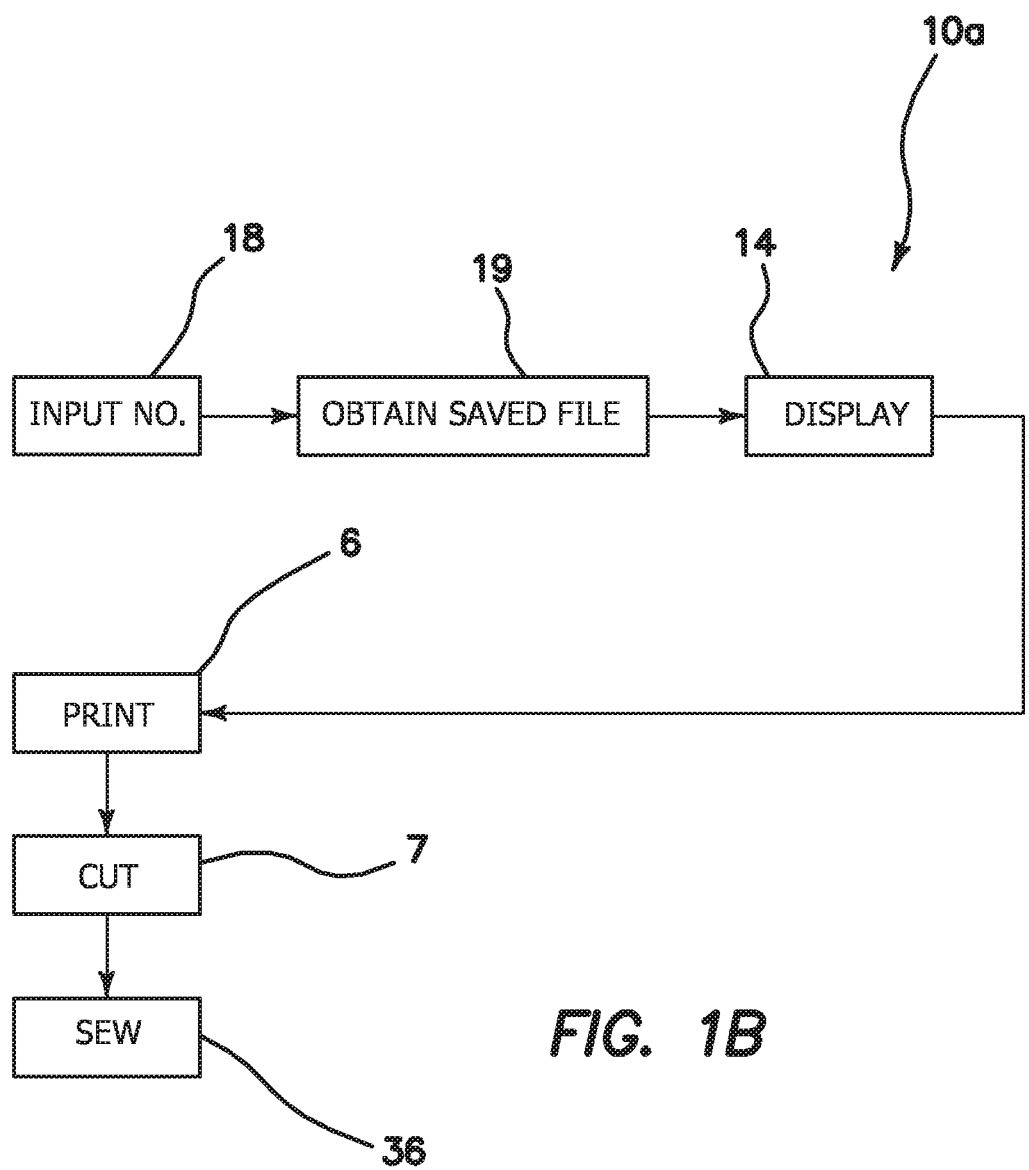
FIG. 1B is a detailed flowchart of the second aspect of the system of invention.

FIG. 1B is a detailed flowchart of a second aspect this invention. In this aspect, instead of going through all the steps in the process 3, the user simply enters the previously assigned retrieval code. See FIGS. 2-3. The system then opens the previously saved design file 19 and displays it on the model. See FIG. 25. If no changes are necessary, the user simply specifies the quantities of each garment(s) desired (see FIG. 26) and sends the file for printing 6, cutting 7 and sewing 36.

Figure 1C:
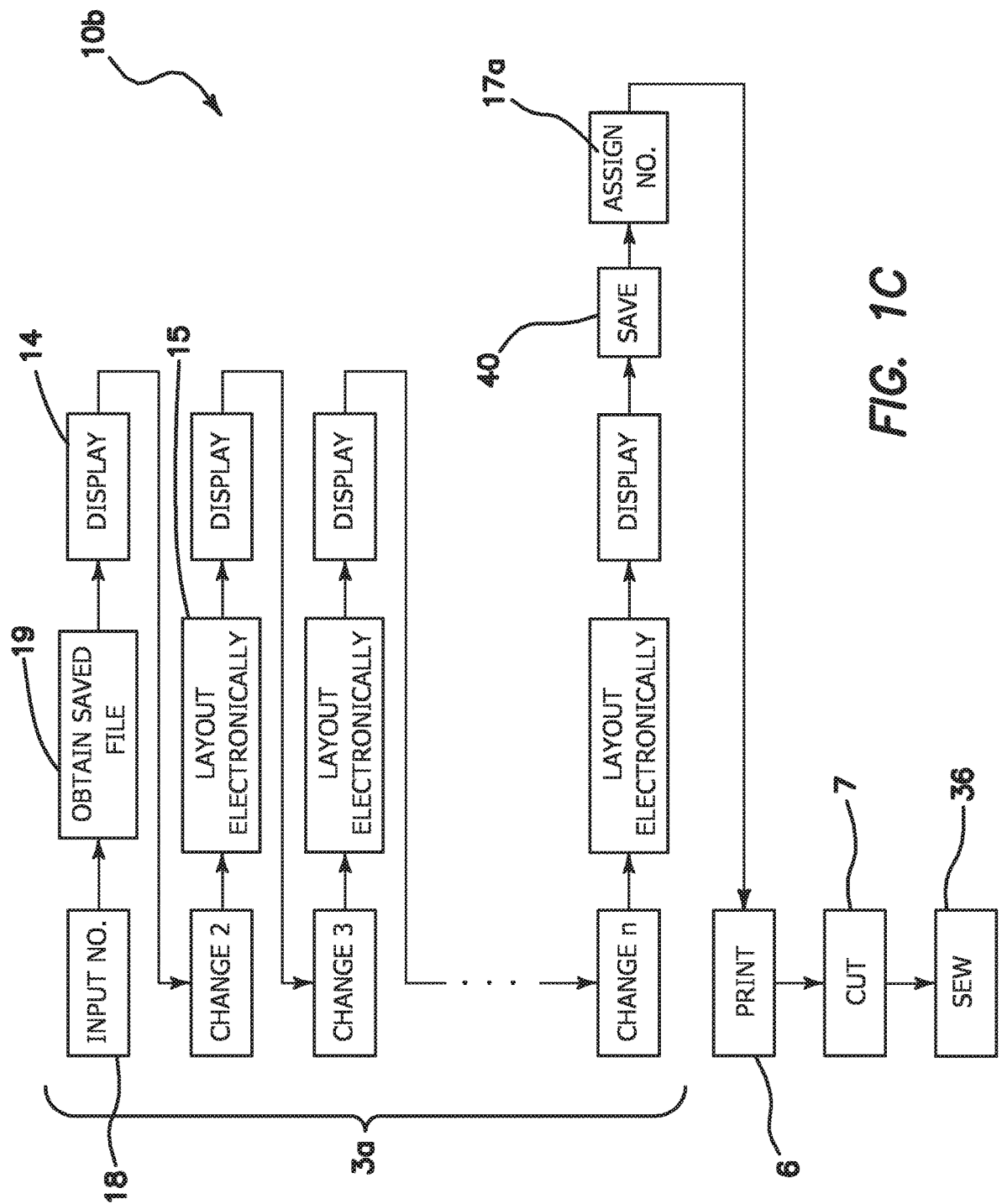
FIG. 1C is a flowchart of an alternate embodiment of the second aspect of this invention.

Alternatively, as shown in FIG. 1C, the user can make changes 3a to the prior defined design. Changes are usually adding a name and number to the roster but can include changes in color and other decorative elements. These are electronically laid out 15 and displayed 14 as before. As before, at any step of the process 3a, the user has the option to save 40 the design and have a new retrieval code assigned 17a. Also, at any step of the process 3a, the user has the option to send the currently defined design for printing 6, cutting and sewing 36.

As can be seen by comparing FIG. 1 with FIG. 1A, there are massive differences between the prior art system 2 and the instant invention 10. The first difference is that no human intervention 5 is required in the instant invention 10. Instead, layout is achieved electronically, at each stage of the process 3. Thus there is no possibility of the introduction of errors in production of the desired garment. The second difference is that the prior art systems 2 have no provision for assigning a retrieval code. Thus, if a user desires to order more of a previously ordered garment the user must go through all the steps of the specification process 3 again. If the user does not remember the prior specification or has not made a record of it, the prior garment may not be properly duplicated.

Figure 1D:
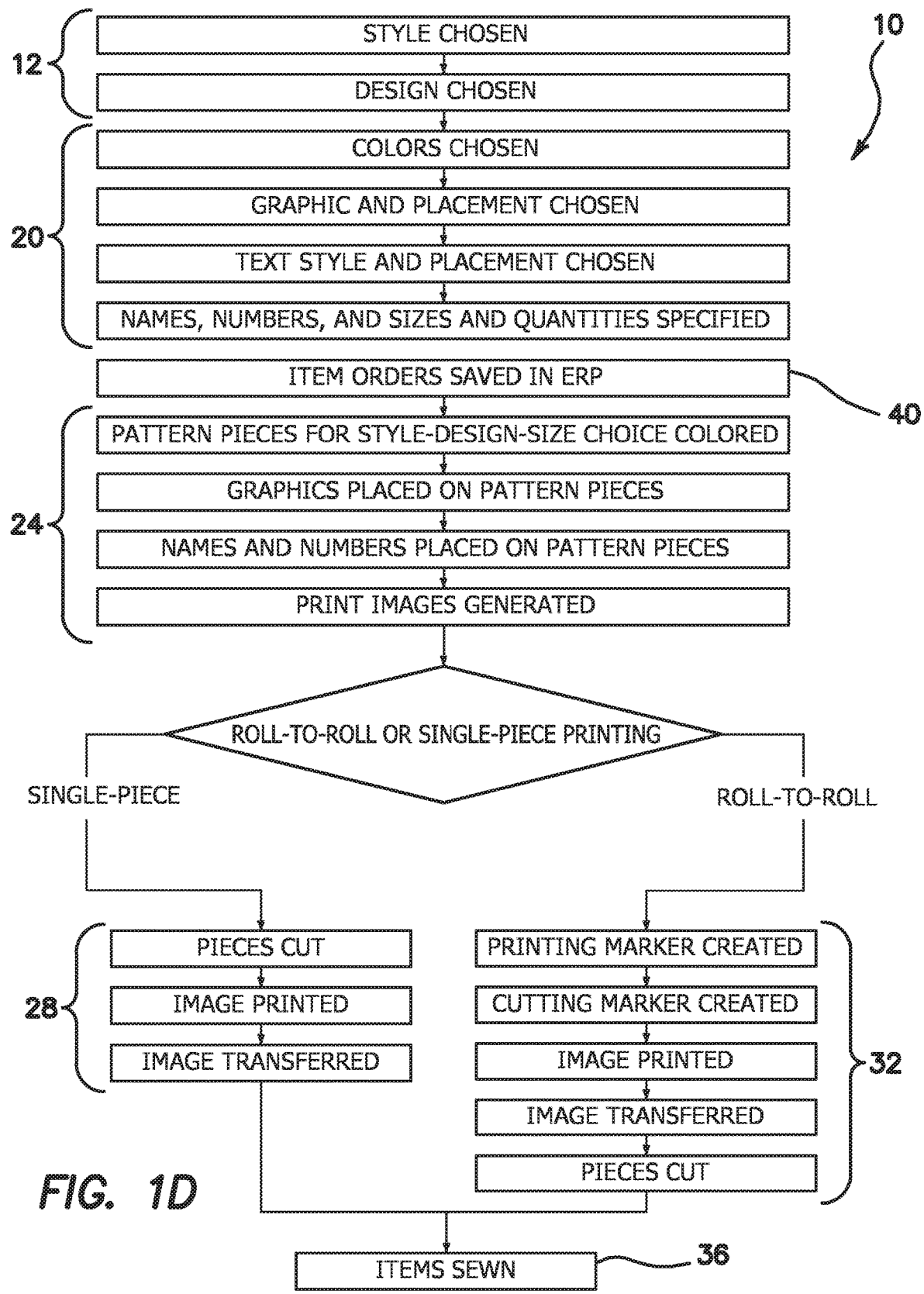
FIG. 1D is an alternate flowchart of the system of this invention.
Figure 40:
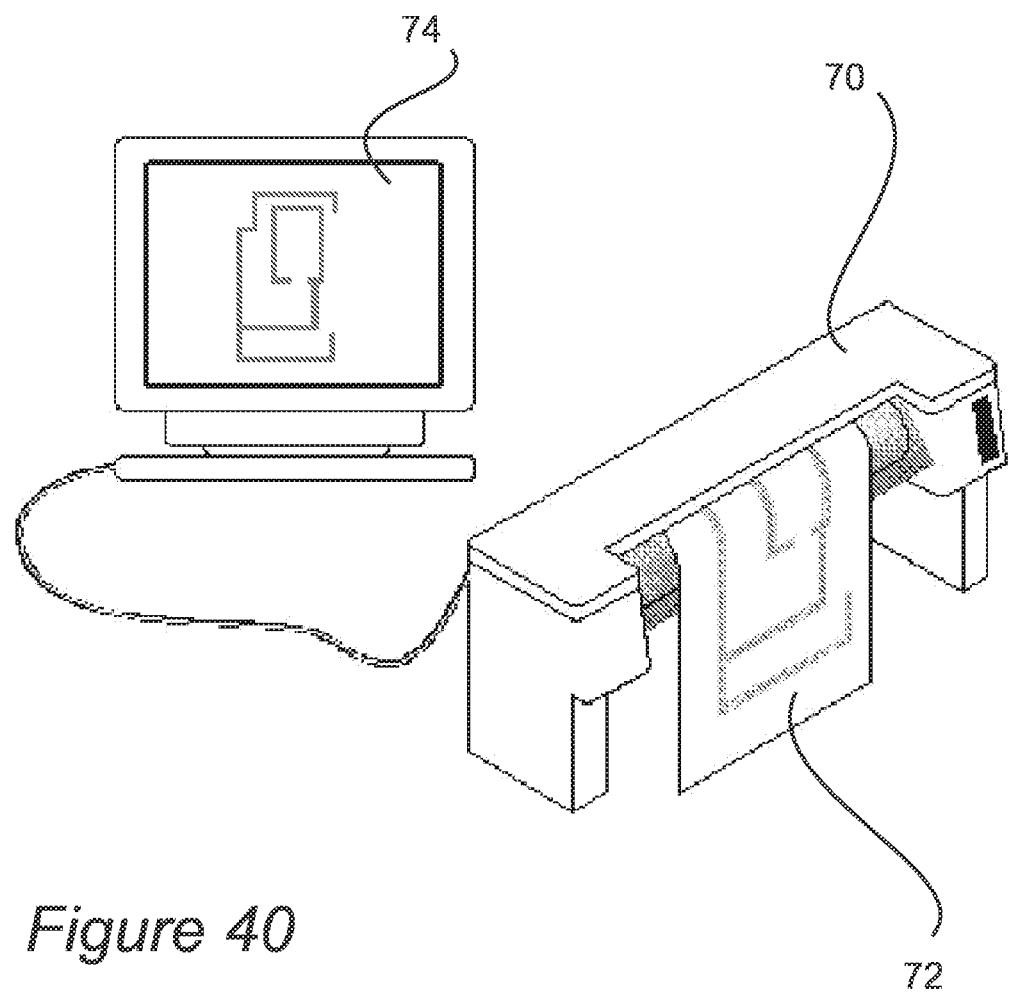
FIG. 40 is a sketch of a printer useful for this invention attached to a control computer.

FIG. 1D shows a flowchart for the automated decoration system 10 of this invention in a different way. This invention includes a server, which is a computer with a memory, and a web site. Exemplary input screens of such a web site are illustrated in FIGS. 2 through 28. The system also includes special print generating software, installed on the computer 74, and a machine 70 for printing fabric 72, connected to the computer 74. Preferably the printer 74 uses the sublimation ink printing process. See FIG. 40.

A database of templates, graphics, fonts and colors is maintained by the software on the server. This database is made available to the print generator and is used for production, fulfillment and content management. The color library stores the standard values and the calibration information for each color/fabric combination used for custom items. The database stores the names and locations of the pre-made graphics and the rules for customizing those (e.g. coloring). This includes customer-uploaded graphics and colors each of which are associated with an appropriate user account.

A template is the pattern for a garment plus decoration that can be applied. Templates are prepared for each design and size that will be offered in a particular style. This template includes the flat parts of the garment with the design applied in arbitrary colors and visual references for graphic and lettering placement. The template the pattern parts pre-arranged for printing to minimize paper utilization. See FIGS. 29A-29C

The decoration is the uncolored outline of the shapes to be printed on the garment, the rules for coloring those shapes, the rules for choosing and placing graphics, and the rules for choosing and placing lettering and numbering. Each template can have many decorations applied and therefore be used to create many different custom garments. See FIG. 29A-29C.

Colorable regions are associated with names and lists of allowed colors in the software. These are named in a common way across all designs, such as "Primary Color", "Secondary Color", "Accent Color", etc.

Lettering options include placement and orientation (e.g. horizontal or arched) plus font and color options, including the maximum allowed size. Graphic options also include placement definition and allowed size options. See FIGS. 29A-29C.

A "live image" is presented on the web site at each step of the user input process. The live image is a realistic image which gives the customer a feeling for what their final finished garment will look like on a photograph of a model. Included is the ability to look at images from various angles. This image will be rendered with each choice the customer makes to provide a live configuring experience. The source images are at least of the resolution required by the user experience software. See FIGS. 8-24.

Thumbnail and other user interface (UI) images are small, line-art type images which are shown in a list format with other designs or as an alternate view while designing. These images are colorized like the live image. The source images are at least of the resolution required by the user experience software. Thumbnail images can be seen on FIGS. 13, 14, 21, 26, 27, 29A, 29B and 29C.

The print image is the full-size image that; when transferred to cut pieces and sewn, will produce the garment the customer created on the web site. A print image is illustrated on FIG. 30.

Packaging and email confirmation images are images sent in an email to customers and printed onto a custom packing slip to show the custom garments that are in the carton.

A graphic is an image that can be applied as a logo on a specific anchor point. Size classes are defined (such as small, medium and large) and each anchor point has certain sizes that are allowed. This includes system graphics that will have colorable regions for a customer to specify, some of which will have text attached to them that can be specified, also. This also includes customer-uploaded artwork that will be prepared so that the customer can apply it to a garment.

The pre-production image is the stock image that will be customized. It is in arbitrary colors, at a sufficient resolution to support the final application of that particular image type.

Pre-production image preparation is the process of preparing the image for customization. This includes defining where the boundaries are between colorable regions and where the anchor points are for graphics and lettering.

Print images have very precisely defined colorable regions and anchor points specified, based on distances from garment features such as the edges of a cut piece and the arbitrary-color design drafted on the piece.

Photographic images are also prepared to properly render the web site images with graphics and lettering appearing in 3D and colors applied with proper lighting.

Pre-production design rules contain information that defines regions to be colored and the allowed locations for graphics and lettering. This serves as both a specification for the image preparation step as well as content management for the UI.

Figure 2:
Figure 3:
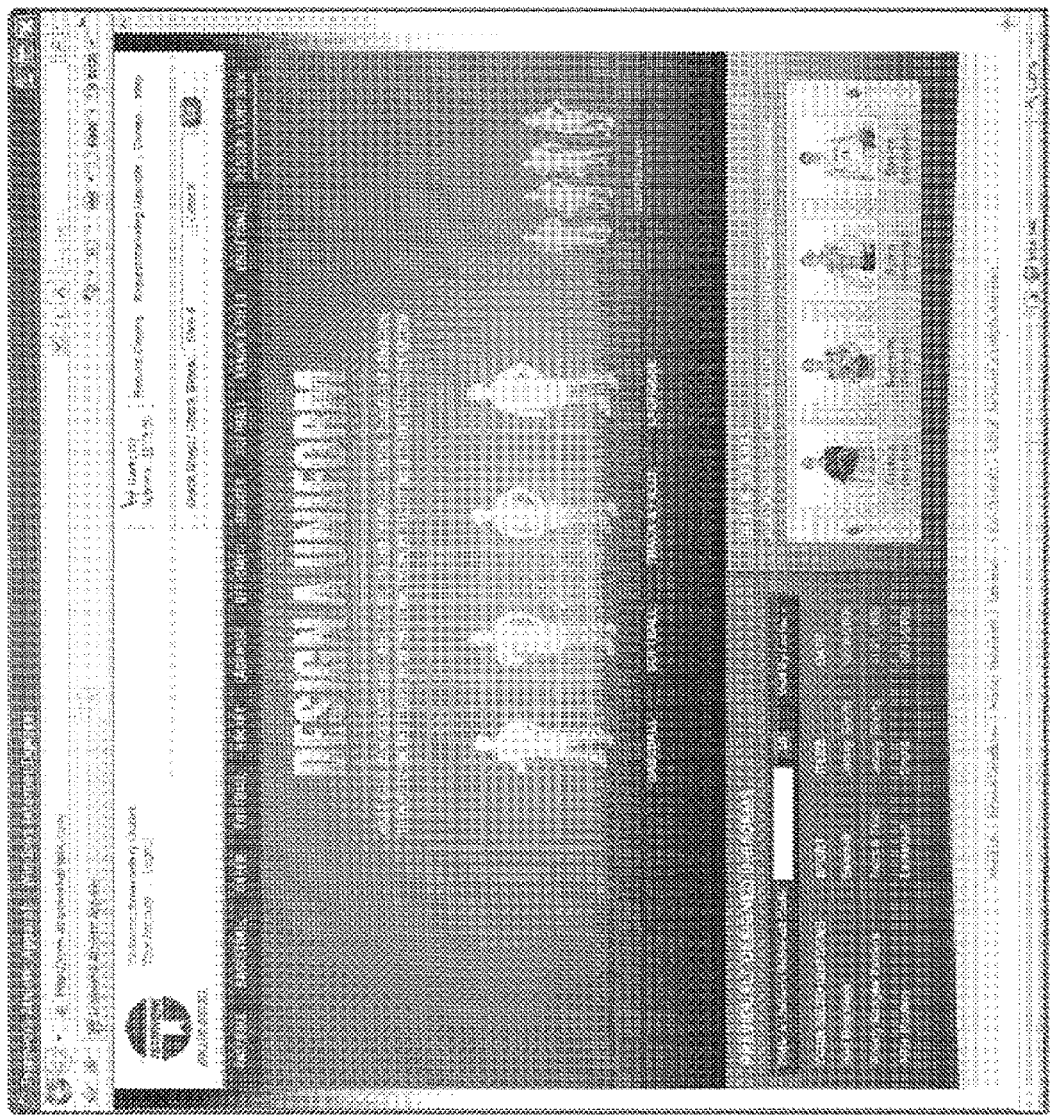
FIG. 3 is a screen-shot of one version of the Design a Uniform Entry Screen for the system.
Figure 4:
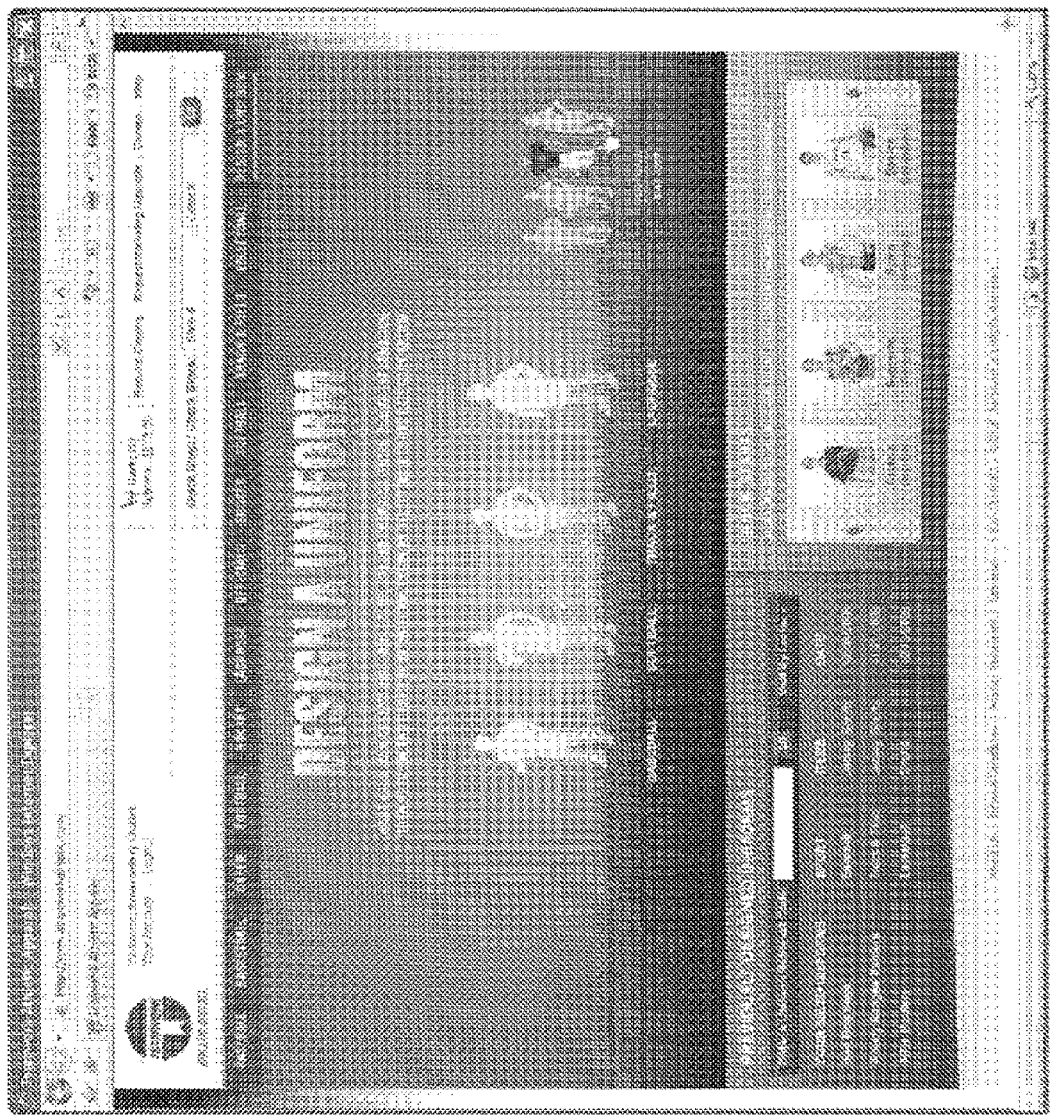
FIG. 4 is a screen-shot of the Screen of FIG. 3, illustrating how a uniform outline fills in as the cursor rolls over it.
Figure 5:
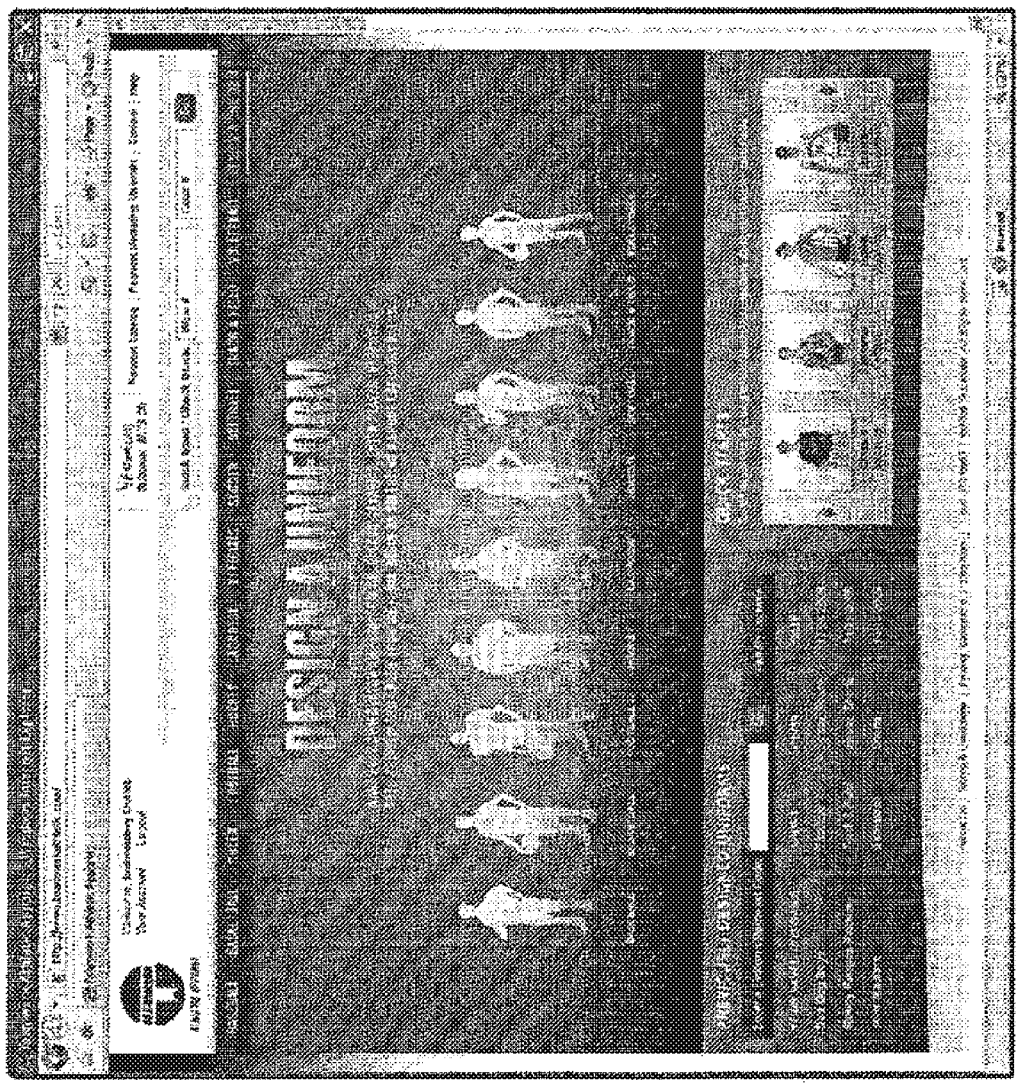
FIG. 5 is a screen-shot of another version of the Design a Uniform Entry Screen for the system.
Figure 6:
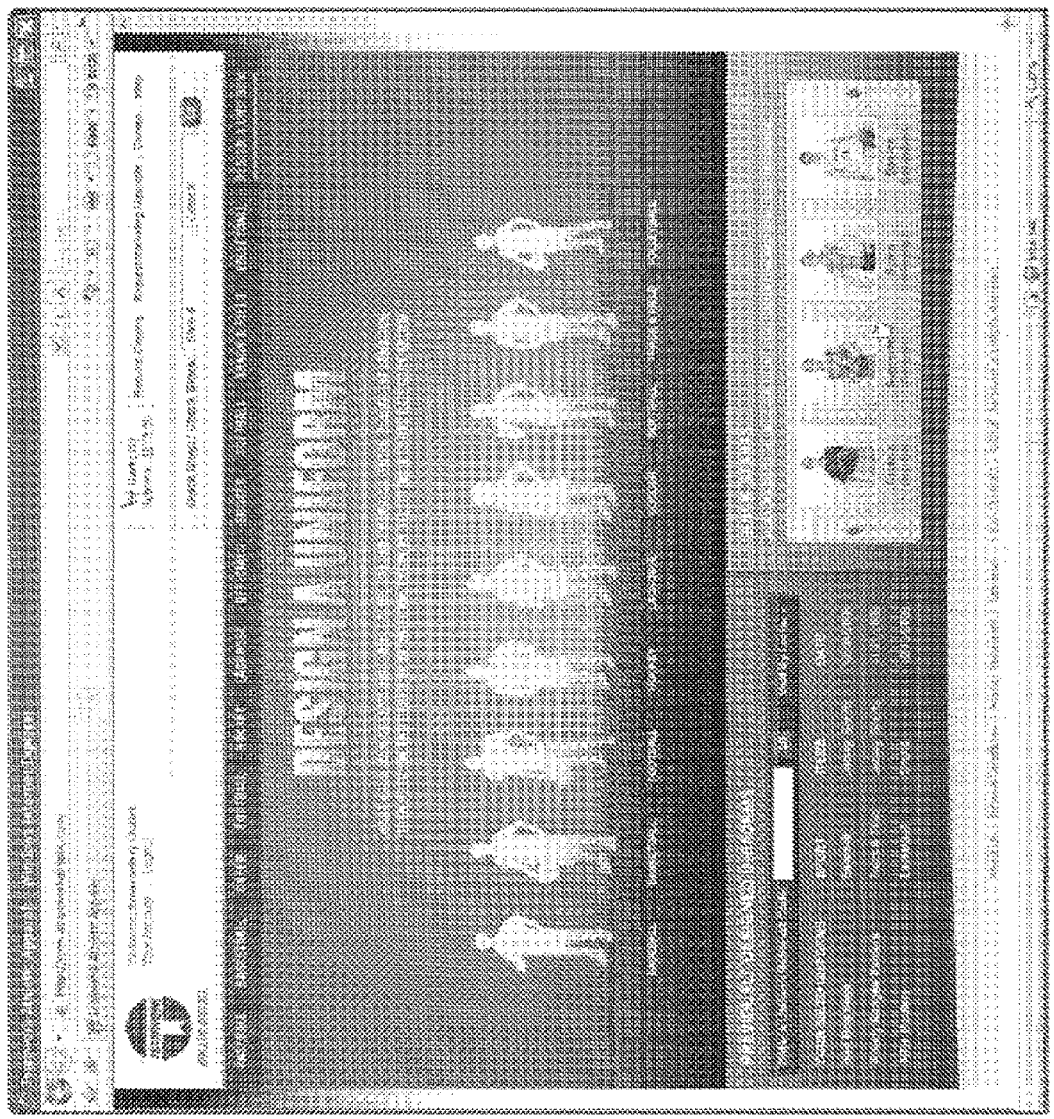
FIG. 6 is a screen-shot of Screen of FIG. 5 illustrating how a Quick Start uniform fills in as the cursor rolls over it.
Figure 7:
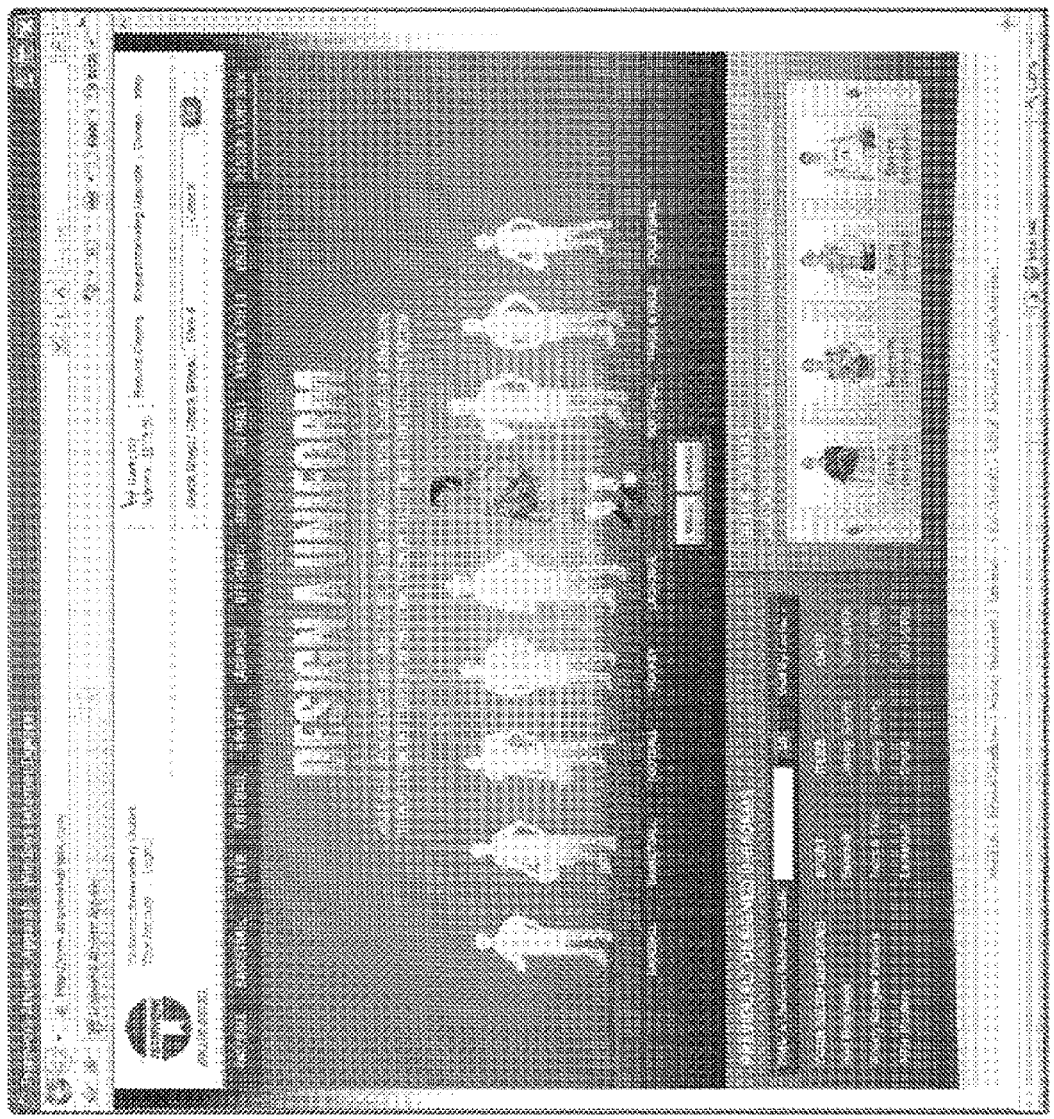
FIG. 7 is a screen-shot of the Screen of FIG. 5 illustrating how a uniform outline fills in as the cursor rolls over it.
Figure 8:
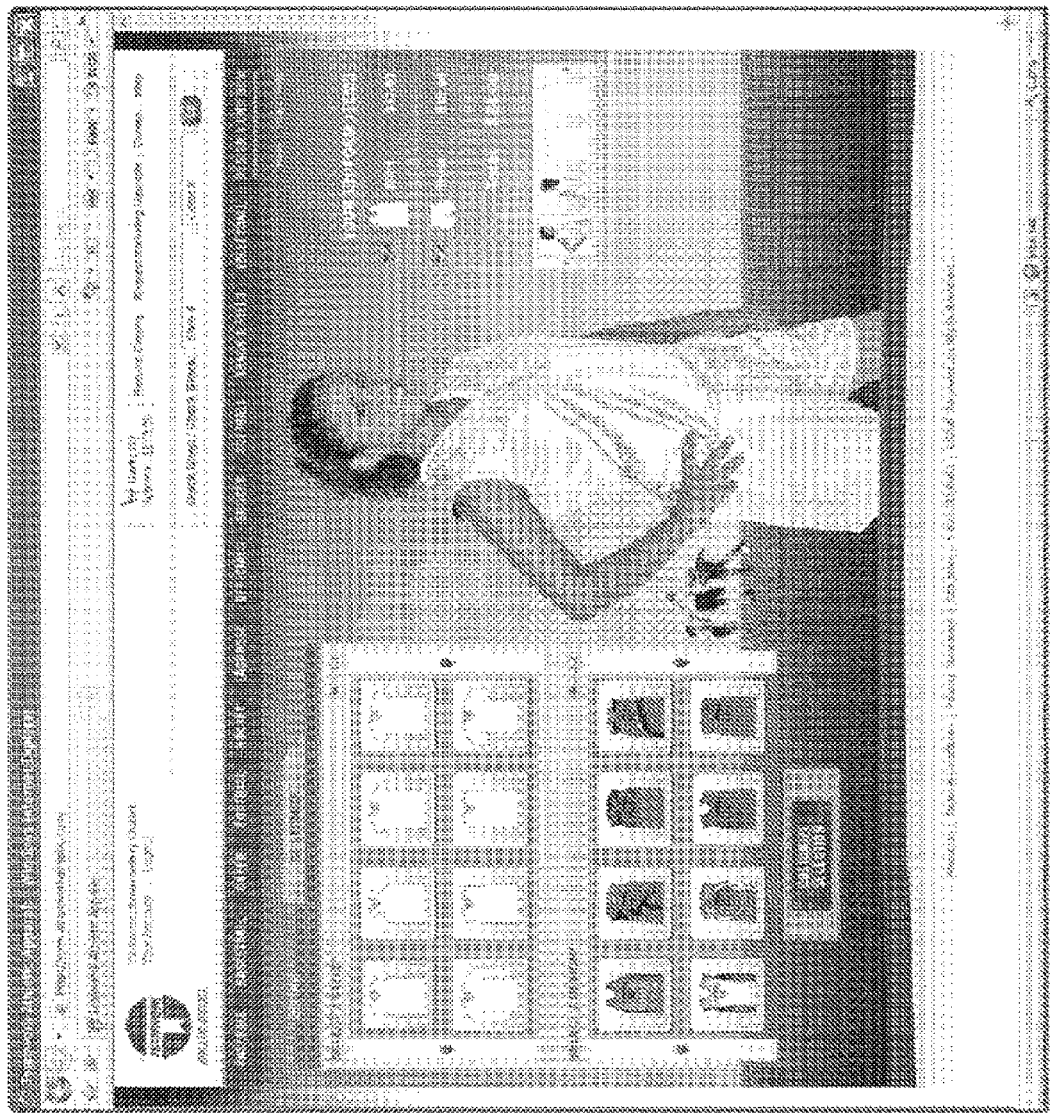
FIG. 8 is a screen-shot of the Define Style and Design Screen for the system.

Initially a customer logs onto the web site and selects a clothing item that he or she wants. FIG. 2 represents a typical home screen for the web site. FIGS. 3 and 4 illustrate one version of the first screen and FIGS. 5, 6 and 7 illustrate another version. All of these Figures have a top portion containing outlines of uniform types for the complete ordering process and a bottom portion for a quick or shortened ordering process. FIGS. 4 and 6, illustrate how the uniform outlines fill in as the cursor rolls over the outlines. This step 12 is called customer selection and comprises selection of the sport, and then the style and design for the clothing item. The item may be pants, shorts, shirts, jackets, etc. FIG. 7 illustrates what happens after a selection is made: the uniform fills in and a choice of male or female styles is offered. FIG. 8 shows the screen where the clothing style, e.g. sleeved or sleeveless is selected. Once a selection is made, the live image is updated so that the on screen model "wears" that garment. Of course at this step it is without decoration or color. Different views of the garment, on and off the model, can be seen by clicking on one of the thumbnail images in the box to the right of the model. When one is clicked the live image changes.

Then the customer specifies the decoration that he or she wants for the item. This step is called customer specification 20 and comprises colors and their placement, selection or uploading of a graphic, placement of the graphic, selection or uploading of an emblem, placement of an emblem, selection or uploading of text, specification of text style, specification of text placement, input of player names, name placement, input of numbers, and number placement. An emblem is a combination of a text and graphic in a special style.

Figure 9:
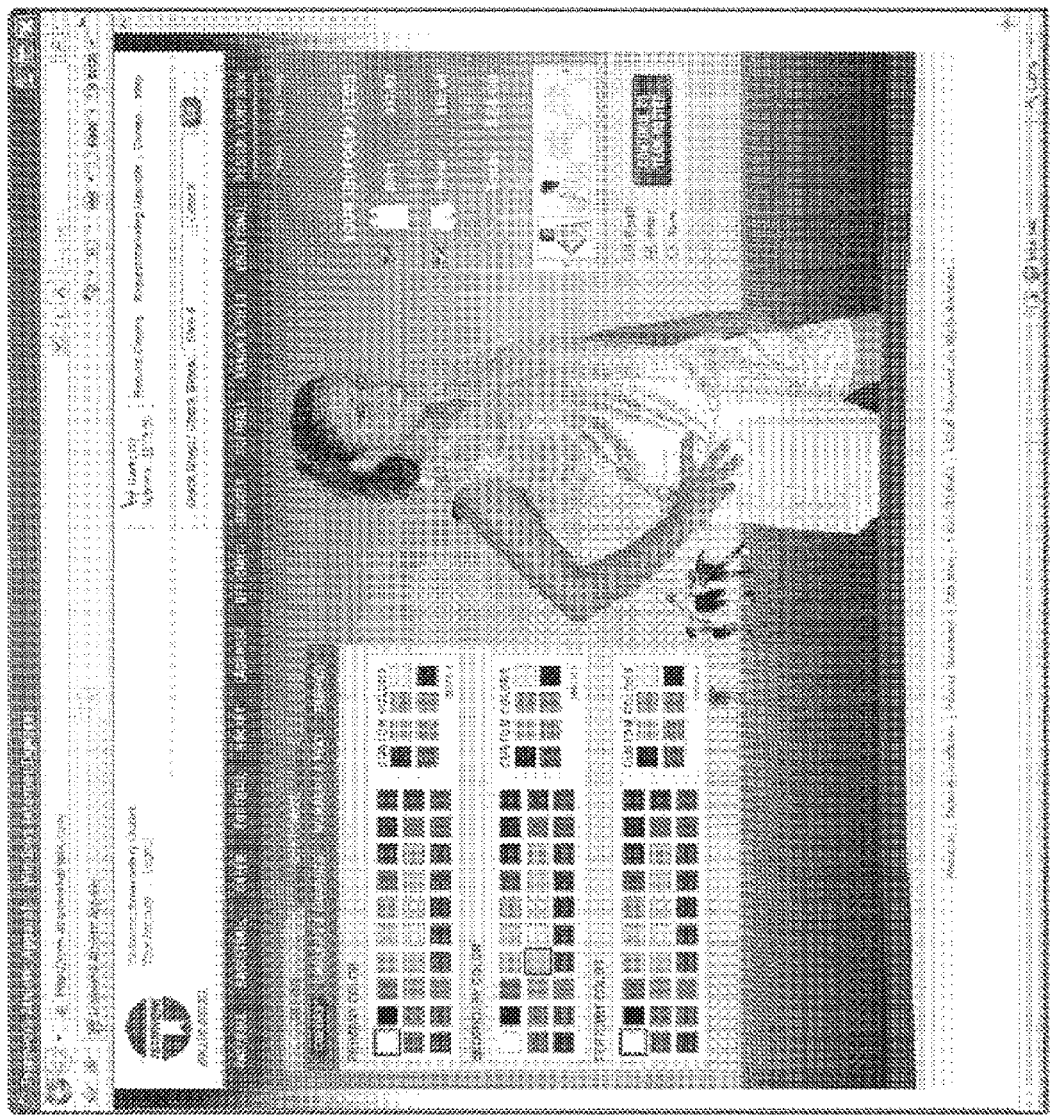
FIG. 9 is a screen-shot of the Customize Colors Screen for the system.
Figure 10:
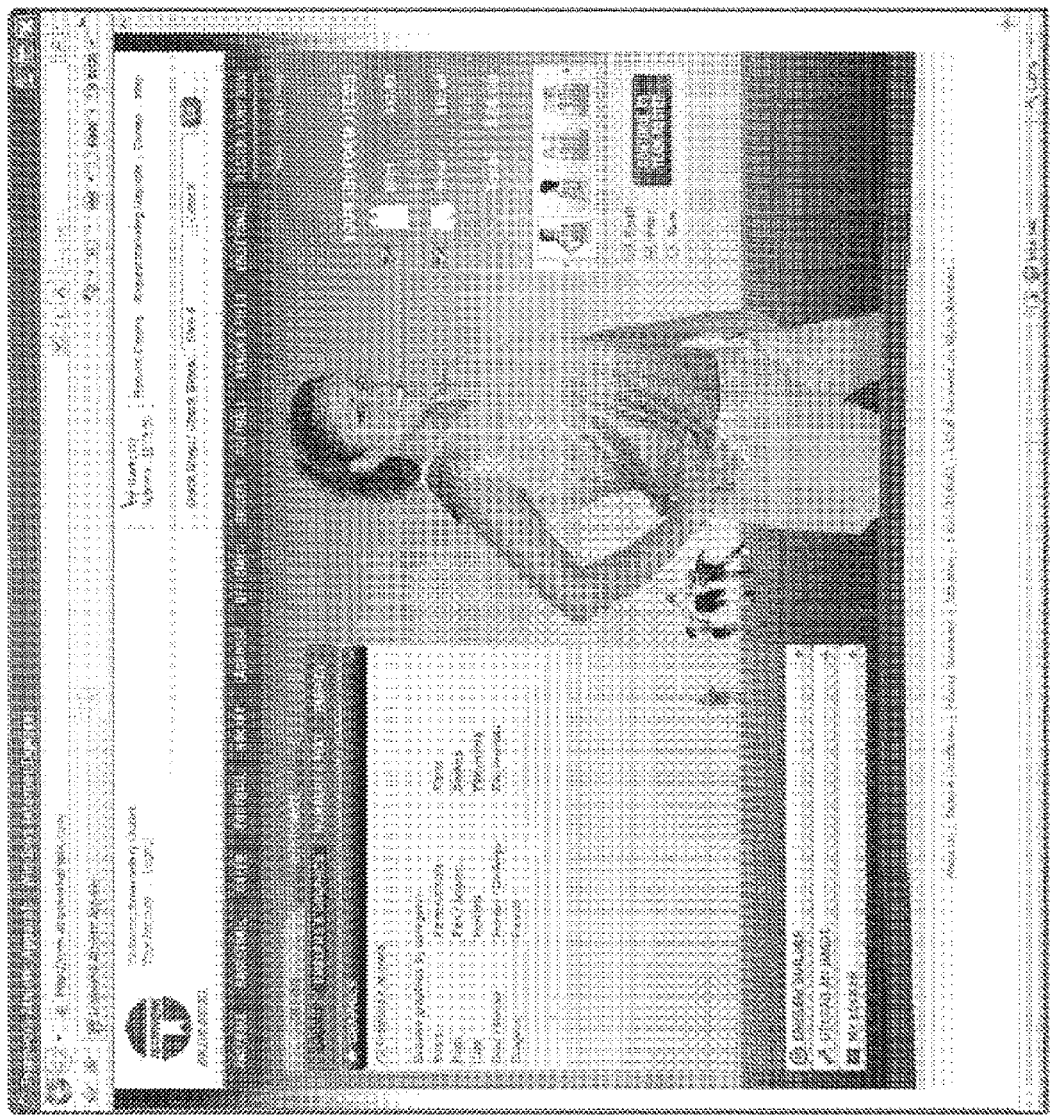
FIG. 10 is a screen-shot of the Graphic Categories Selection Screen for the system.
Figure 11:
FIG. 11 is a screen-shot of the Graphic Selection Screen for the system.

FIG. 8 also shows the first step in selecting a design for the garment. In this step the customer selects placement of colors in accordance with predefined templates. Once a selection is made, the template is applied to the garment on the model. FIG. 9 shows the screen for selecting colors to be placed in the various areas of the template. Once the colors are selected, they are placed on the appropriate areas of the garment. FIG. 10 illustrates the first screen where a graphic can be selected. This screen presents categories from which selection can be made. FIG. 11 shows typical choices that will be displayed when a category is entered.

Figure 12:
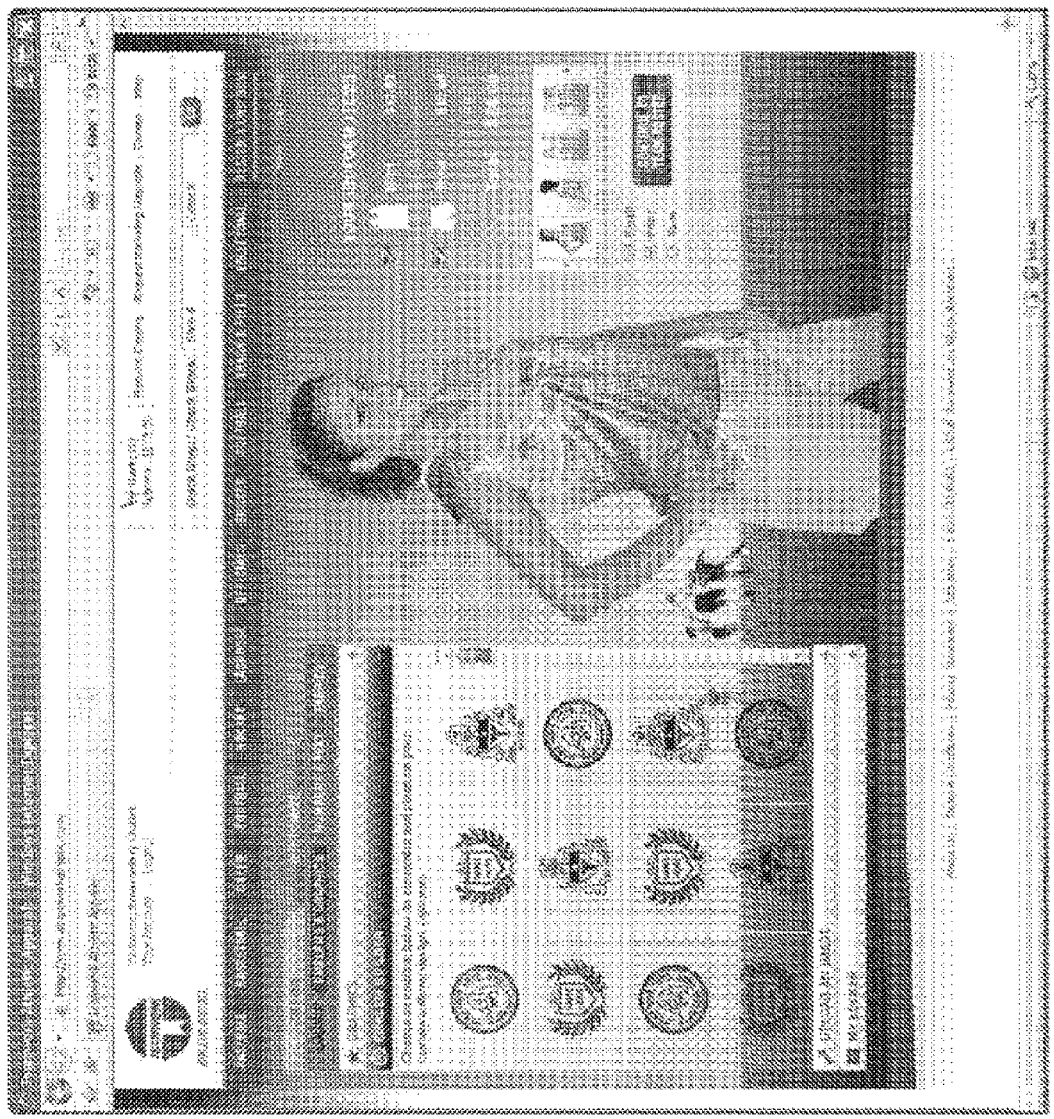
FIG. 12 is a screen-shot of the Emblem Template Selection Screen for the system.
Figure 13:
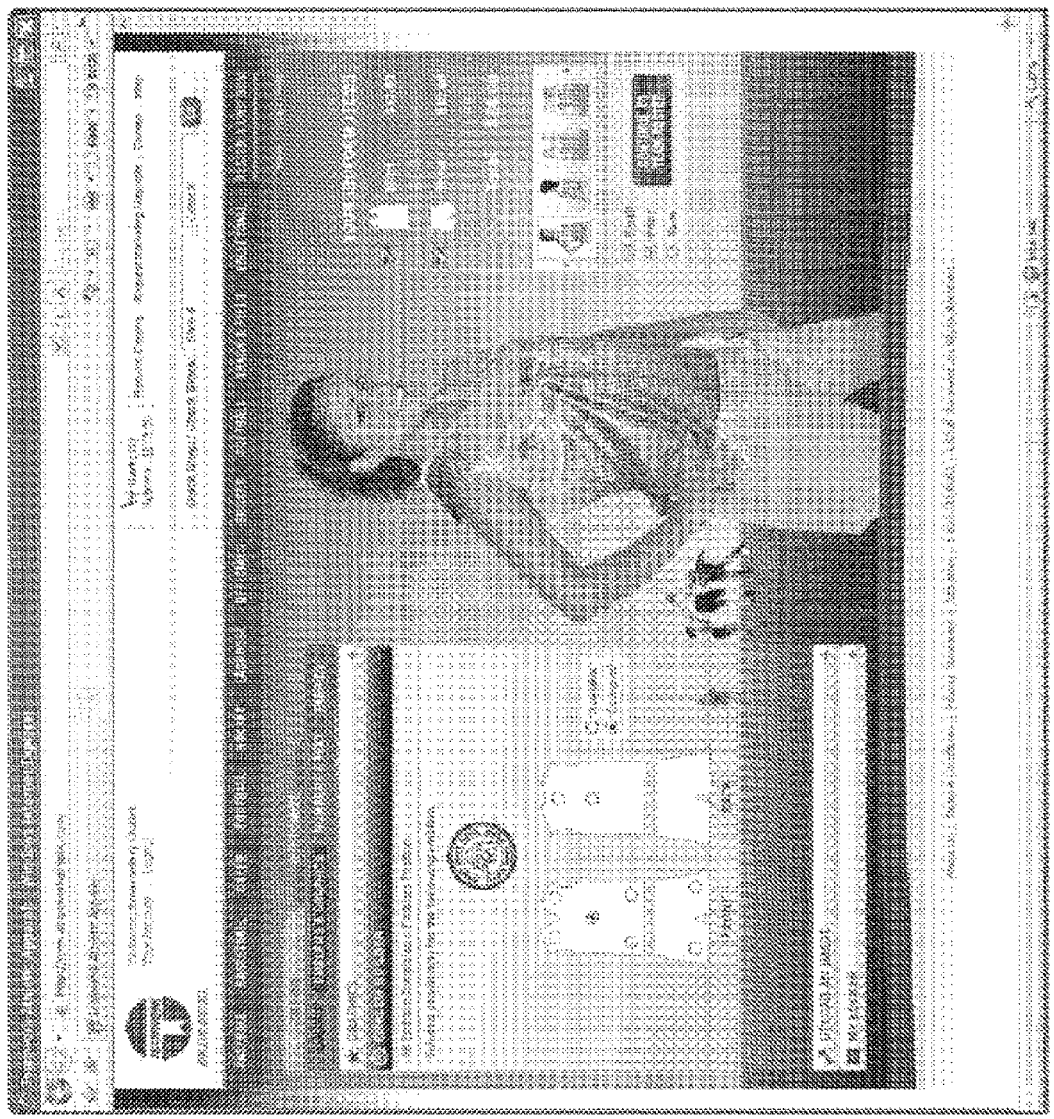
FIG. 13 is a screen-shot of the Select Emblem Position Screen for the system.
Figure 14:
FIG. 14 is a screen-shot of the Emblem Position Selected. Screen for the system.
Figure 15:
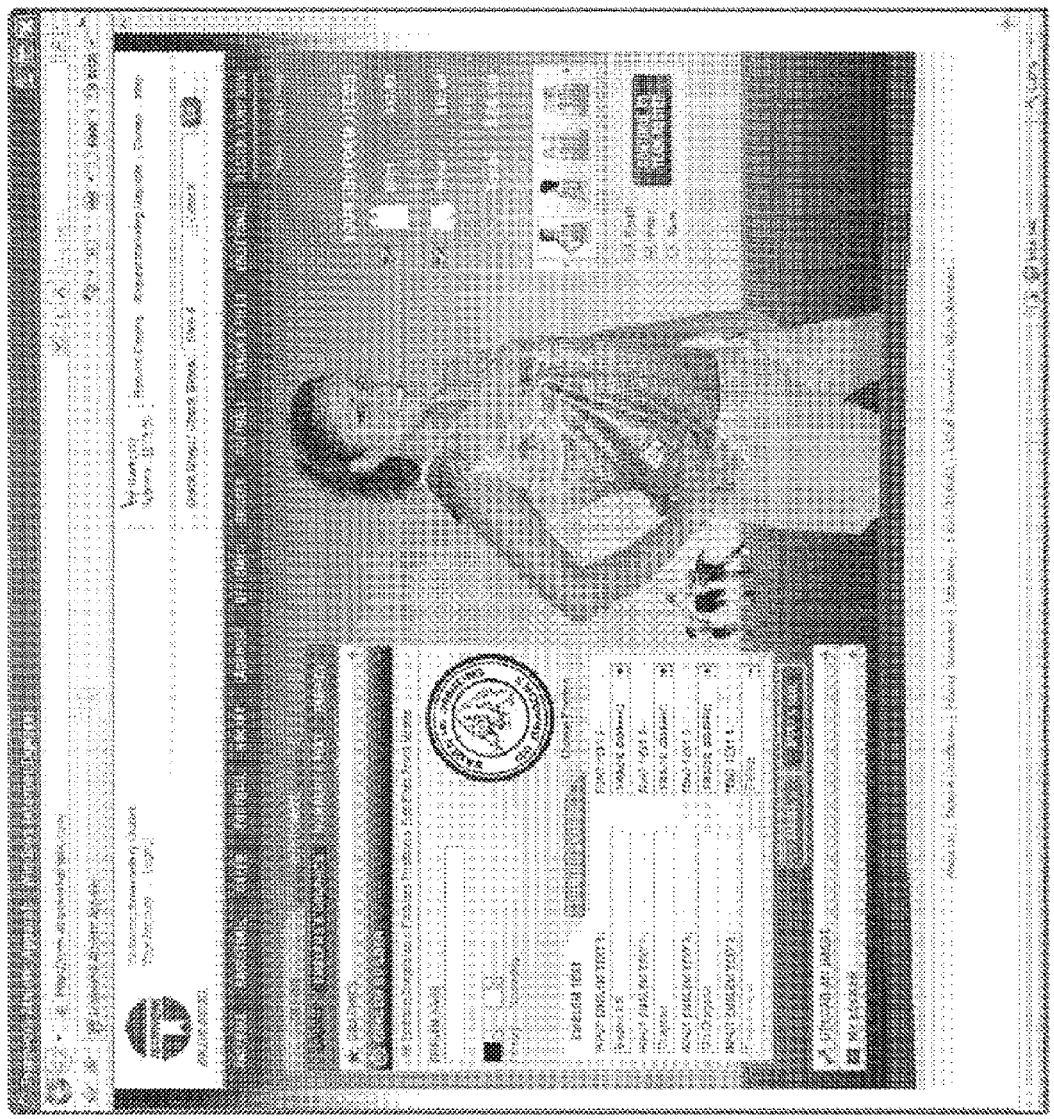
FIG. 15 is a screen-shot of the Emblem Edit Screen for the system.
Figure 16:
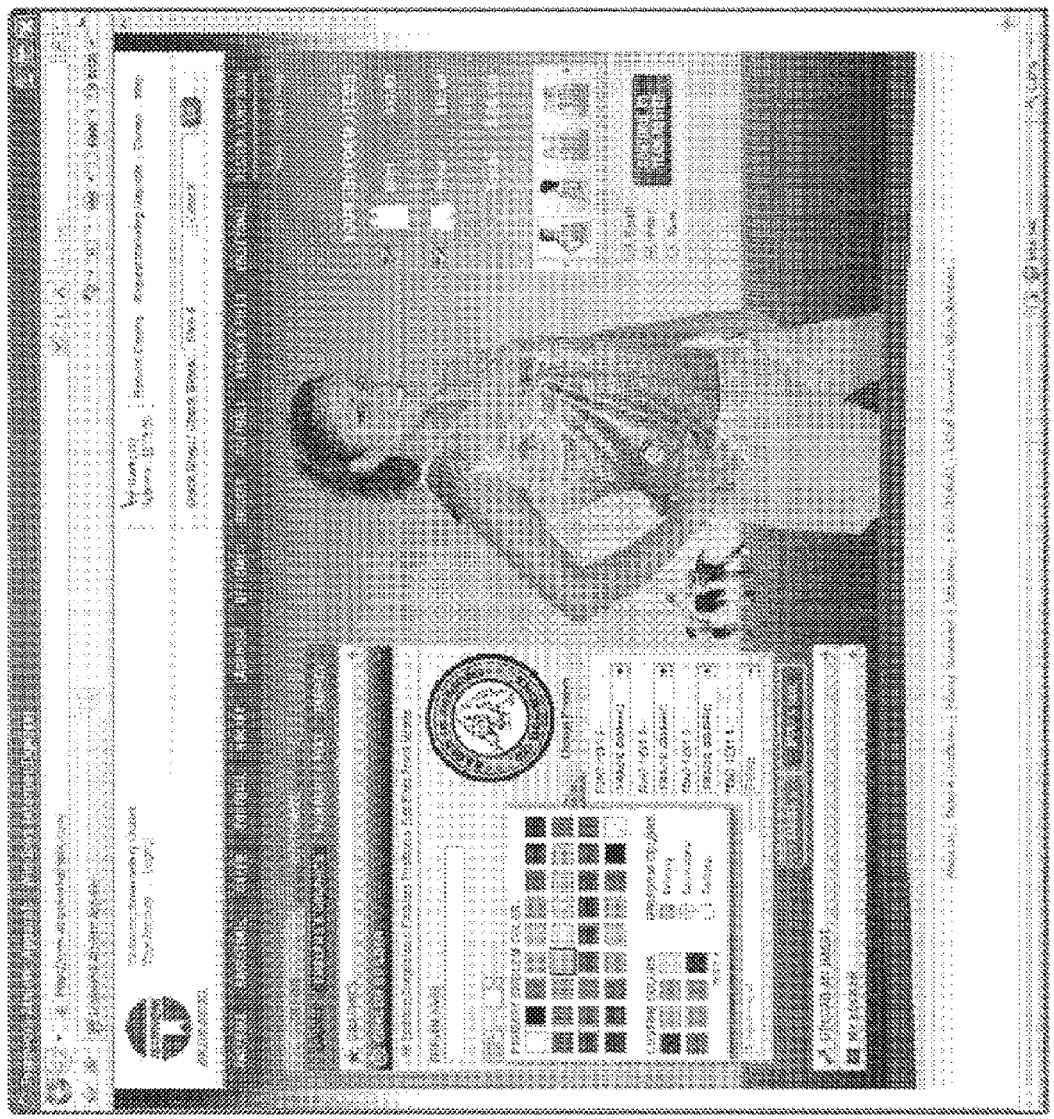
FIG. 16 is a screen-shot of the Emblem Color Edit Screen for the system.
Figure 17:
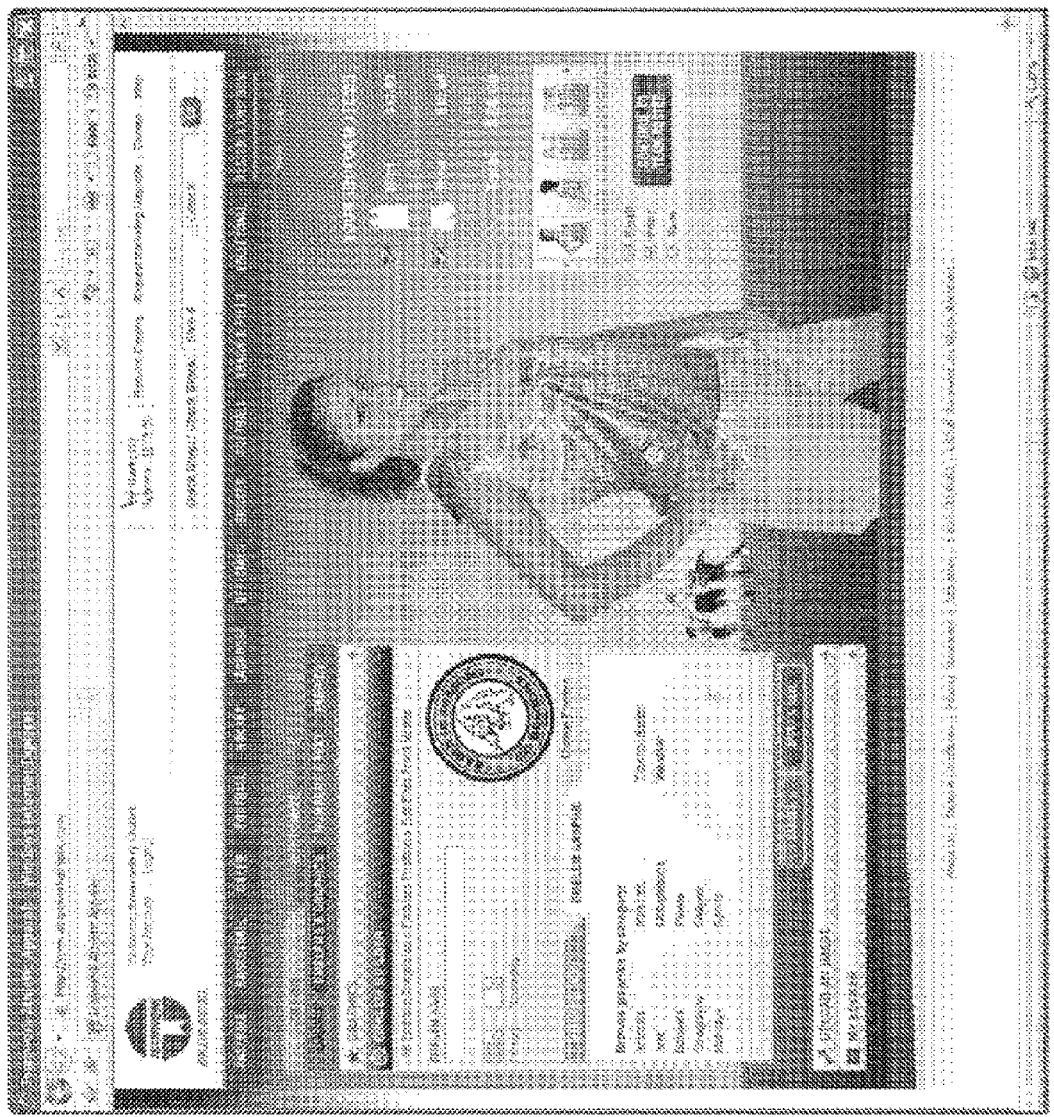
FIG. 17 is a screen-shot of the Emblem Graphic Categories Screen for the system.
Figure 18:
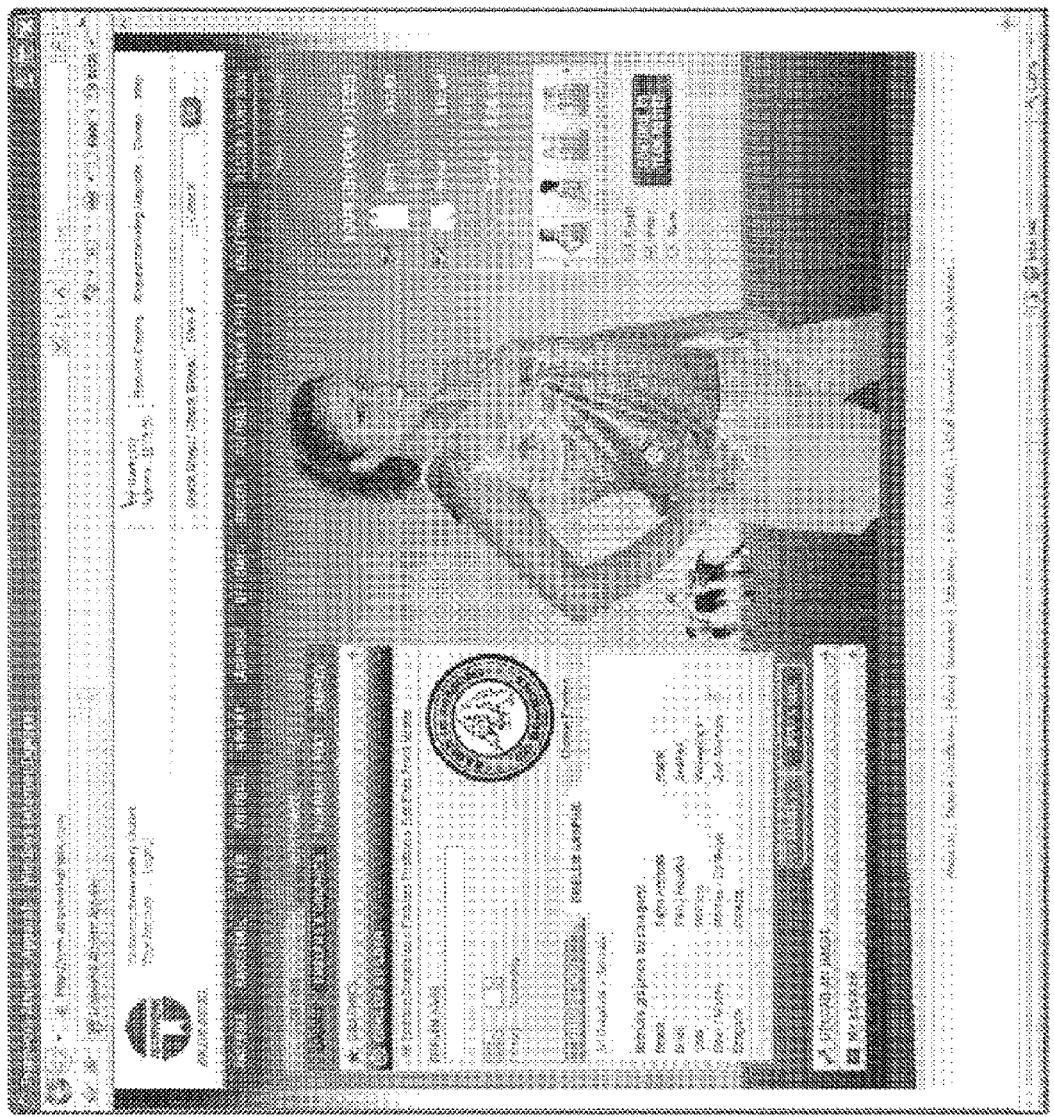
FIG. 18 is a screen-shot of the Emblem Graphic Subcategories Screen for the system.
Figure 19:
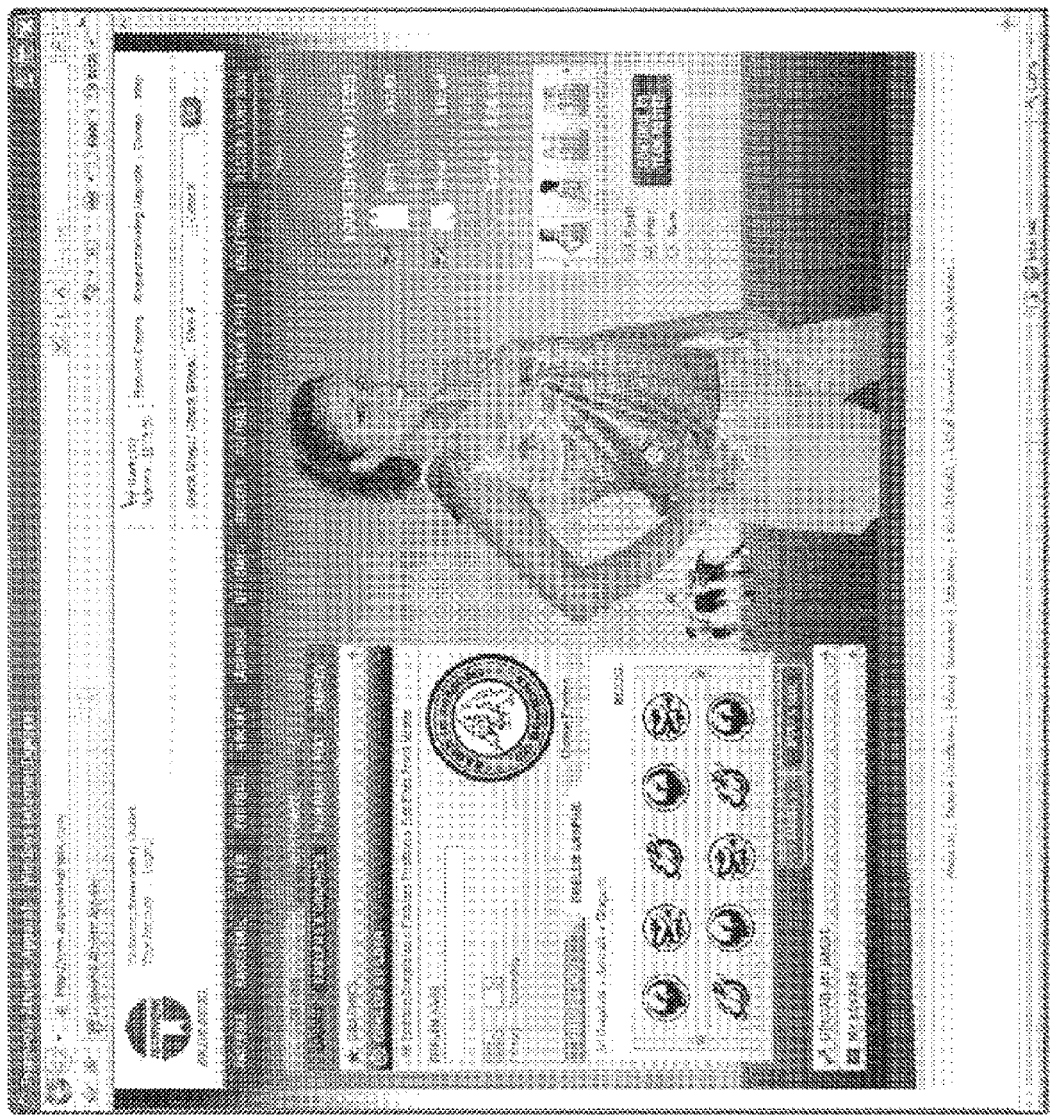
FIG. 19 is a screen-shot of the Emblem Graphic Selection Screen for the system.
Figure 20:
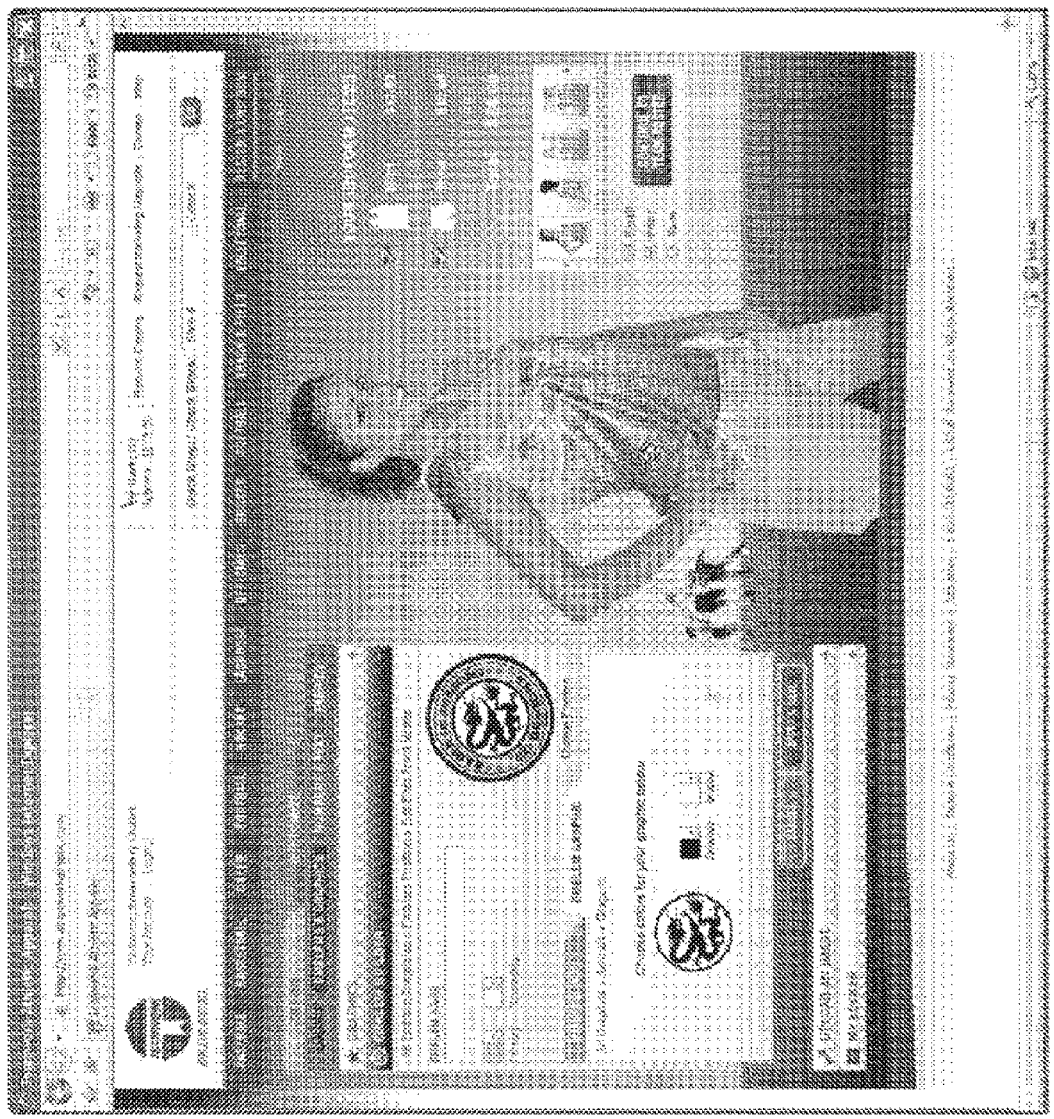
FIG. 20 is a screen-shot of the Emblem Graphic Customization Screen for the system.
Figure 21:
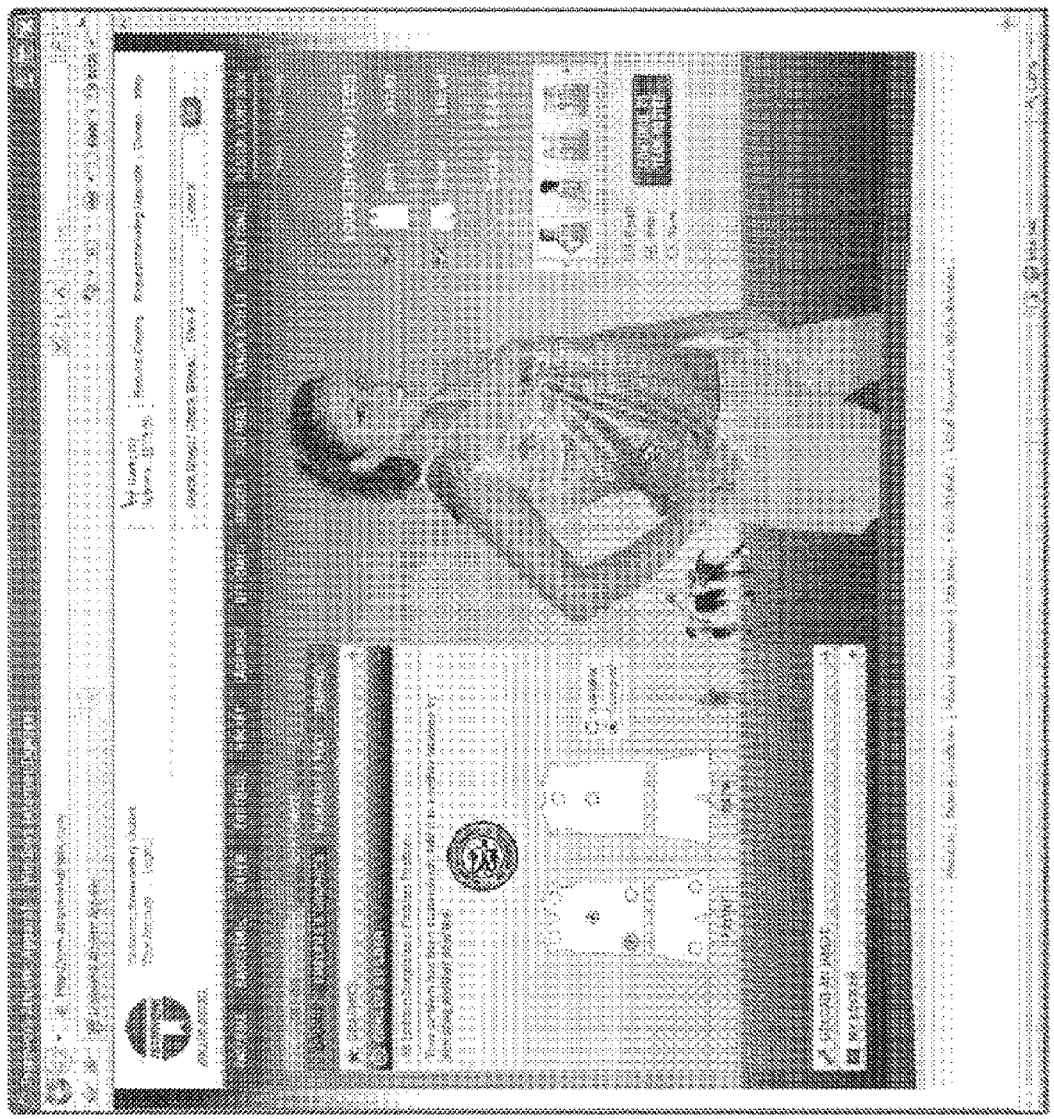
FIG. 21 is a screen-shot of the Custom Emblem Completion Screen for the system.
Figure 22:
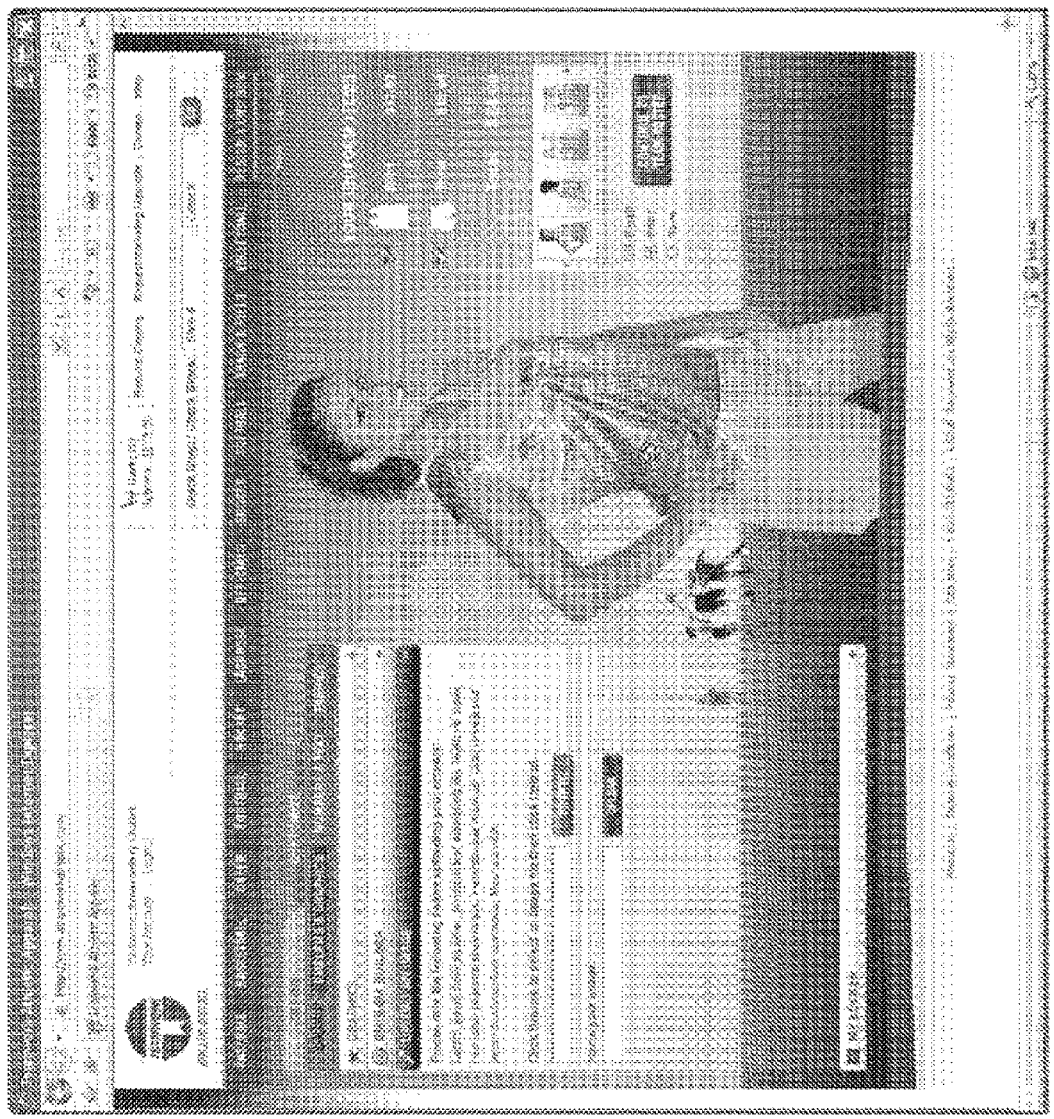
FIG. 22 is a screen-shot of the Upload an Emblem Image Screen for the system.
Figure 23:
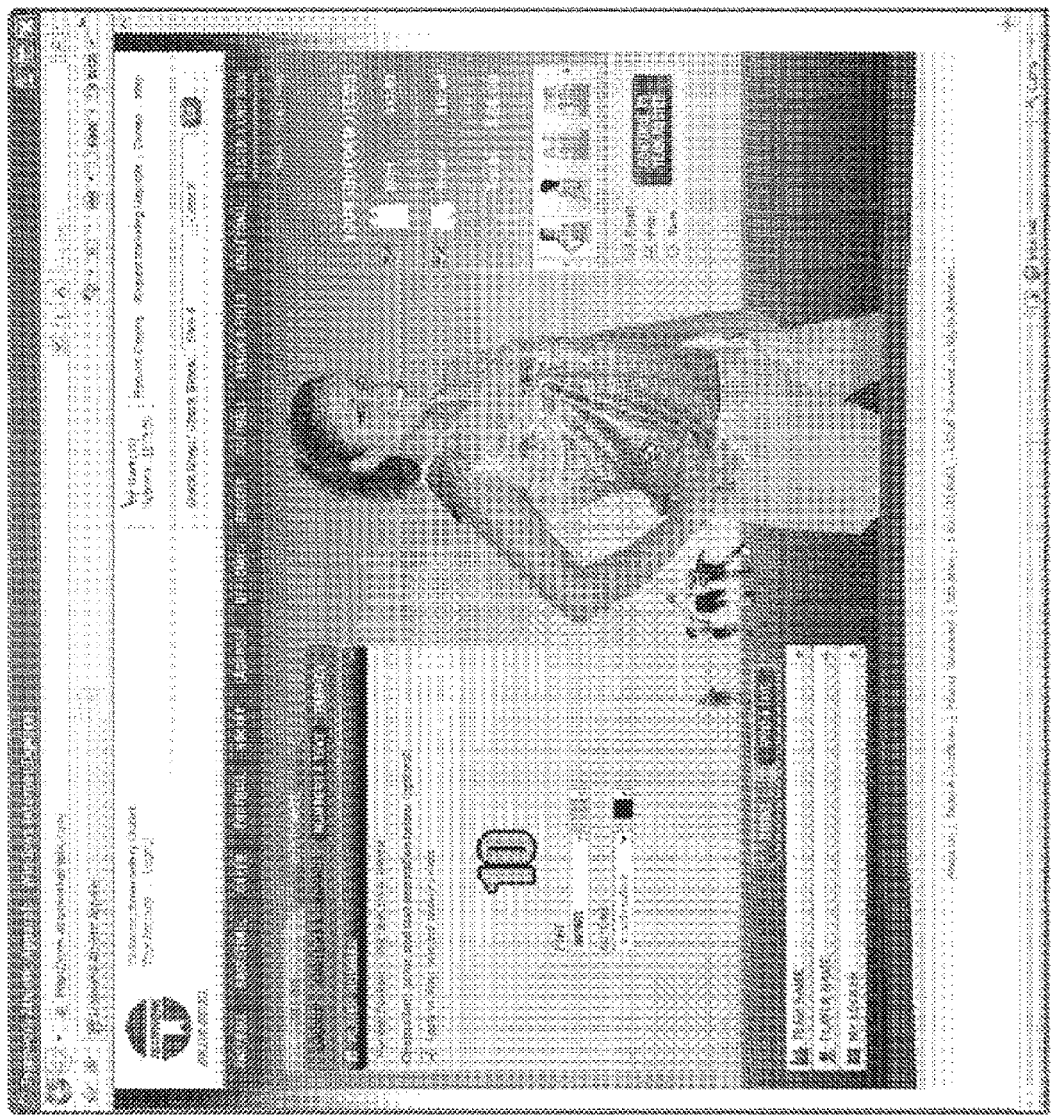
FIG. 23 is a screen-shot of the Player Number Style Selection Screen for the system.
Figure 24:
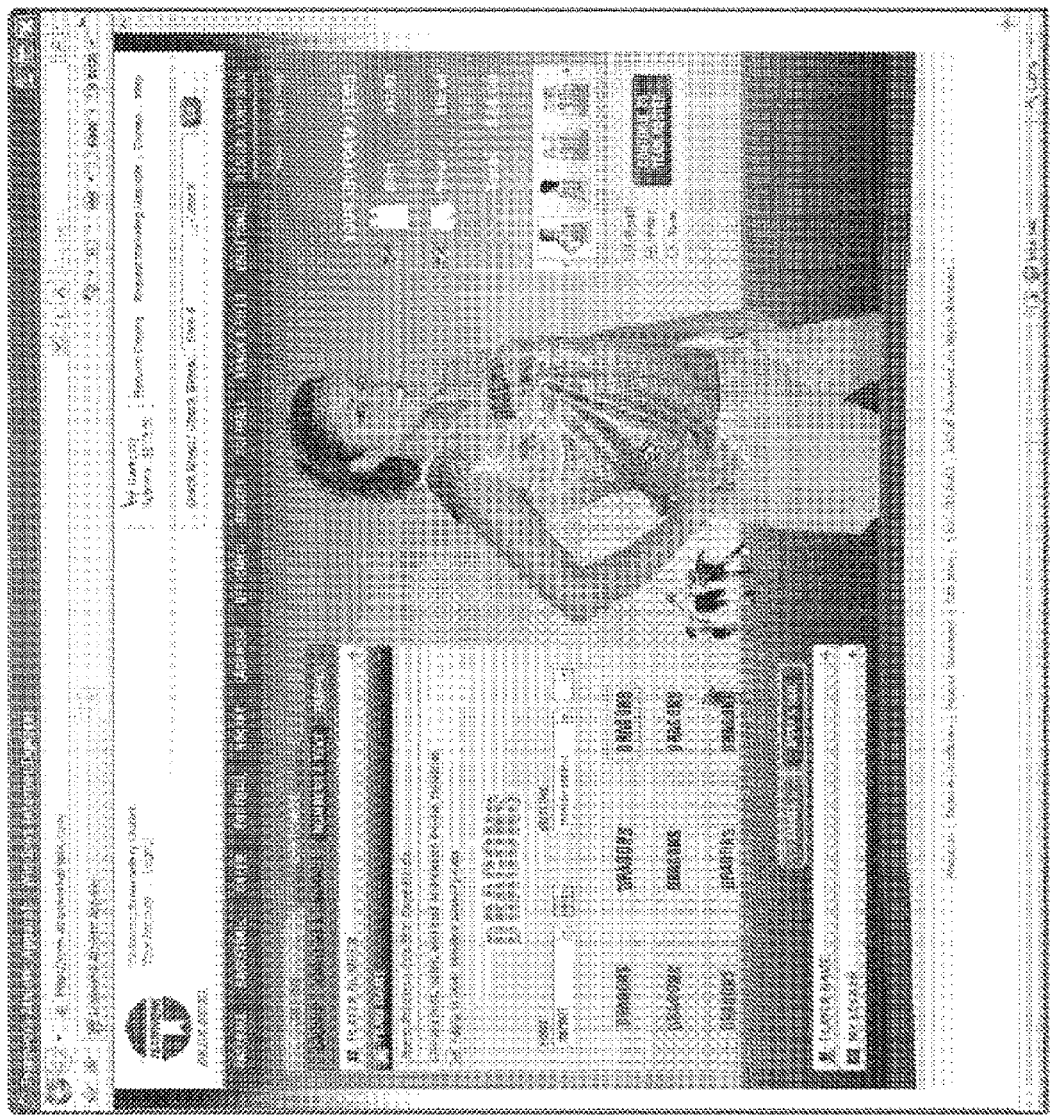
FIG. 24 is a screen-shot of the Team Name Style Selection Screen for the system.

FIG. 12 illustrates the first screen of the emblem builder. In this screen a layout or style for the emblem is selected. FIG. 13 illustrates the next screen where placement of the emblem can be specified. FIG. 14 illustrates how the colors of the emblem can be selected with a pop-up box. FIG. 15 illustrates the screen for adding text to the emblem. FIG. 16 illustrates the screen for specifying colors for the emblem text. FIG. 17 illustrates the screen where the primary category for an emblem graphic can be selected. FIG. 18 illustrates the screen where the sub-category for an emblem graphic can be selected. FIG. 19 illustrates the screen where the emblem graphic can be selected. FIG. 20 illustrates the screen where the colors of the emblem can be selected. FIG. 21 illustrates the screen where placement of an additional emblem can be specified. FIG. 22 is the screen where a custom graphic can be uploaded. FIG. 23 illustrates the screen where the font, style and color of the player number can be specified. FIG. 24 show the screen where the font, style and color of the team name are selected.

Figure 25:
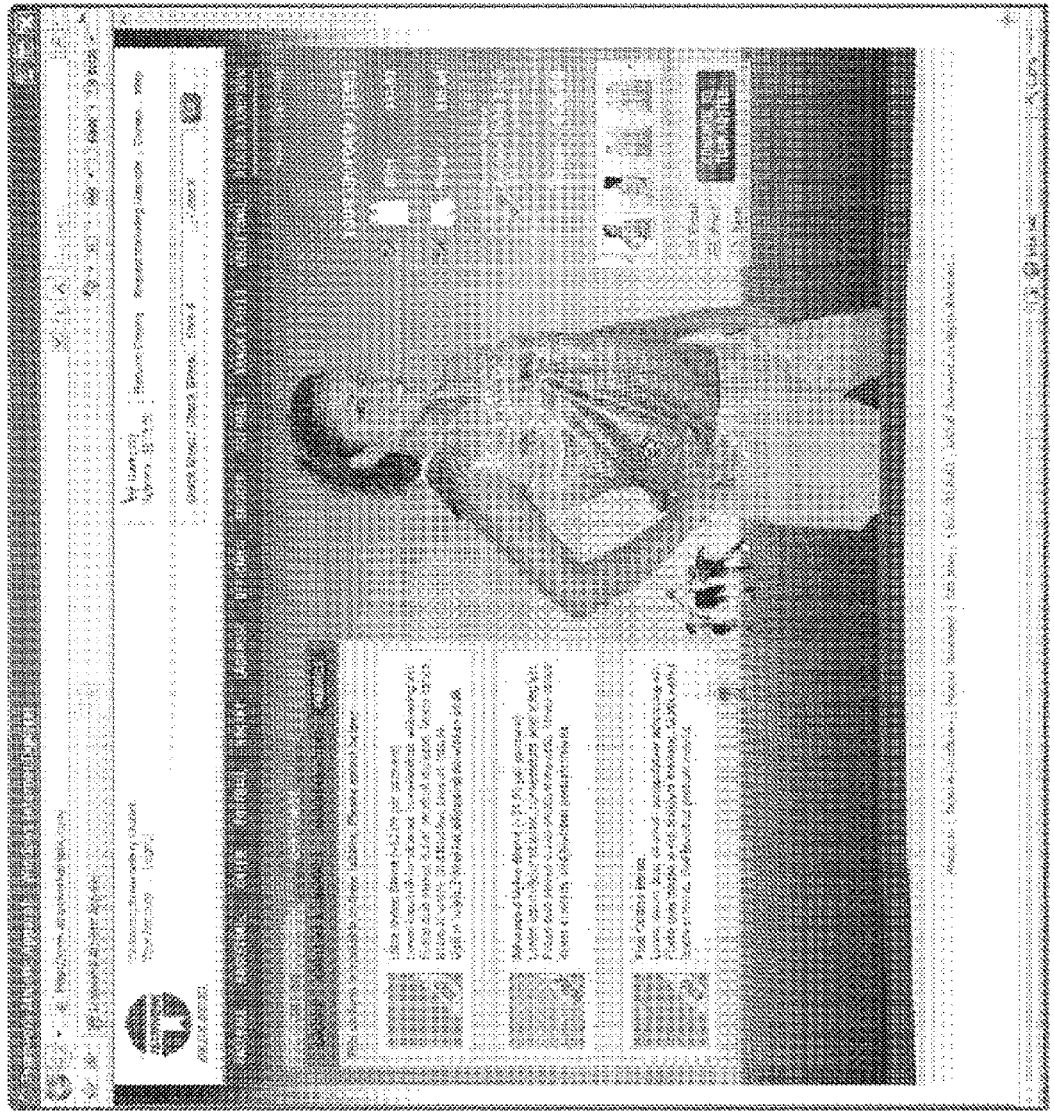
FIG. 25 is a screen-shot of the Fabric Selection Screen for the system.
Figure 26:
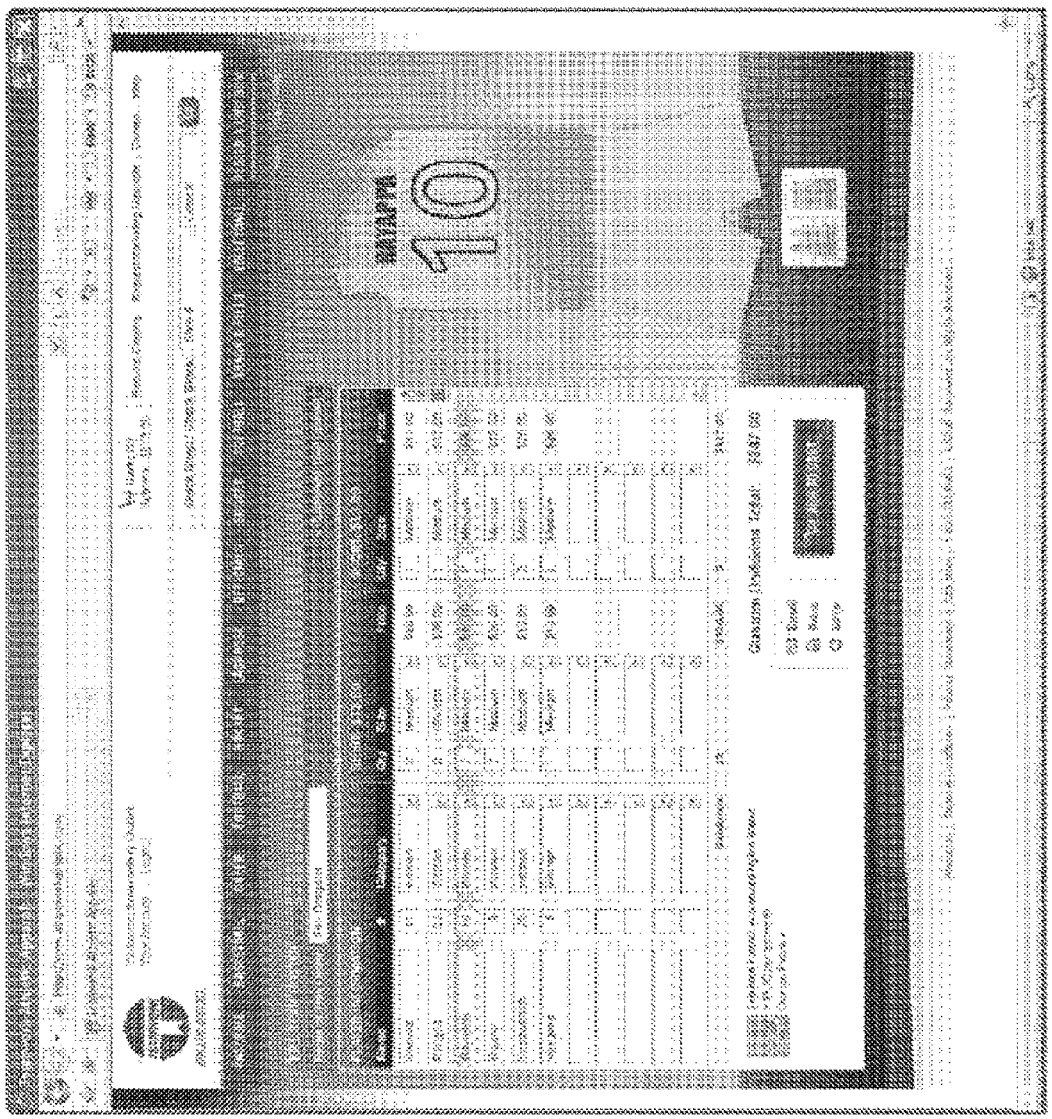
FIG. 26 is a screen-shot of the Team Roster Screen for the system.
Figure 27:
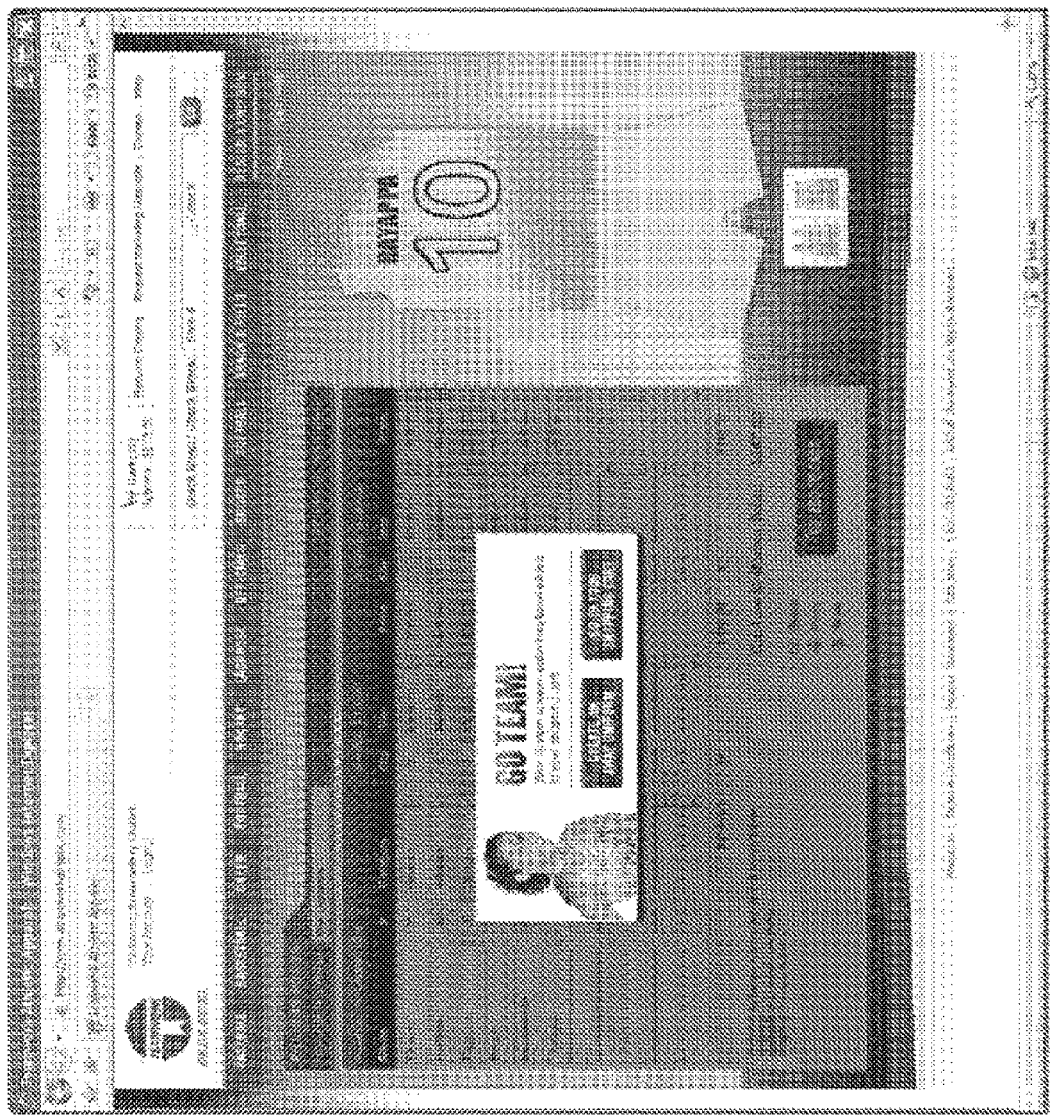
FIG. 27 is a screen-shot of the Team Roster Confirmation Screen for the system.
Figure 28:
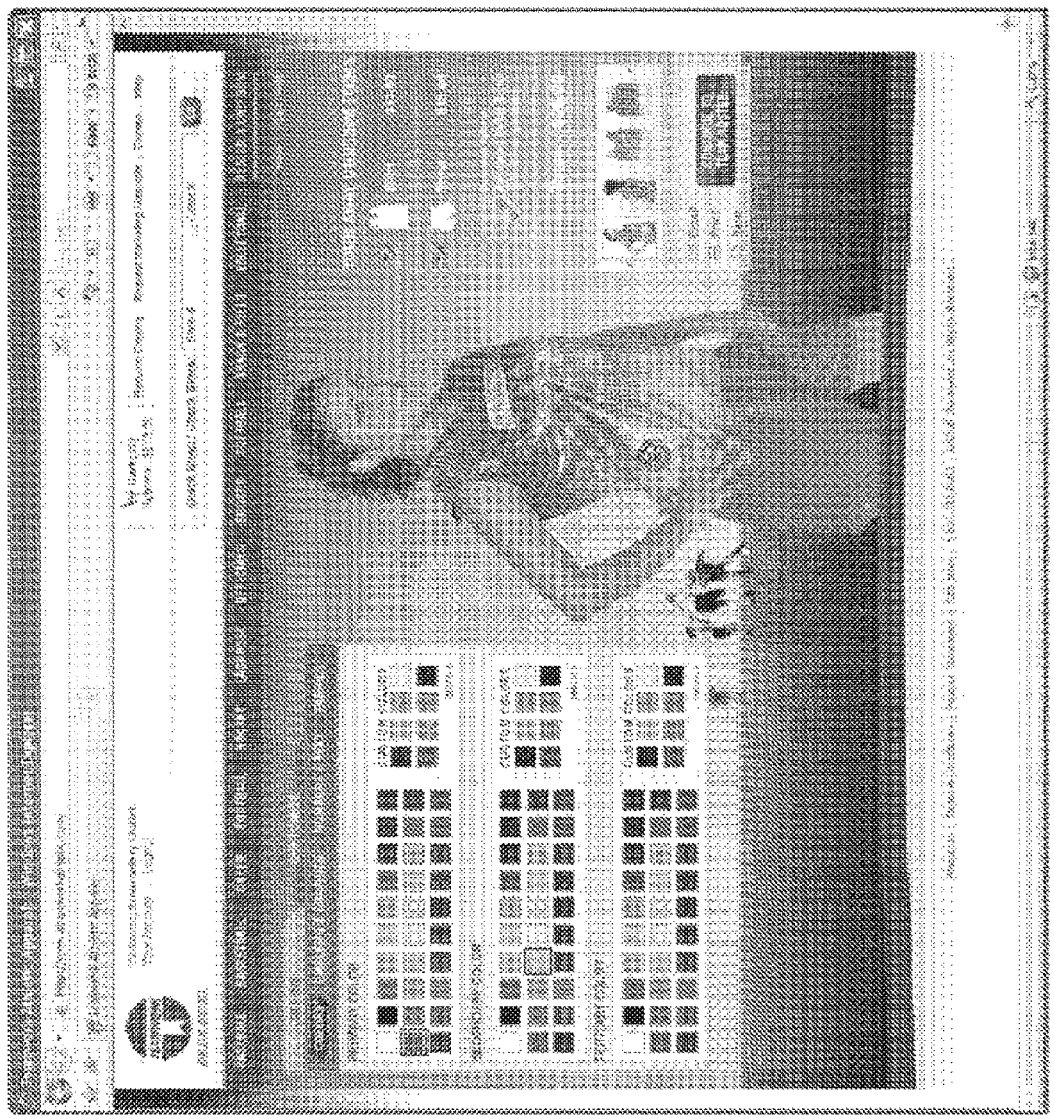
FIG. 28 is a screen-shot of the Select Away Colors Screen for the system.

Finally the customer specifies the fabric, quantity and size or sizes needed. FIG. 25 illustrates the fabric selection screen. FIG. 26 illustrates the screen where the player name, number quantity and size information is input. Preferably, the first player name and number in the roster is the name and number that was entered on screen of FIG. 23. After this has been submitted, the next screen, FIG. 27 illustrates the option of ordering an "away" uniform. If that option is selected, FIG. 28 shows the screen used for selecting the colors of the away uniform. All other elements of the decoration remain the same and do not have to be specified again. Note that, on all screens, the live image is updated with the latest selection.

The software generates 24 a print image for the items from the data generated by the customer selection and specification. This is accomplished by: selecting the appropriate template for the customer selection and specification; coloring the pattern according to the customer specification; and placing the, emblem, graphic, text, name and number on the pattern according to the customer specification. Generation of the print image is accomplished concurrently with customer selection and specification. FIGS. 29A and 293 graphically illustrate the definition of locations or anchor points for all the text and graphics that can be applied to a garment. FIG. 29C illustrates the garment template 42 and the garment thumbnail 44 showing all available anchor points 46.

Figure 30:
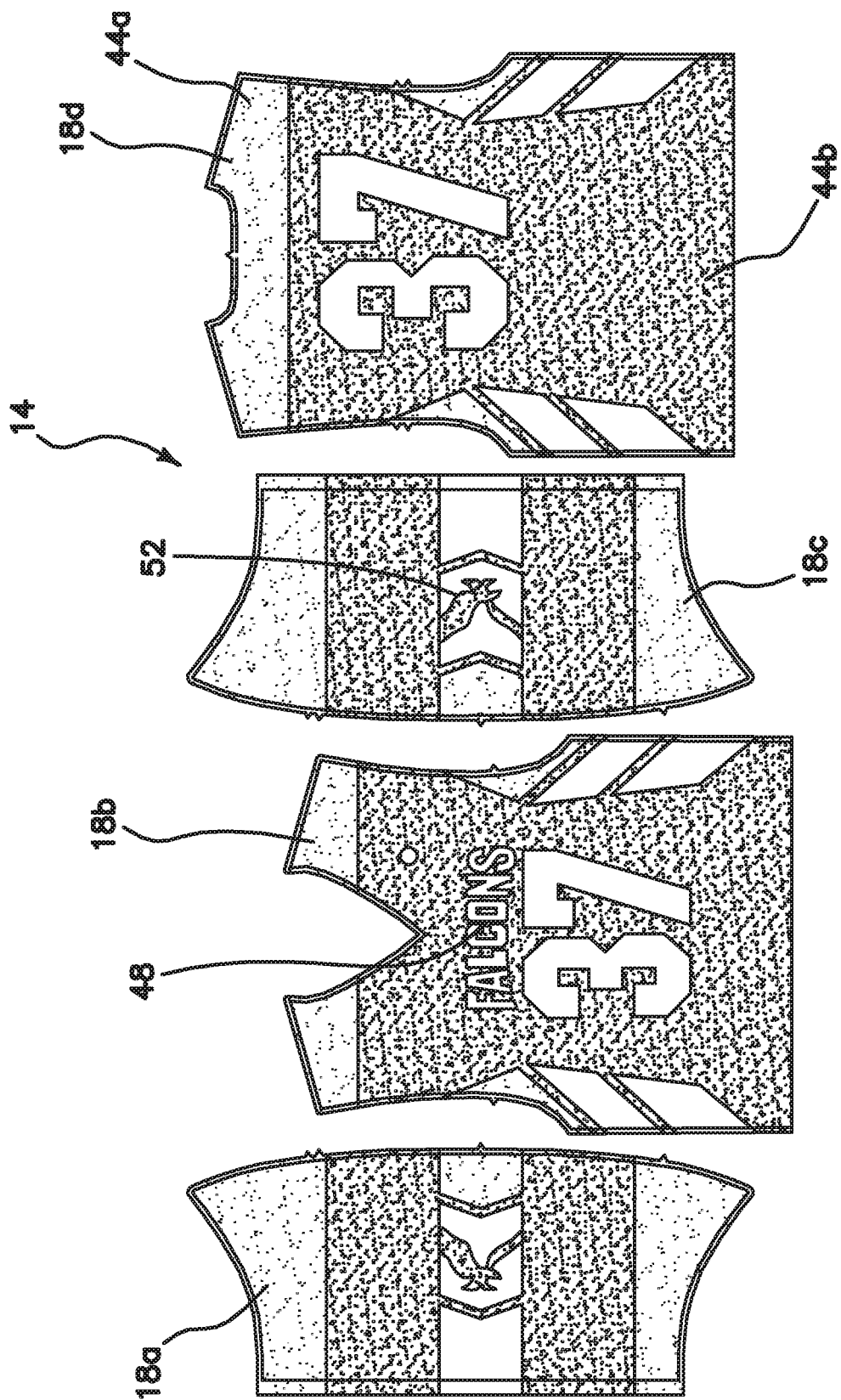
FIG. 30 illustrates the print image for a garment to be printed.

A typical print image 14 is shown on FIG. 30. FIG. 30 illustrates that the print image 14 contains all the cut pieces 18*a*, 18*b*, 18*c*, 18*d* for the item, on which, inter alia, the colors 44*a*, 44*b* are laid out, the team name 48 style and location is laid out, and a graphic 52 is laid out. Then fabric is loaded into the printer 70, the image is sent from the computer 74 to the printer 70 and the image is printed onto the fabric 72. In order to clarify this invention and how it works FIGS. 31-37B show an example in more detail of how decoration is specified and how the garment templates are updated as each step of the selection process is finished. For clarity of this example, only black and white will be used but it will be understood that a range of colors could be specified.

Figure 31:
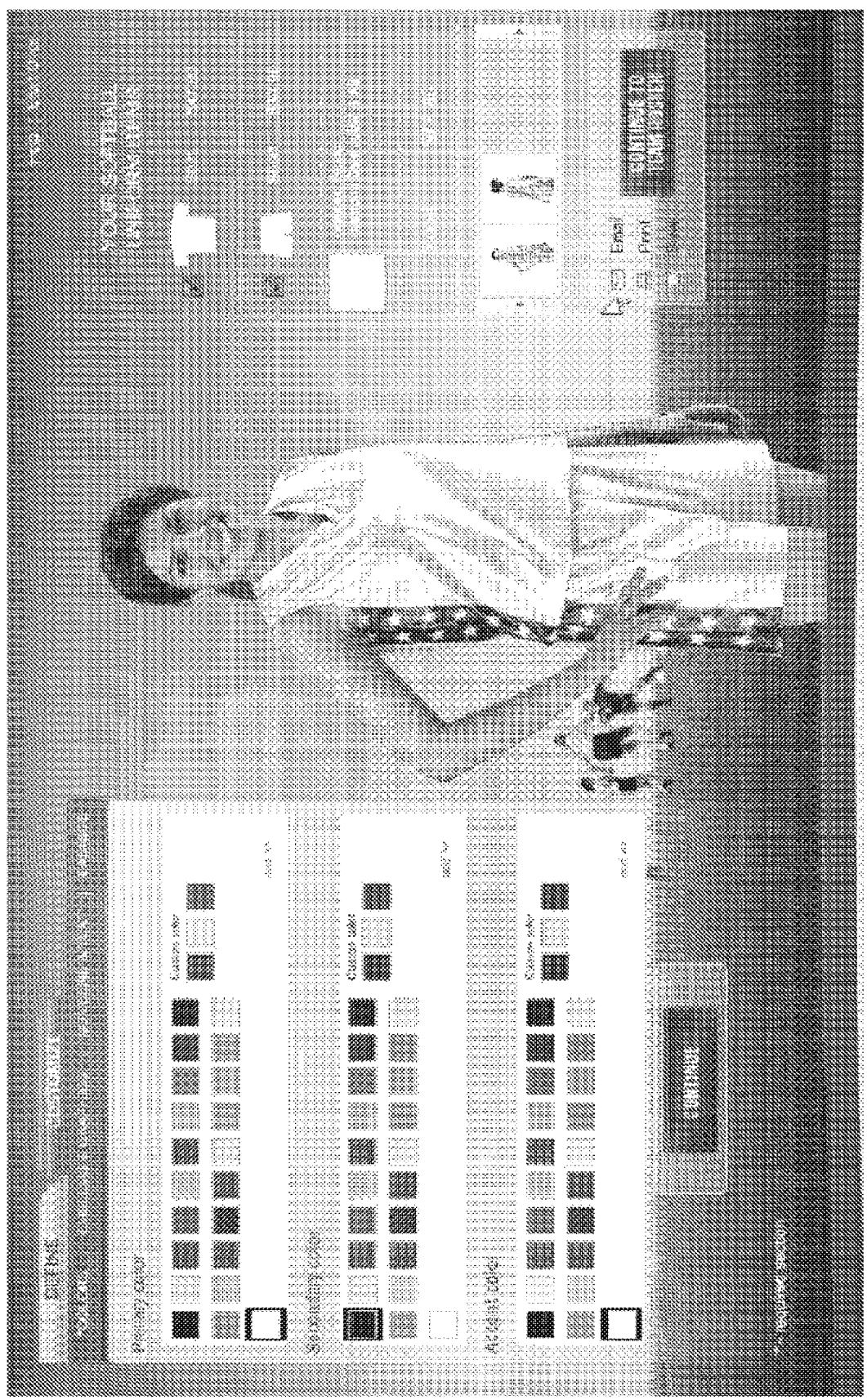
FIG. 31 is a screen shot of initial color selection.
Figure 31A:
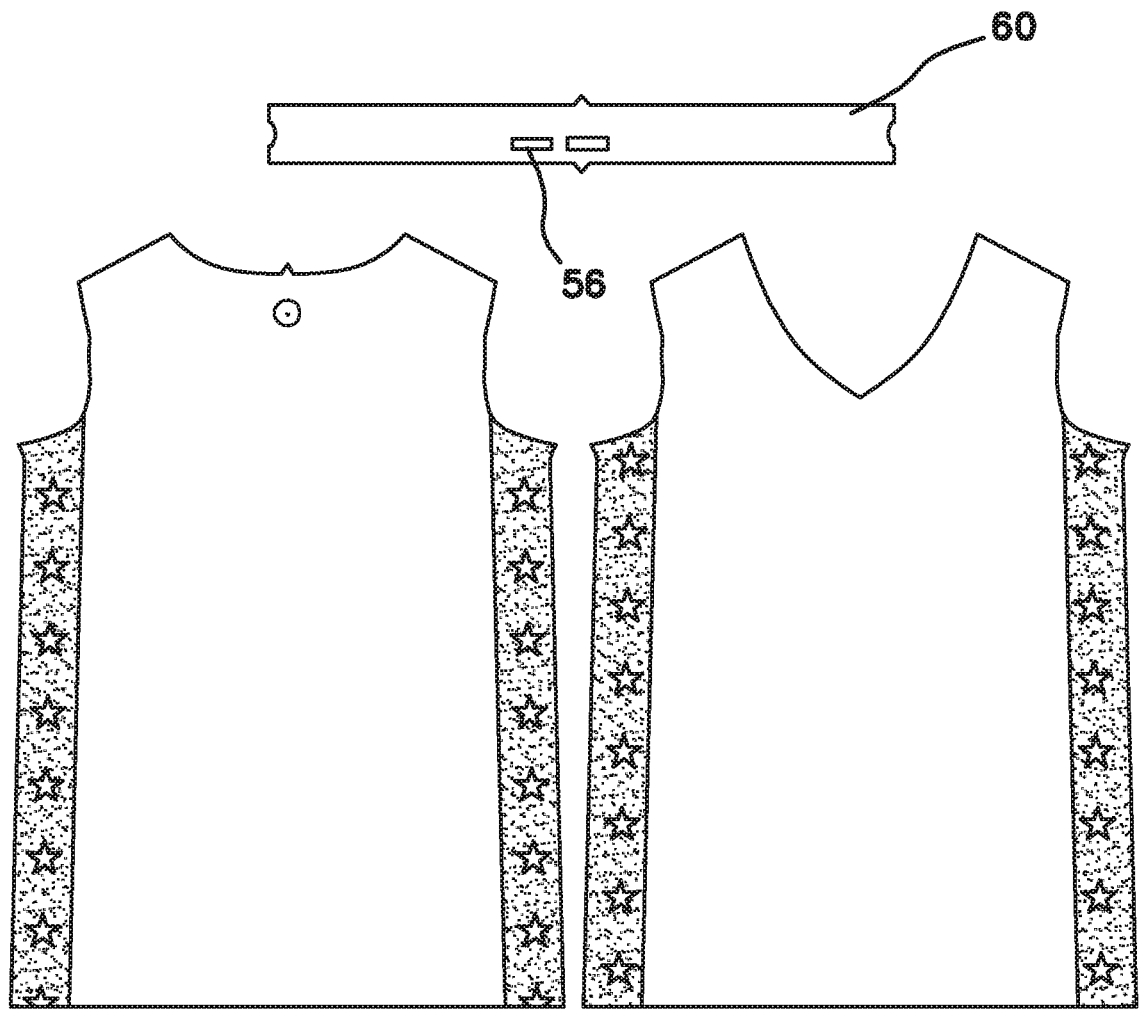
FIG. 31A is a view of the shirt template after initial color selection.
Figure 31B:
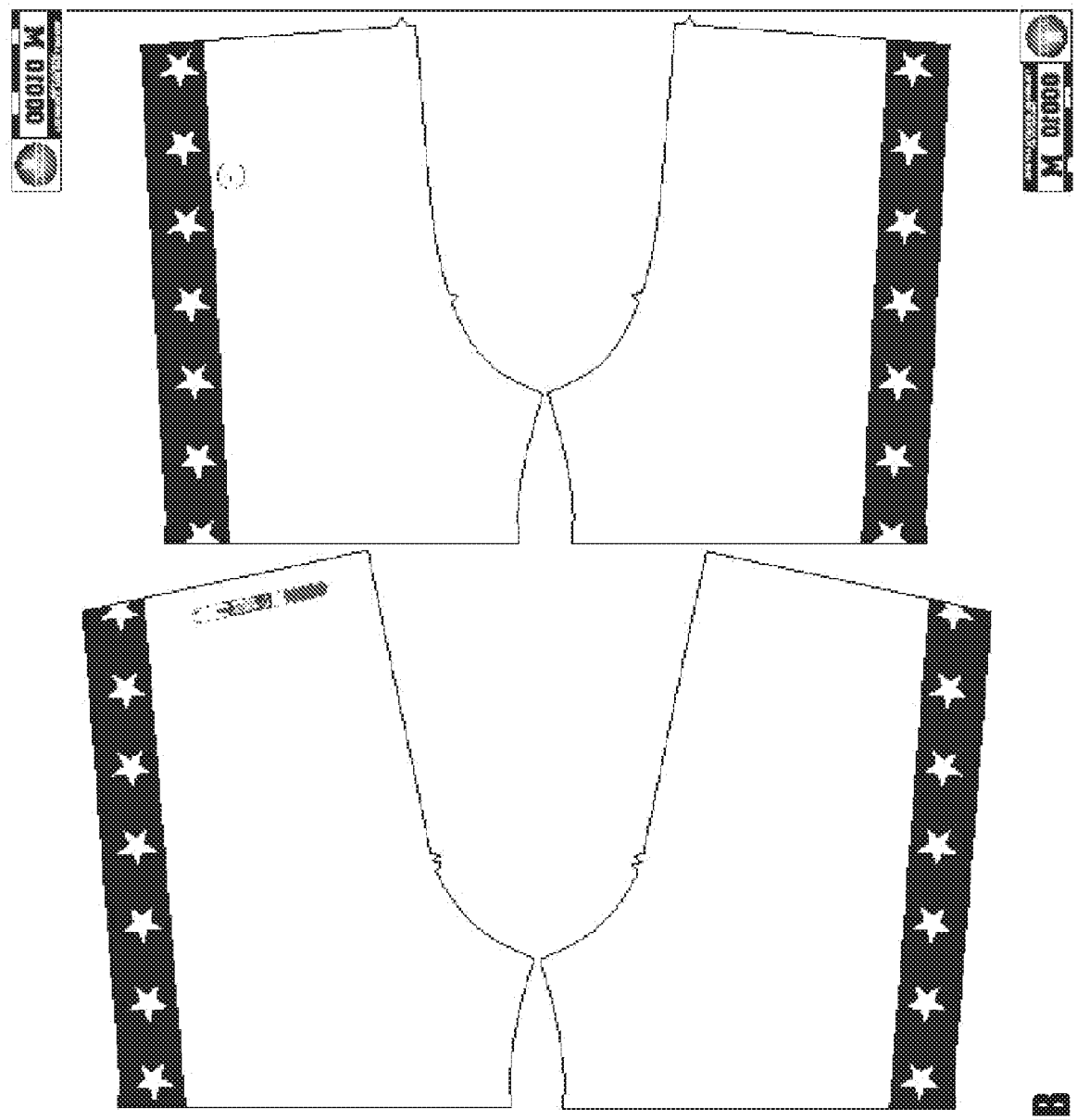
FIG. 31B is a view of the shorts template for after initial color selection.

FIG. 31 is a screen shot of initial color selection. The user has selected garments with side stars. Note that white primary and secondary colors and a black secondary color are highlighted. At this point the templates look as shown in FIGS. 31A and B. Also the software displays the completed garment on the live model on the web page.

Figure 32:
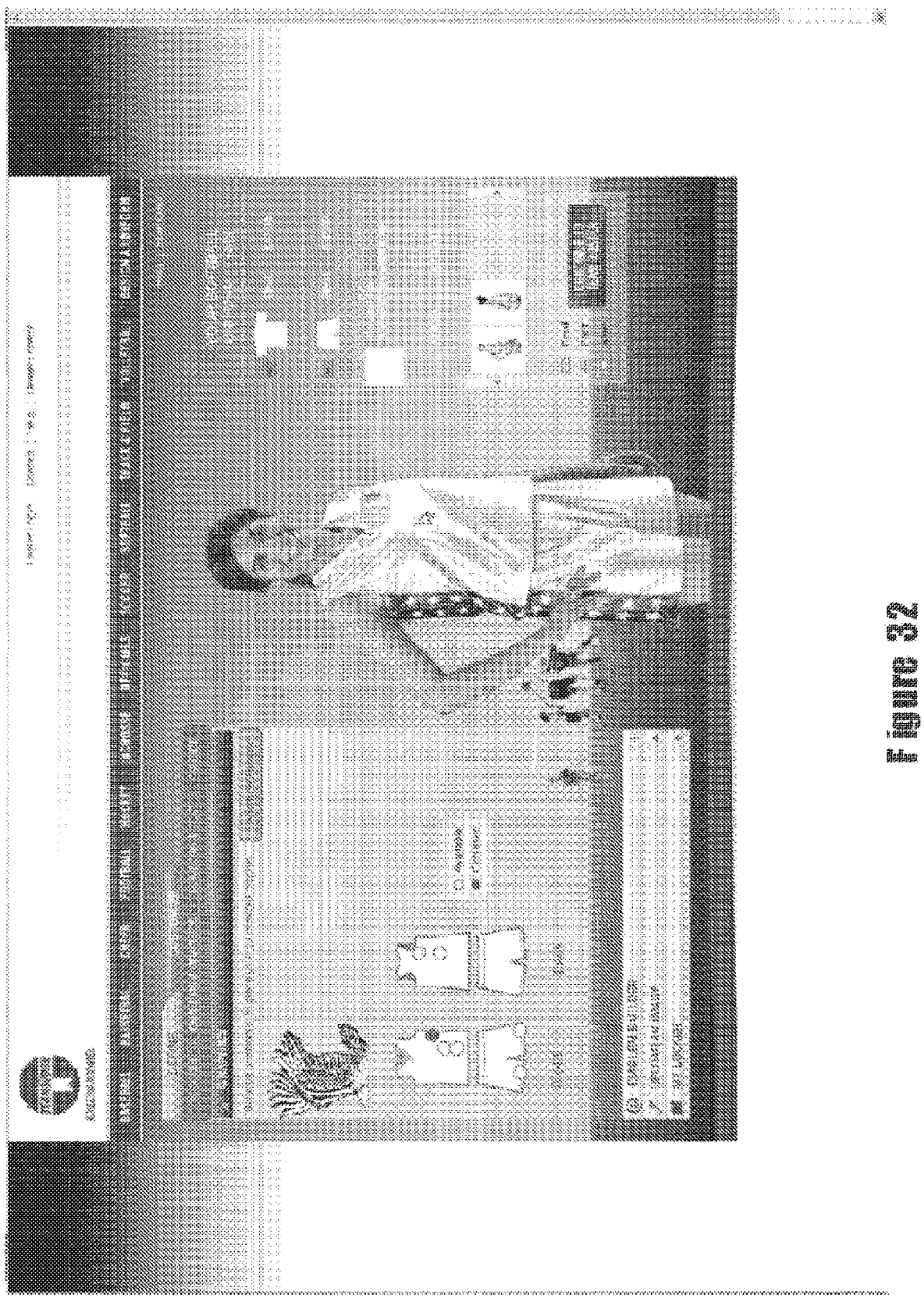
FIG. 32 is a screen shot of graphic placement.
Figure 32A:
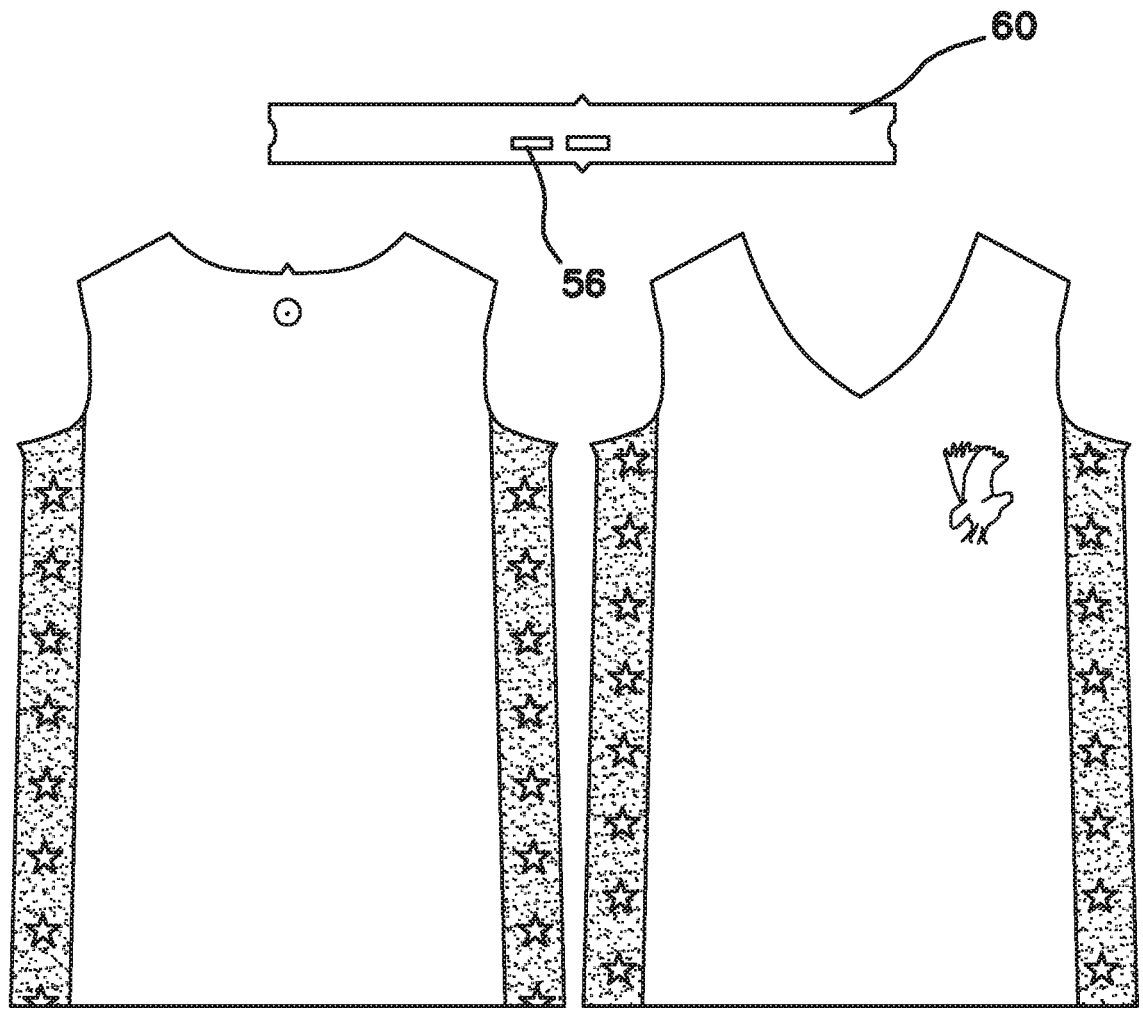
FIG. 32A is a view of the shirt template after graphic selection and placement.

FIG. 32 is a screen shot of graphic placement. The user has selected an eagle and has designated placement above the left breast on the thumbnail picture. The shirt template only is updated as shown on FIG. 32A and the live model is updated also.

Figure 33A:
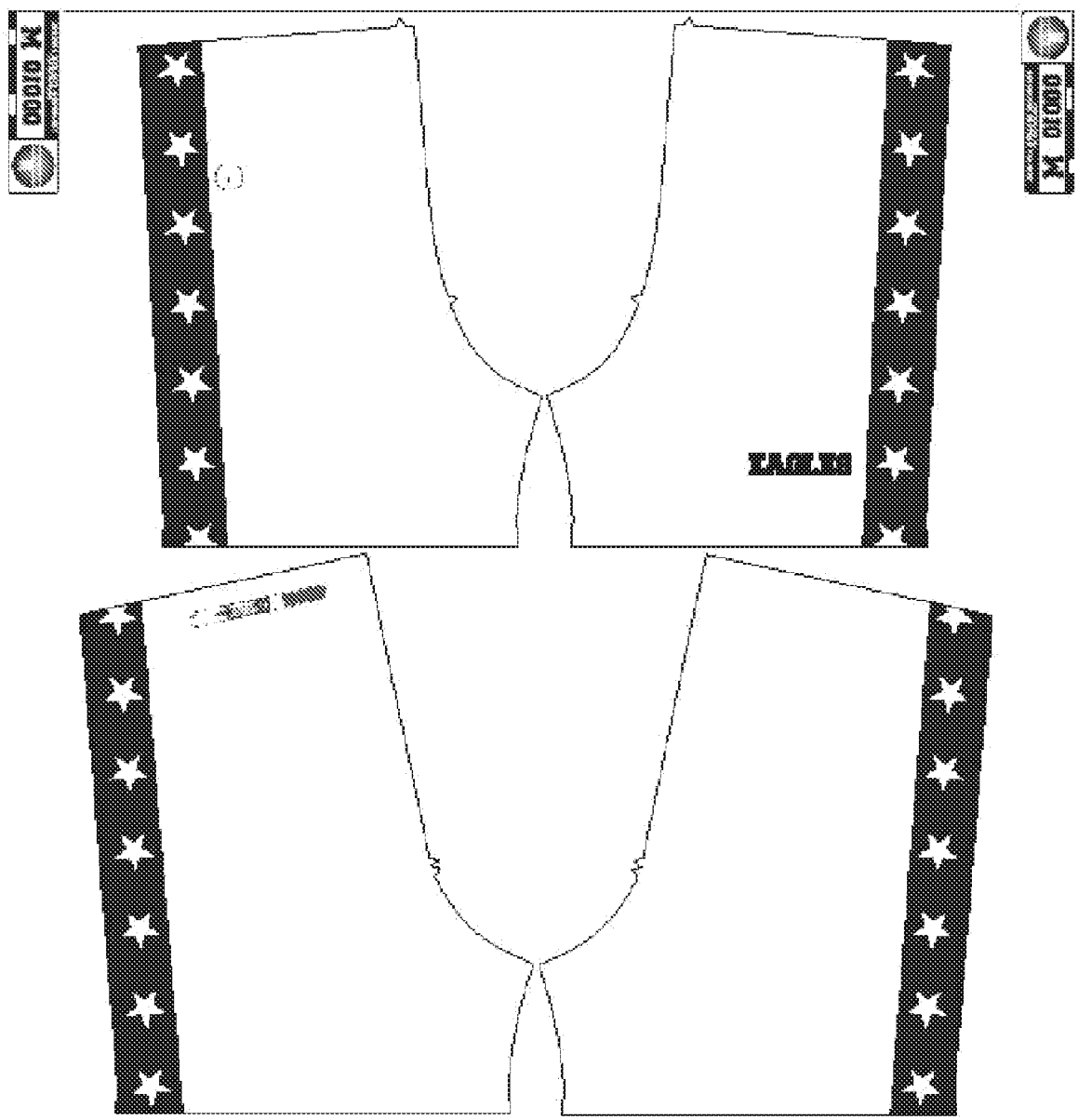
FIG. 33A is a view of the shorts template after team name specification and placement.

FIG. 33 is a screen shot of team name placement. The user has specified the name "EAGLES" and has selected placement on the left front shorts leg. The shorts template is updated as shown in FIG. 33A and the live model "wears" this updated uniform also.

Figure 34:
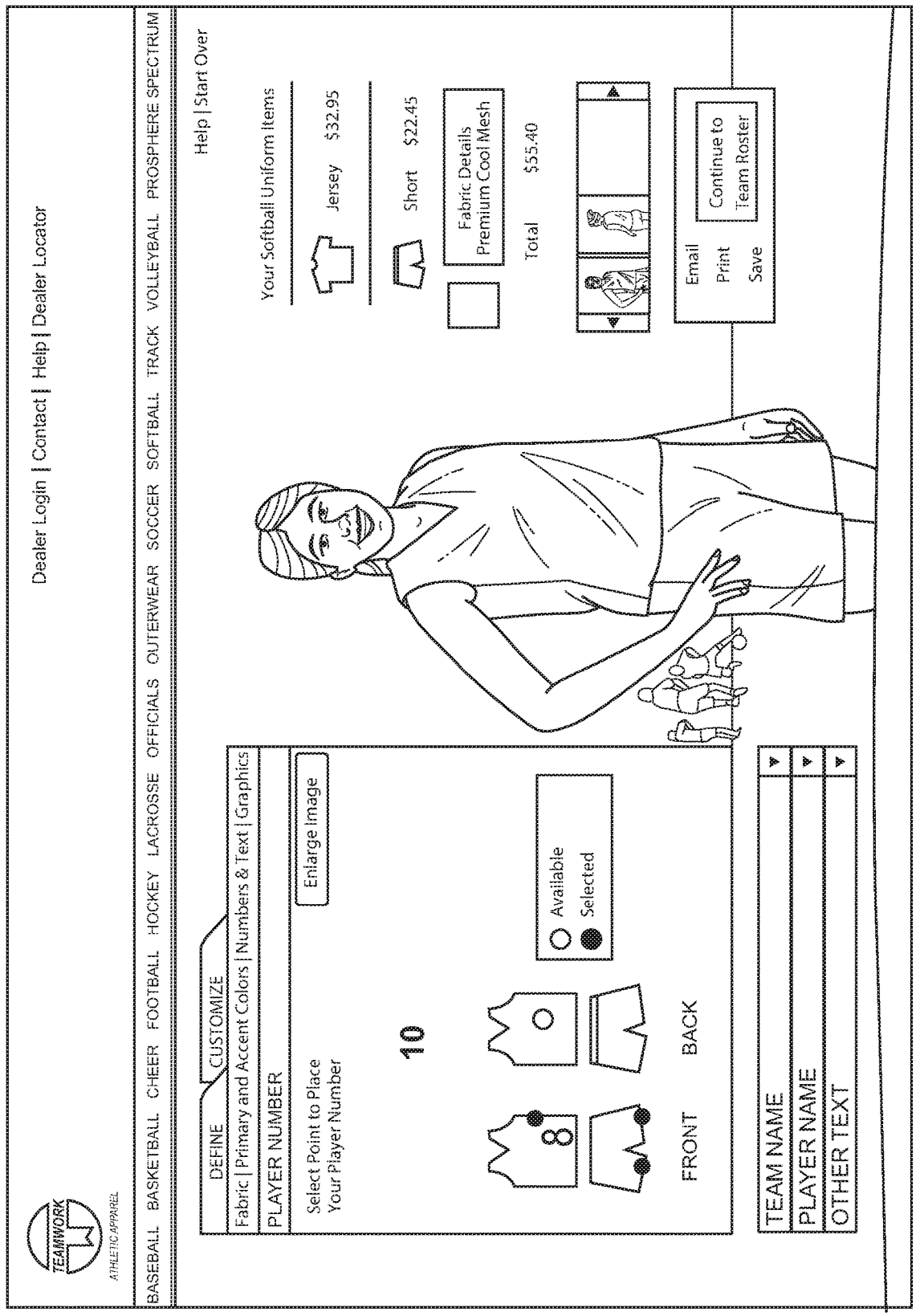
FIG. 34 is a screen shot of player number placement.
Figure 34A:
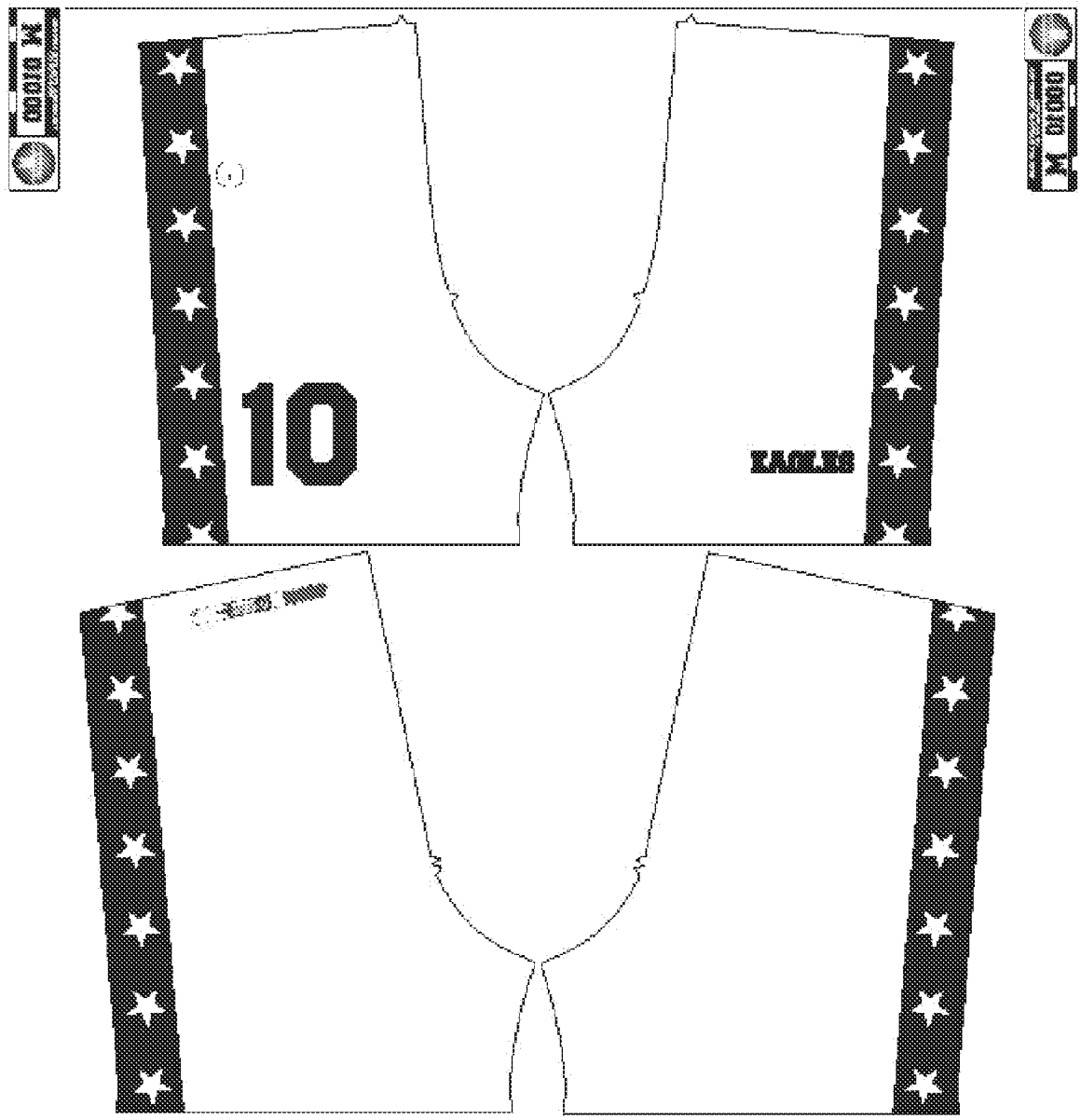
FIG. 34A is a view of the shorts template after player number specification and placement.
Figure 35A:
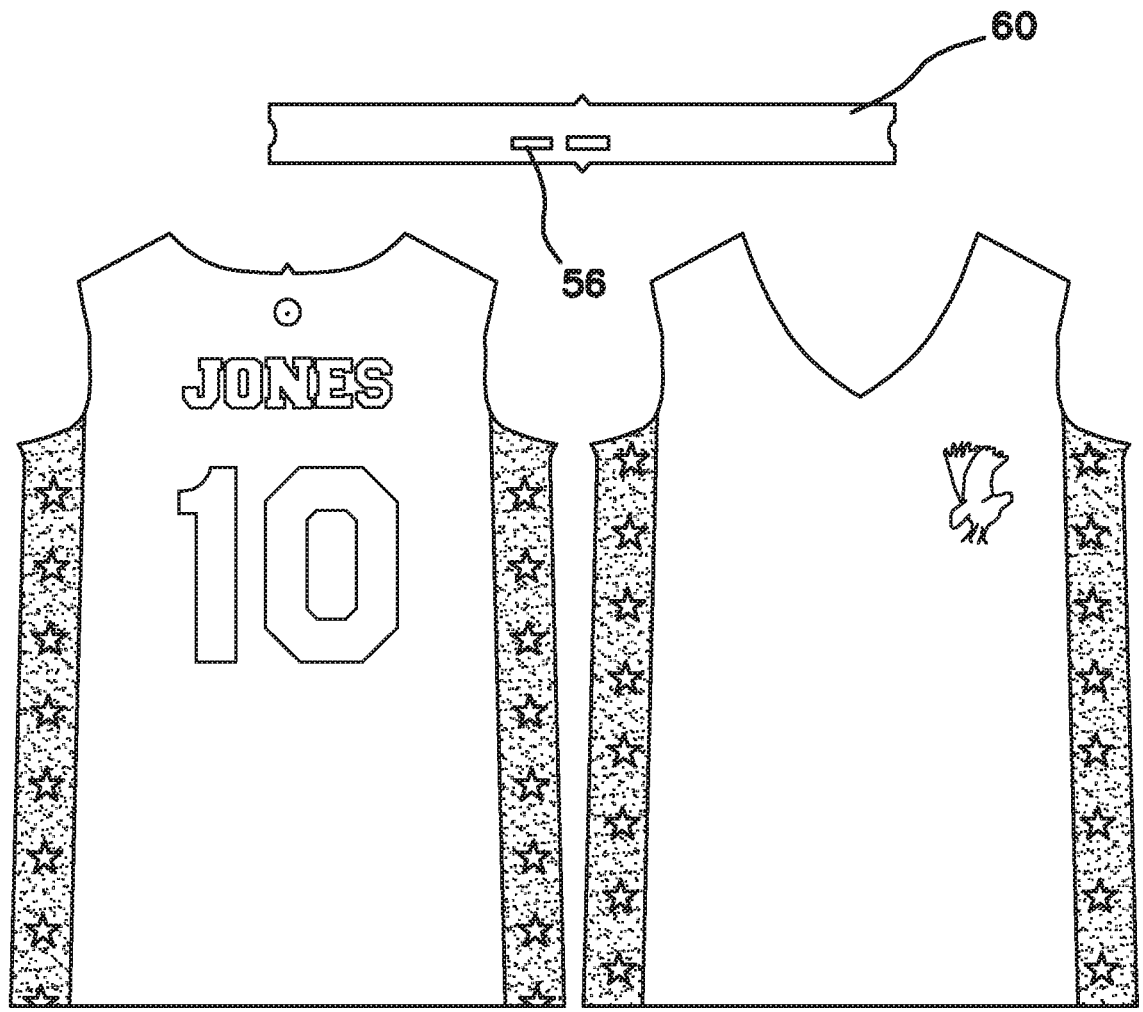
FIG. 35A is a view of the shirt template after player name and number specification and placement.

FIG. 34 is a screen shot of player number placement. The user has designated that the first player number will be "10" and has designated placement on the front of the shorts. Again this selection is reflected on the live model and on the shorts template, FIG. 34A FIG. 35 is a screen shot of player name and number placement from the rear. The player's name is "JONES" and the user has specified placement on the rear top of the shirt on the thumbnail. It should be noted that for this garment the only location available for the player on the rear of the shirt is at the top. The shirt template is updated as shown on FIG. 35A. Also, in FIG. 35 the user has selected viewing the garments from the rear, so the placement of the name can be viewed on the live model. The user has the option to view the garments from the front, but then the name would not be visible.

FIG. 36 is a screen shot of the roster page with the rear of the first player shown.

Figure 37A:
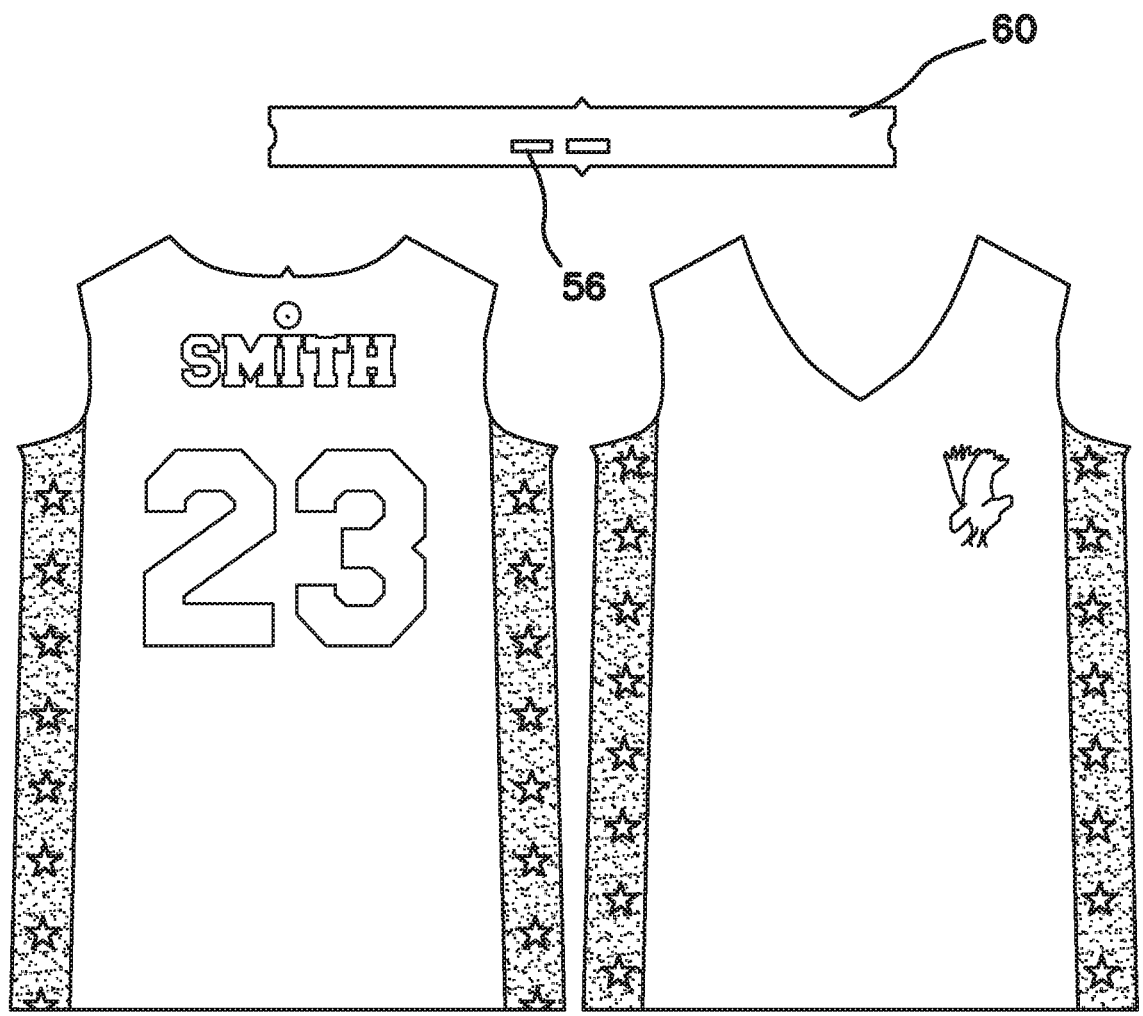
FIG. 37A is a view of the shirt template for the second player
Figure 37B:
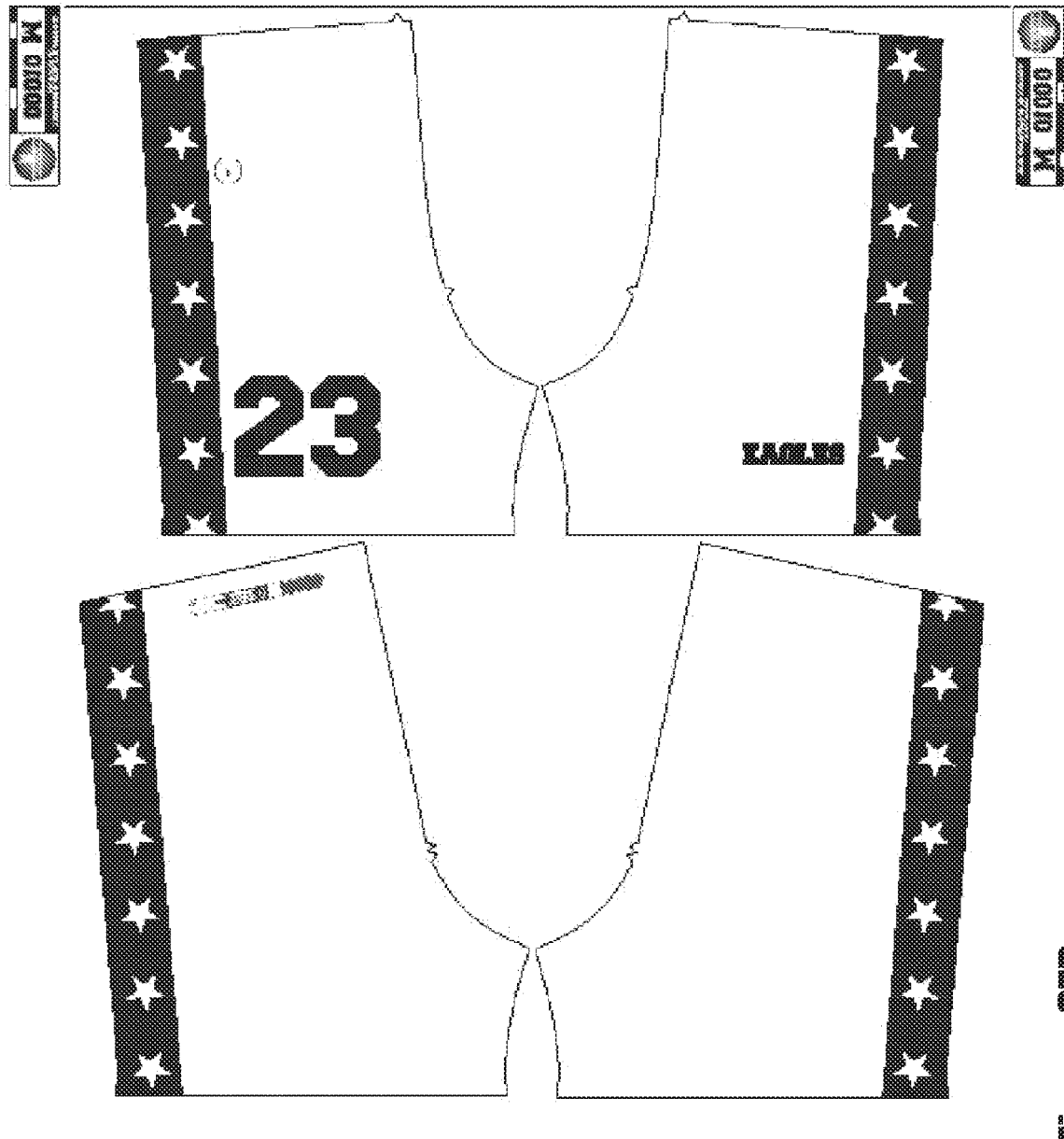
FIG. 37B is a view of the shorts template for the second player.
Figure 38:
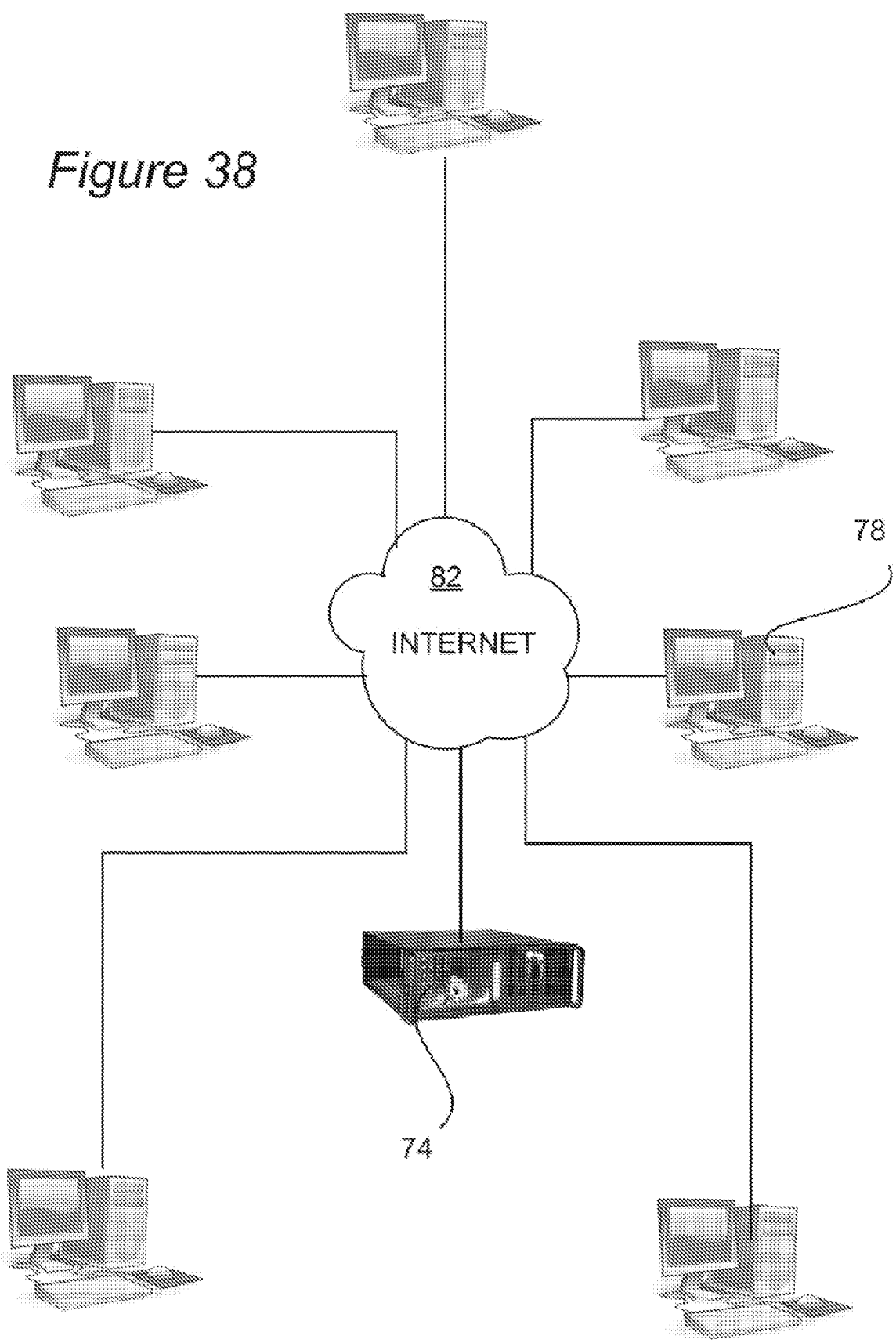

FIG. 37 is a screen shot of the roster page with the rear of the second player shown. All that is necessary at this point is to specify the name and number of the second player, in this example "SMITH", number "23" and the shirt and shorts templates for the second player are automatically generated. These templates are shown in FIGS. 37A and 37B. Also, the live model for the second player is generated from these templates.

Printing can be accomplished in two ways 28, 32. In single piece printing 28 the pieces are cut from fabric 72, the pieces are loaded into the printer 70 and the appropriate images are printed onto the fabric 72. In roll-to-roll printing 32 a print marker is created, a cutting marker is created, the fabric 72 is loaded into the printer 70, the print image is printed onto the fabric 72 and the pieces are cut. Finally, the pieces are sewn together 36 to form the selected item. In the example shown in FIG. 29 18b is the front of the garment, 18d is the back of the garment and 18a and 18c are the sleeves.

The preferred printing process is dye sublimation. This is a printing process that uses the process of sublimation to print full-color images onto a variety of substrates, including paper and canvas print. A small heater is used to vaporize the solid dye material, which then solidifies upon the substrate. As this type of printer 70 allows extremely fine control of the primary color ratios it is possible to obtain a good quality pictures even with relatively low printer resolution, as compared to other printer types with similar resolution.

Dye sublimation printer for printing on fabric are similar to Ink jet printers in that they spray ink onto a sheet of paper but the ink is actually dye-sublimation ink held in a liquid solvent, water for example, and is then applied to a donor material, a special type of paper. The image on the paper is a reverse image of the final design and when it is dry it is placed onto the fabric and heated so the completed image is transferred onto the fabric via the dye-sublimation process. The dye turns into a gas and permeates the actual fibers of the material. Then it then solidifies thus coloring the fabric.

The system also includes the ability to assign 40 retrieval codes 56 to customer selection/specification combinations. This ability is provided by saving the print image into memory; assigning a retrieval code 56 to the print image; and allowing the customer to perform customer selection and specification again by inputting the retrieval code 56 to the input system rather than by entering all the data again. FIGS. 2-7 have a box where the retrieval code 56 may be entered. For customer convenience, the retrieval code 56 may also be printed on the garment. The code 56 is then preferably placed inside the garment, for example inside the neck piece 60, as shown on FIGS. 31A, 32A, 35A and 37A.

Figure 38:
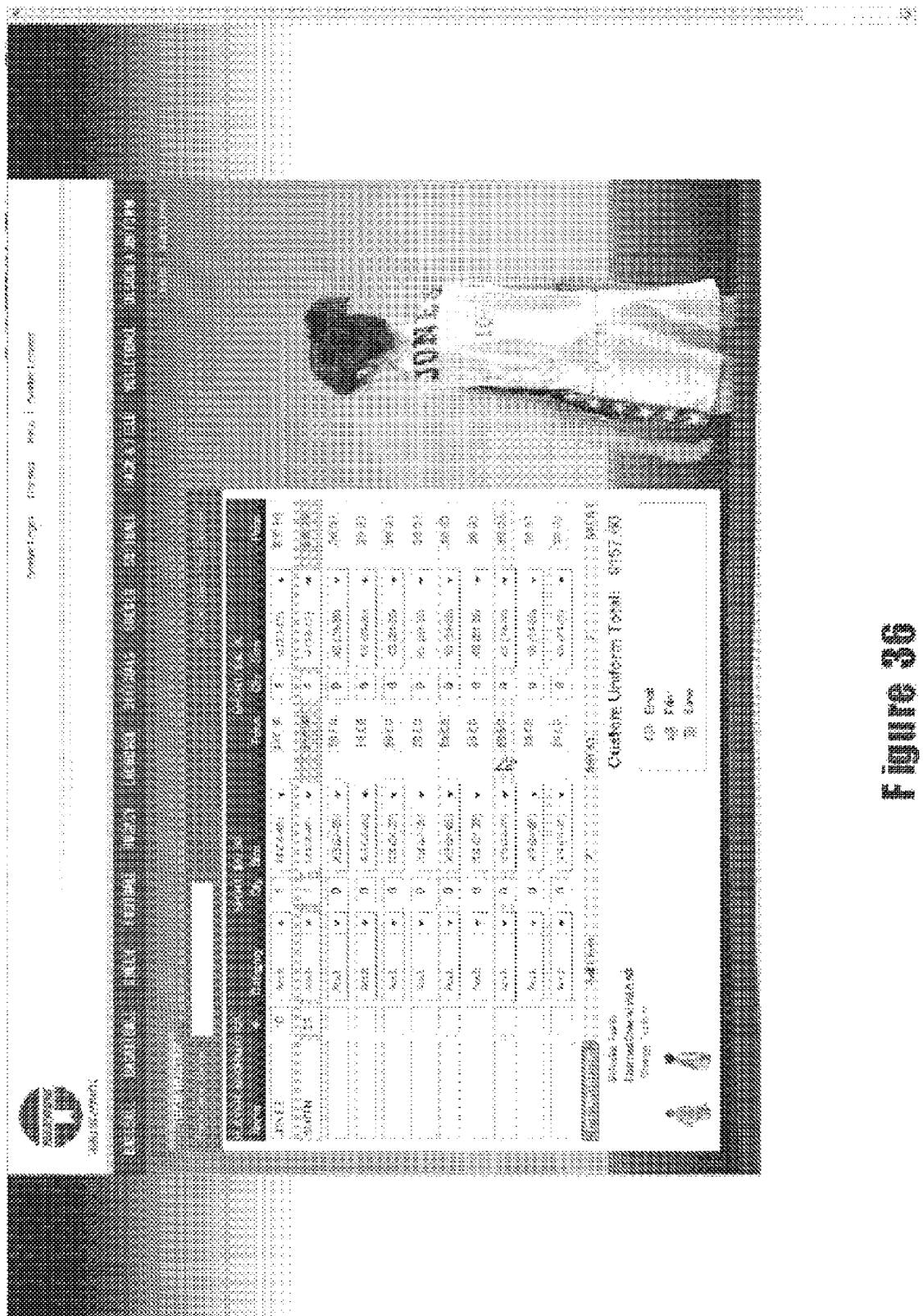
FIG. 38 is a diagram showing how connection of the server containing this invention to the Internet.

FIG. 38 is a diagram showing connection of the server 74 containing this invention 10 to the internet 82. Users 78 who might wish at some point to access the web site maintained on this server 74 are connected to the internet 82.

Figure 39:
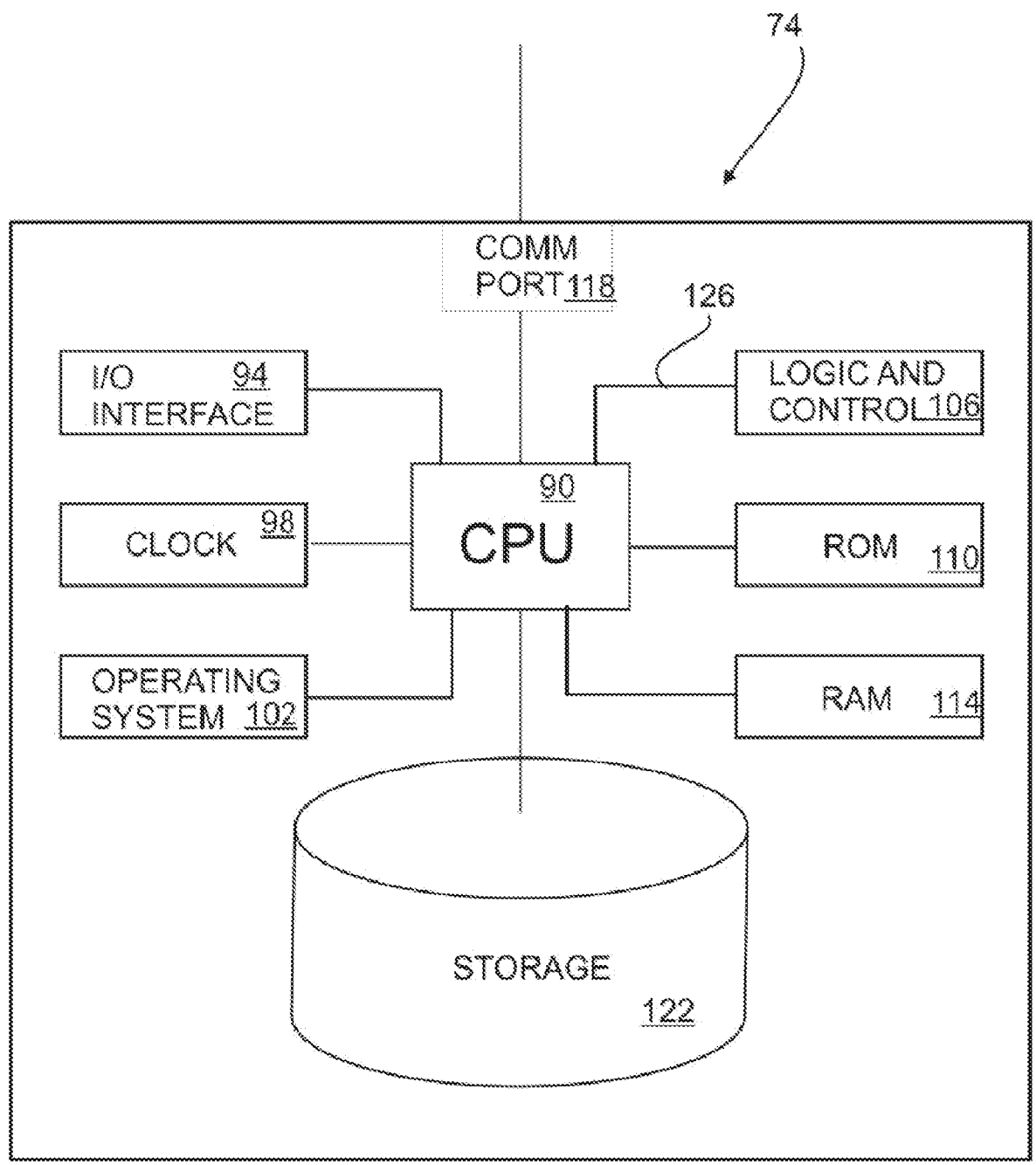
FIG. 39 is block diagram of the architecture of the server containing this invention.

FIG. 39 depicts a block diagram of the data processing system 74 (server) containing this invention. The data processing system 74 includes a central processing unit 90 (CPU), an input and output (I/O) INTERFACE 94, a CLOCK 98, an operating system 102 (OS), a LOGIC AND CONTROL system 106, a read only memory 110 (ROM), a random access memory 114 (RAM), a communication port 118, and a data storage device 122. The data storage device 122 may be a fast, disk-based data storage device which is well known in the computer industry. These components are operatively coupled in a conventional way via couplings 126. Couplings 126 may be in the form of bus architecture, network architecture or any other topology that allows high-speed data communications between a CPU 90 and a data storage device 122.

One sever 74 useful for this task is manufactured by SUN Microsystems known in the industry as the SUN SPARC processor (e.g., a SPARC 1000) running an SUN SOLARIS operating system 102. Another is an International Business Machines Corporation NUMA-Q server (containing an Intel Pentium III CPU) running the Microsoft Corporation Windows NT operating system 102. A further is a Hewlett-Packard Corporation HP9000 Superdome server (e.g., HP PA-8600) running the HP-UX UNIX operating system 102.

Database management system software (DBMS) is preferably implemented in a relational database environment such as one produced by ORACLE Corporation known in the industry as the ORACLE 8i relational database management system, or one produced by International Business Machines Corporation known in the industry as the DB2 Universal Database, or one manufactured by Microsoft Corporation known in the industry as the SQL Server relational database management system. It is also contemplated that the data processing system may be a personal computing system such as one manufactured by Dell incorporated operating with appropriate local processing software applications and in conjunction with local area network (LAN) data connections thus enabling access to distributed computing and storage devices (e.g., databases) as may be required.

The use and operation of the component parts of data processing system 74 including the use and operation of CPU 90, I/O INTERFACE 94, CLOCK 98, OS 102, LOGIC AND CONTROL 106, ROM 110, RAM 114, COMM PORT 118, couplings 126, and data storage device 122 will be readily apparent to those skilled in the field of computers and the like.

The interconnections 126 of the component parts making up data processing system 74 will be readily known in the art of computer system design and implementation. Moreover, the use of a DBMS like ORACLE 8i, including the maintenance, querying, and manipulation of databases and corresponding tables related to a system such as ORACLE 8i, will be as readily understood by those skilled in the art of database management technologies.

COMM PORT 118 is preferably configured to communicate via telecommunications links or some other network topology to other computers 86 via the INTERNET 82. Electronic communications in the form of data communications will be readily apparent to those skilled in the art. Of course, COMM PORT 118 could be configured to communicate via a networking topology in an open-standards arrangement or in a closed intranet environment utilizing conventional networking protocols such as TCP/IP and the like.

Figure 41:
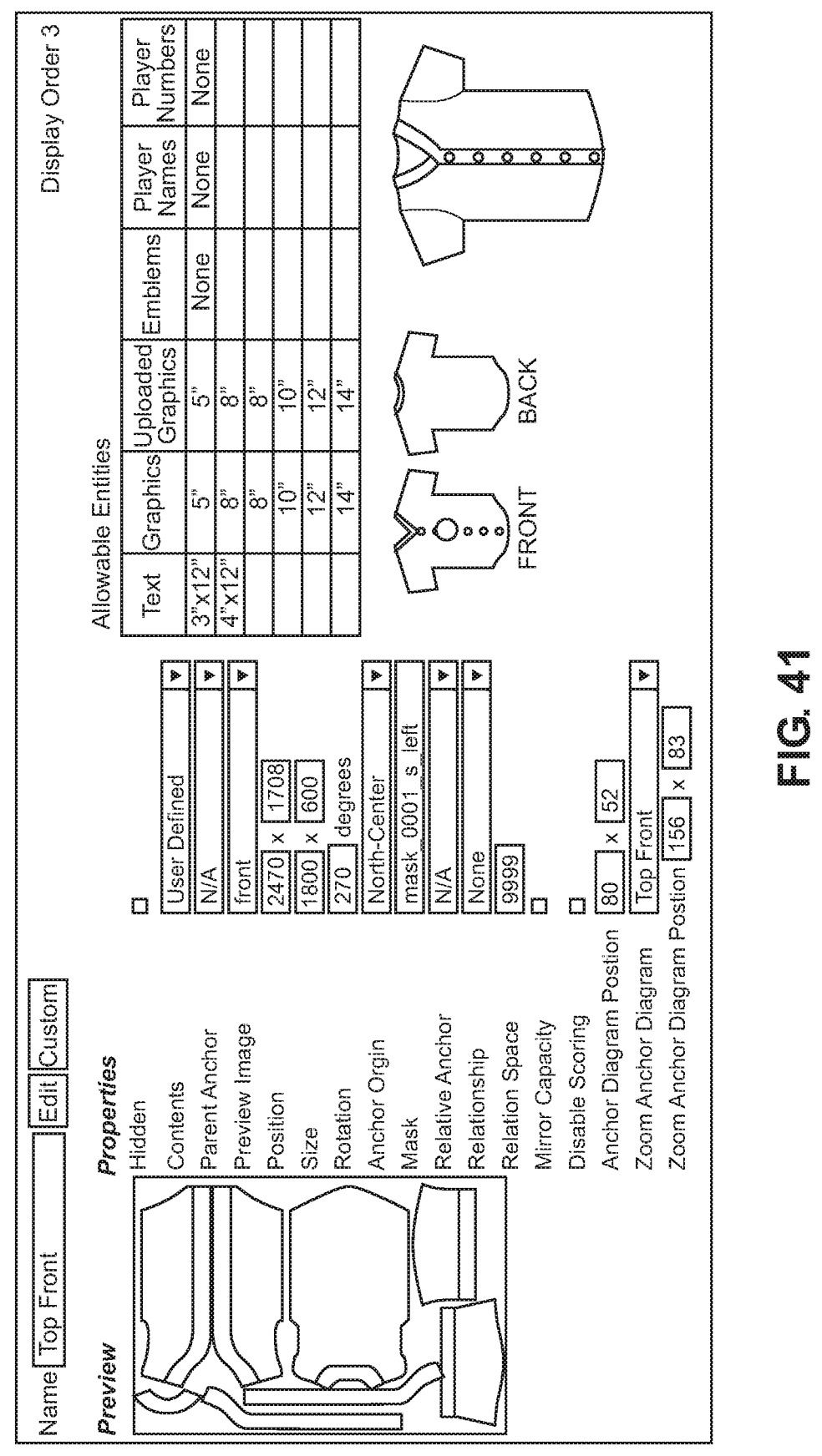
Figure 42:
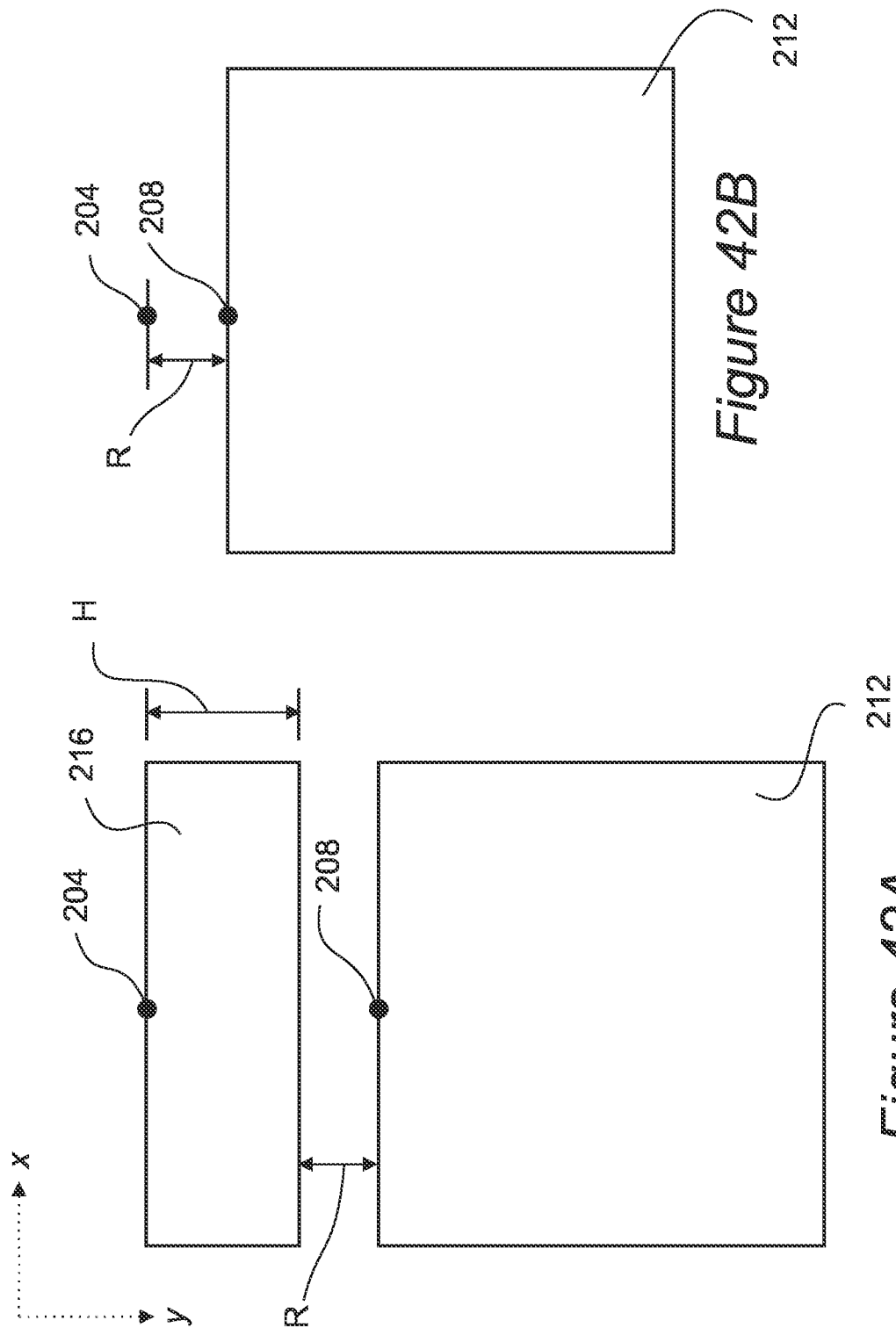
FIG. 42 is an example of a definition for a relative anchor point for a template.
Figure 43:
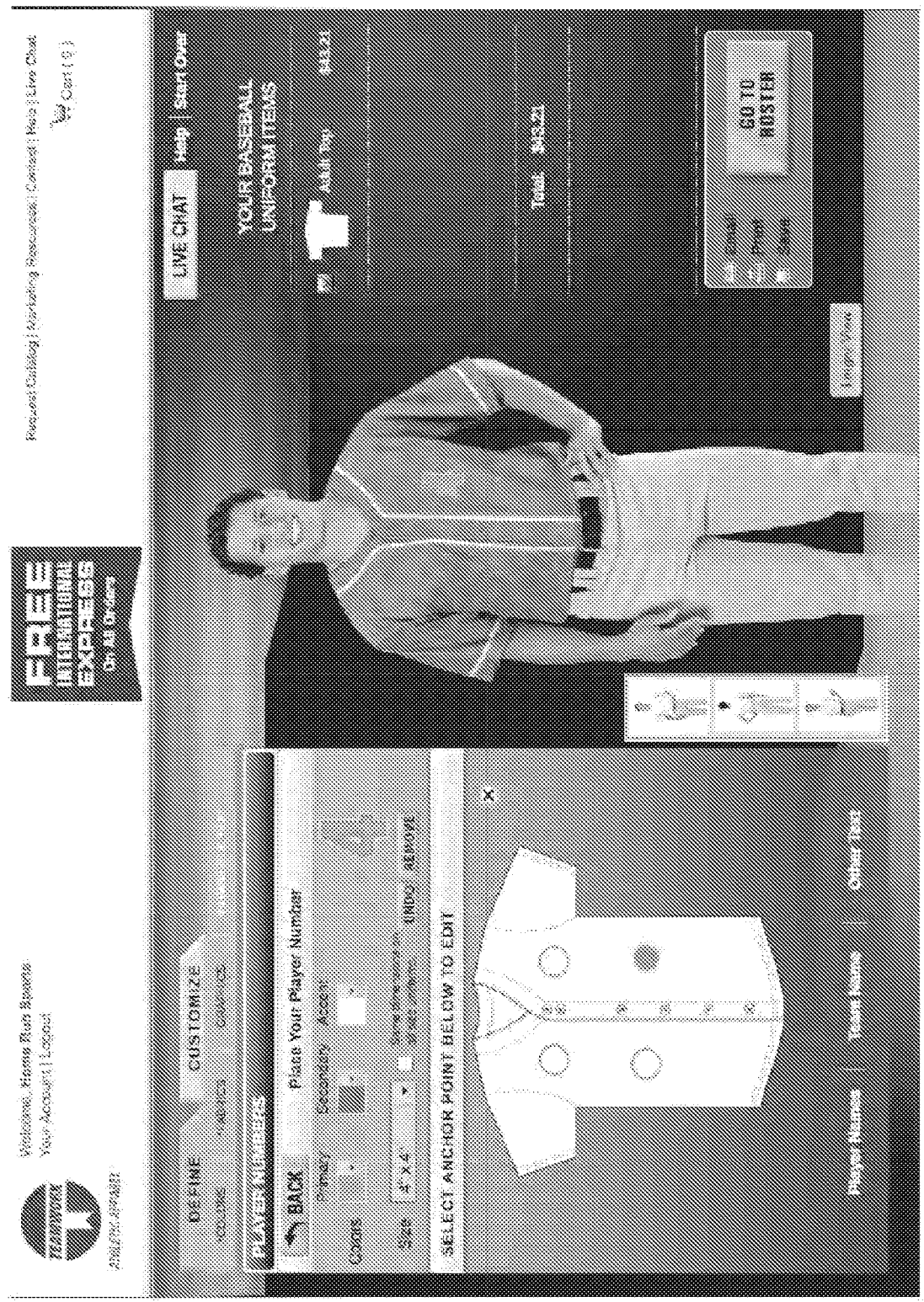

Each location for positioning of a decoration on a template is controlled by an anchor point. Each anchor point is defined by a number of parameters which include size, position, allowable entities, etc. Examples of anchor point parameters are shown in FIGS. 41 and 42. There are two varieties of anchor points: fixed 204 and relative 208 (referenced as anchor point 204 and relative anchor point 208). A template must have at least one fixed anchor point and may have one or more relative anchor points. In addition more than one relative anchor point can be related to the same anchor point.

FIG. 41 is an example of the parameters of a fixed anchor point 204 while FIG. 42 is an example of the parameters of a relative anchor point 208. FIG. 41 is for an anchor point named "Top Front" and FIG. 42 is for an anchor point named "Left Bottom Front". Each definition includes a position on the template and a table showing maximum allowable sizes of elements that may be uploaded. The latter is called "Allowable Entities". If a user tries to upload a graphic or text that is larger than allowed, the software automatically reduces the entity to the allowed size.

The significant parameters of the relative anchor point 208 are the identity of a fixed anchor point 204, the direction of movement of the relative anchor point 208 from the identified fixed anchor point 204 and the relative amount of movement from the fixed anchor point 204. In the Examples of FIGS. 41 and 42, these parameters are labeled "Relative Anchor", "Relationship" and "Relation Space". In FIG. 41 the values for these parameters are "N/A", "None" and "999" respectively. These indicate it is a fixed anchor point. In FIG. 42 the values for these parameters are "Top Front", "Below" and "300". These indicate this is a relative anchor point, it's position is calculated, if necessary, in relation to the fixed anchor point named "Top Front" and the relative spacing has a value of 300 pixels.

Positioning of relative anchor points works as follows. A customer chooses a decorative entity 212 to apply to a relative anchor point. Entities are numbers, letters, graphics, etc. The position of the relative anchor point 208 is calculated by the software in the computer as follows:

(x,y)+H+R the direction indicated in the "Relationship" box, where (x,y) is the position of the fixed anchor point;

H is the height of the entity 216 at the fixed anchor point; and and R is the Relation Space.

The software then places the entity 212 at the calculated position of the relative anchor point 208. See FIG. 42A. Of course if there is no entity 216 at the fixed anchor point the height H is 0. This situation is illustrated in FIG. 42B.

Figure 43:
FIG. 43 is a screen shot showing application of a number to a baseball shirt.

For example, suppose a customer has chosen to place a number on a flat cut pattern file (template) of a full-button baseball jersey, which is then wrapped on a model using the 3D rendering program described above. See FIG. 43. While the customer does not know it, this is a relative anchor point.

Figure 44:
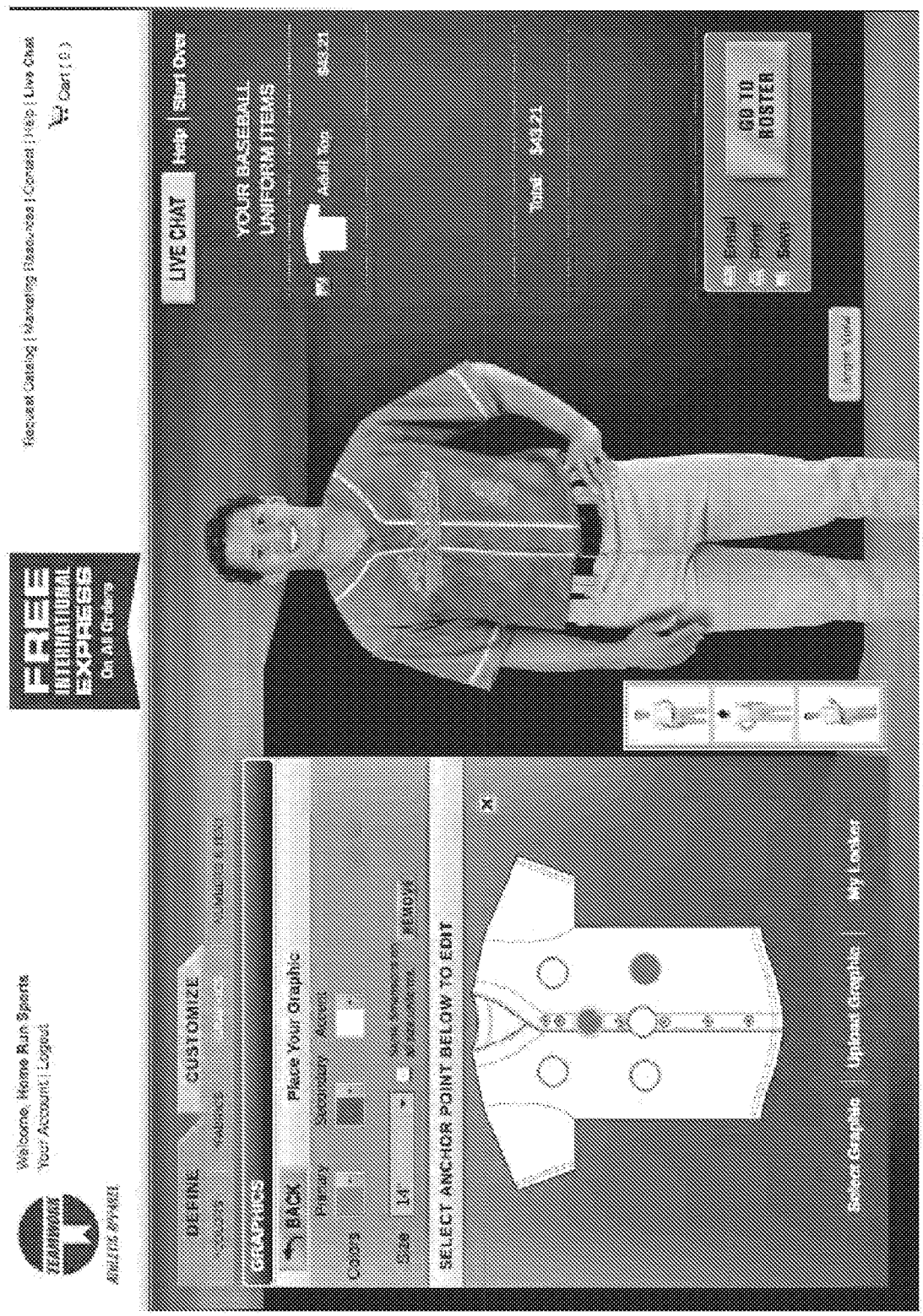
FIG. 44 is a screen shot showing how the number shown in FIG. 44 is moved down when a graphic is placed above the number.

Then the customer decides to place a graphic above it. While the customer does not know it, this is a fixed anchor point. The relative access point is defined to be relative to this fixed access point so the system determines the height of the graphic, adds the predefined relative space, and moves the number down the mathematically calculated value (graphic height+relative space) on the flat cut pattern file (the full-button baseball jersey template), which is then wrapped on a model using the 3D rendering program. See FIG. 44.

Figure 45:
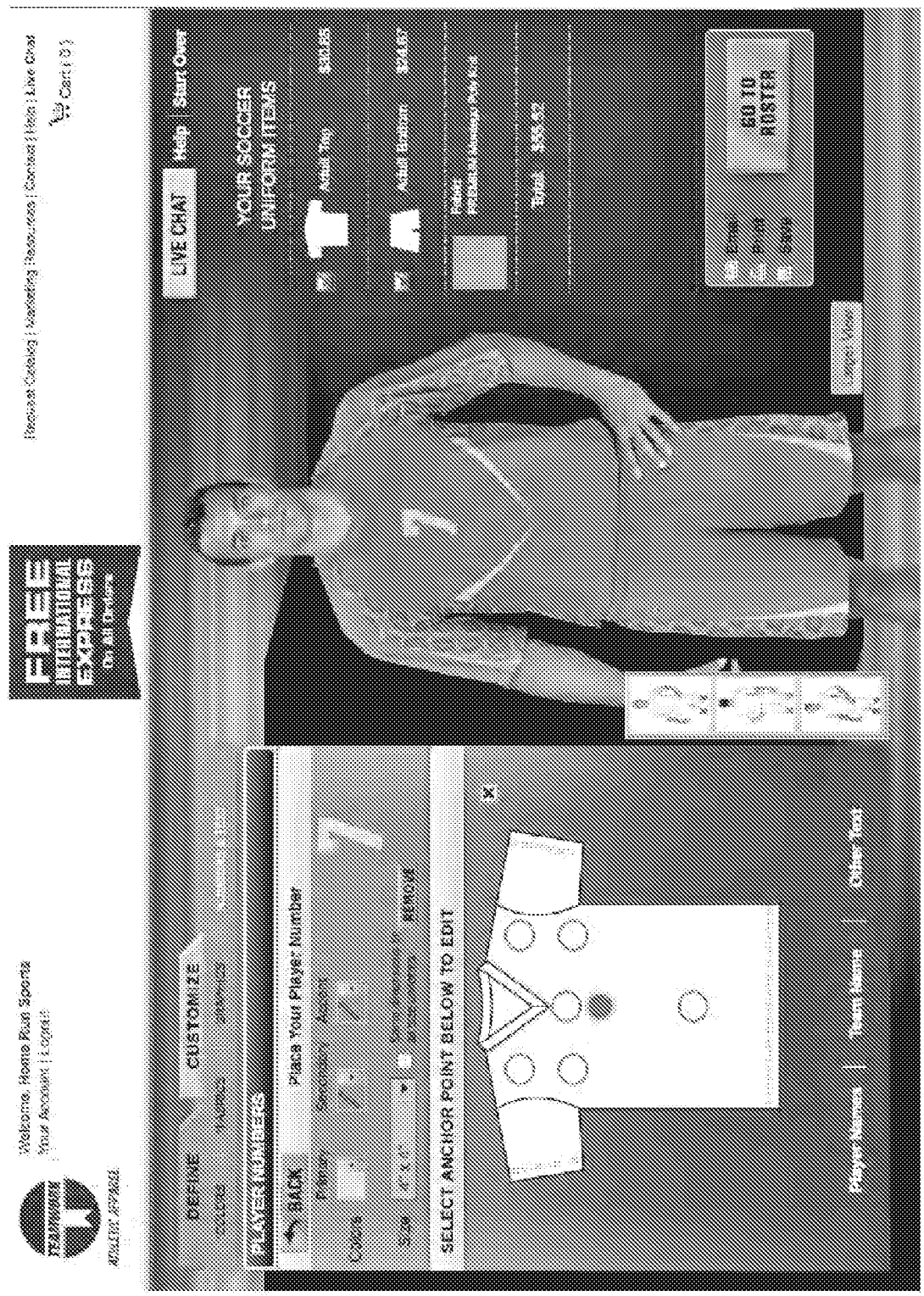
FIG. 45 is a screen shot showing application of a number to a soccer shirt
Figure 46:
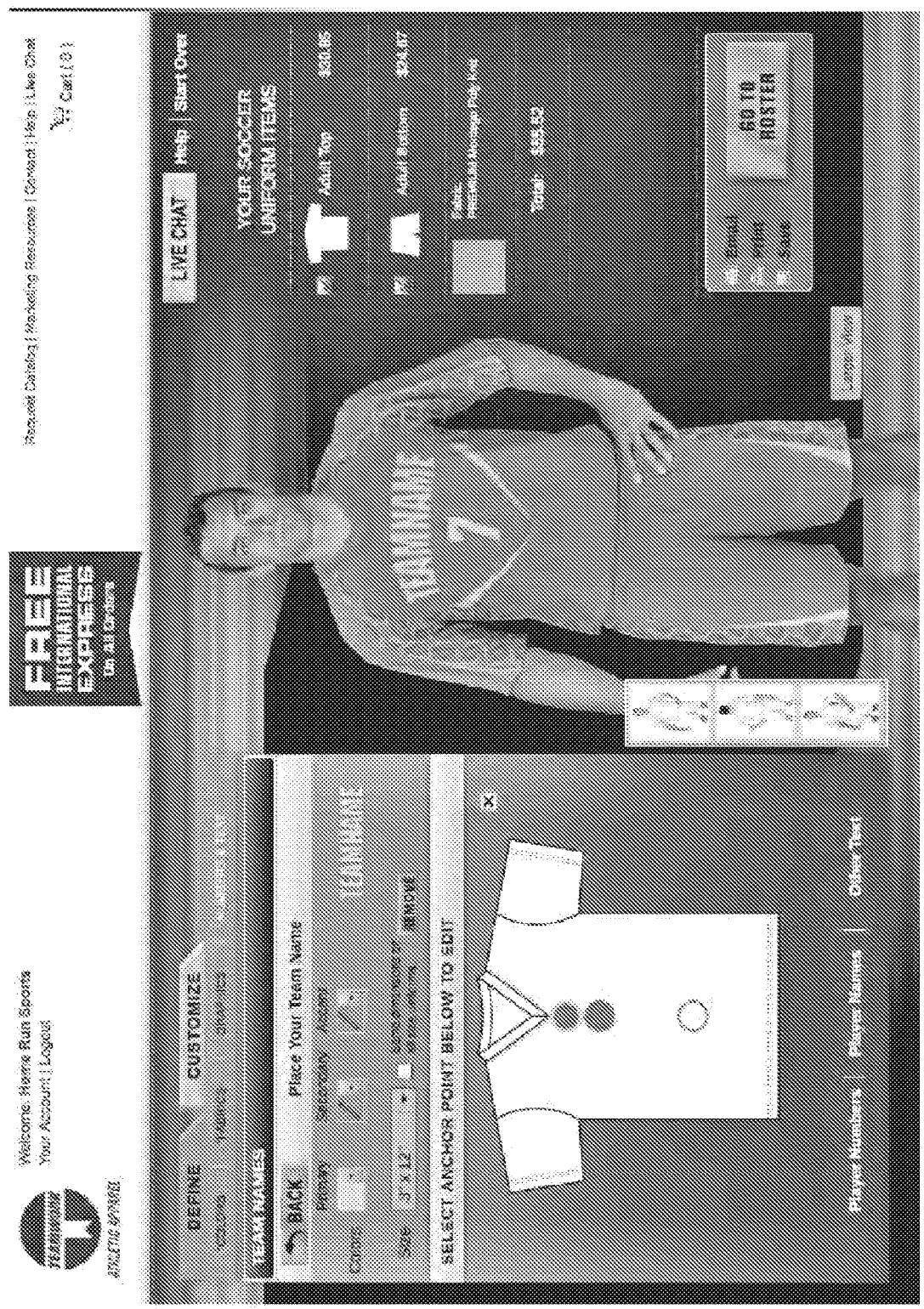
FIG. 46 is a screen shot showing how the number shown in FIG. 45 is moved down when text is placed above the number.

For a second example suppose a customer applies a number to a soccer uniform in a relative access point. See FIG. 45. Then she applies a team name as text to a fixed access point. The relative access point is defined to be relative to this fixed access point so the system determines the height value of the text, adds the relative space, and automatically moves the number down to accommodate the mathematically calculated value. See FIG. 46.

Thus, this invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of automated design of a clothing item, comprising:
    obtaining a pattern template from a library;
    receiving a selection of one or more of pattern pieces that comprise anchor points, the anchor points confining placement of text and graphics to specific locations on the one or more of pattern pieces based on a calculated position of (x, y)+H, where (x, y) is a position of a fixed anchor point, and H is a height of the text and the graphics at the anchor points; and
    virtually assembling a clothing item using the obtained pattern template and the anchor points.

2. The method according to claim 1, further comprising displaying the virtually assembled clothing item on a graphical user interface, wherein the graphical user interface comprises a selected plan view of the virtually assembled clothing item in conjunction with user-defined properties of the text and the graphics.

3. The method of claim 1, further comprising producing a physical version of the virtually assembled clothing item by transferring the text and the graphics from a graphical user interface using a printer.

4. The method of claim 1, wherein virtually assembling comprises generating a virtual three-dimensional representation of the clothing item that allows a user to display the clothing item on a virtual model such that the clothing item drapes naturally on the virtual model.

5. The method of claim 4, wherein the virtual three-dimensional representation of the clothing item can be rotated.

6. The method of claim 1, wherein the pattern template comprises colorable areas.

7. The method of claim 1, wherein the obtained pattern template includes flat portions of the clothing item with the automated design of the clothing item applied in arbitrary colors.

8. The method of claim 1, further comprising:
    receiving a selection of a decorative element; and
    placing the decorative element on the clothing item at one of the anchor points.

9. A system for automated design of a clothing item comprising:
    an input system for communicating with a print generation software;
    a design database comprising a library of pattern templates;
    an image generator coupled to the design database for enabling the design of a print image suitable for printing on a dye sublimation printer, wherein the design is created from a pattern template from the library of pattern templates each comprising anchor points that confine placement of design elements to specific locations on one or more of pattern pieces, and wherein the placement is based on a calculated position of (x, y)+H, where (x, y) is a position of a fixed anchor point, and H is a height of text and graphics at the anchor points; and
    the dye sublimation printer to print the print image onto physical versions of one or more of the pattern pieces.

10. The system of claim 9, further comprising:
    an image workspace coupled to the image generator for virtually assembling a virtual clothing item from the pattern pieces; and
    a display coupled to the image workspace for viewing the virtual clothing item.

11. The system of claim 9, wherein the design database enables a user to generate a sports collection of items with variable designs for printing.

12. The system of claim 9, wherein the design database enables a user to input a plurality of variable text to generate a sports collection of items with variable designs for printing.

13. The system of claim 9, wherein the design database enables a user to upload a plurality of variable text to generate a sports collection of items with variable designs for printing.

14. The system of claim 9, wherein the design database enables a user to import a plurality of variable text to generate a sports collection of items with variable designs for printing.

15. The system of claim 9, wherein the design database enables a user to link to a plurality of variable text to generate a sports collection of items with variable designs for printing.

* * * * *